United States Patent
Inoue et al.

(10) Patent No.: US 7,756,233 B2
(45) Date of Patent: Jul. 13, 2010

(54) DATA RECEIVING DEVICE AND DATA RECEIVING METHOD

(75) Inventors: Sadayuki Inoue, Tokyo (JP); Toshimitsu Sato, Tokyo (JP); Tsuyoshi Kasaura, Tokyo (JP); Tetsuro Shida, Tokyo (JP); Takashi Fujiwara, Tokyo (JP); Soichiro Matsumoto, Tokyo (JP); Masahiro Tsujishita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 962 days.

(21) Appl. No.: 10/588,380

(22) PCT Filed: Feb. 2, 2005

(86) PCT No.: PCT/JP2005/001459
§ 371 (c)(1),
(2), (4) Date: Aug. 2, 2006

(87) PCT Pub. No.: WO2005/088888
PCT Pub. Date: Sep. 22, 2005

(65) Prior Publication Data
US 2007/0140398 A1    Jun. 21, 2007

(30) Foreign Application Priority Data
Mar. 10, 2004  (JP) .............................. 2004-067332

(51) Int. Cl.
*H04L 7/00* (2006.01)
(52) U.S. Cl. .................. 375/356; 375/355; 375/368; 375/371; 370/516
(58) Field of Classification Search ............... 370/516; 375/356, 355, 368, 371
See application file for complete search history.

(56) References Cited

U.S. PATENT DOCUMENTS 5,966,387 A * 10/1999 Cloutier .................. 370/516

(Continued)

FOREIGN PATENT DOCUMENTS

EP  0921690 A2  6/1999

(Continued)

OTHER PUBLICATIONS

"Development of Wired-Wireless Network Relaying System for Digital AV Equipments" Advanced Technology R & D Center, Mitsubishi Electric Corporation, Translation of lines 4-21, right column of p. 5.138.

*Primary Examiner*—Sudhanshu C Pathak
(74) *Attorney, Agent, or Firm*—Birch, Stewart, Kolasch & Birch, LLP

(57) ABSTRACT

A receiving device (50) is provided to allow appropriate clock regeneration even for a VBR TS when a stream including video and audio data, such as an MPEG2 TS, is transmitted or received in real time through a network having jitter. When the received packet data is stored in a memory (53) and the packet data is output in accordance with time information added to the received packet data, a clock frequency deviation between a sending device and a receiving device is calculated on the basis of the integration result of the amount of the received packets temporarily stored in the memory (53), the number of the received packets which have been processed, and the measurement result of the integration time used for integrating the amount of the received packets. A read timing offset of the received packet is obtained on the basis of the calculation result of the clock frequency deviation.

34 Claims, 29 Drawing Sheets

U.S. PATENT DOCUMENTS 5,991,307 A    11/1999    Komuro et al.

FOREIGN PATENT DOCUMENTS

| | | |
|---|---|---|
| EP | 1185013 A2 | 3/2002 |
| JP | 5-210914 A | 8/1993 |
| JP | 7-46257 A | 2/1995 |
| JP | 9-36846 A | 2/1997 |
| JP | 9-214477 A | 8/1997 |
| JP | 9-275420 A | 10/1997 |
| JP | 11-317768 A | 11/1999 |
| JP | 2000-92130 A | 3/2000 |
| JP | 2000-253014 A | 9/2000 |
| JP | 2002-152304 A | 5/2002 |
| JP | 2003-110537 A | 4/2003 |
| WO | WO-99/38285 A1 | 7/1999 |
| WO | WO-00/42749 A1 | 7/2000 |

* cited by examiner

| i | MEASUREMENT TIME T(n) | CORRECTION TABLE |
|---|---|---|
| 0 | 0.5 SECONDS | Table(0) |
| 1 | 1.0 SECONDS | Table(1) |
| 2 | 2.0 SECONDS | Table(2) |
| 3 | 4.0 SECONDS | Table(3) |
| 4 | 8.0 SECONDS | Table(4) |

| I | MEASUREMENT TIME (TIME) | CONVERGENCE DETERMINATION THRESHOLD (CONV) CRCTML IS PREDETERMINED CONSTANT. | CONVERGENCE DETERMINATION CONDITION (CONV_CNT) | CORRECTION TABLE |
|---|---|---|---|---|
| 0 | 0.5 SECONDS | CRCTML | 10 | table0 |
| 1 | 1.0 SECONDS | 0.75*CRCTML | 15 | table1 |
| 2 | 2.0 SECONDS | 0.5*CRCTML | 20 | table2 |
| 3 | 4.0 SECONDS | 0.25*CRCTML | 25 | table3 |
| 4 | 8.0 SECONDS | 0.125*CRCTML | 30 | table4 |

FIG.28

| | MEASUREMENT TIME (TIME) | CONVERGENCE DETERMINATION THRESHOLD (OBSCONV) OBSCRCTML IS PREDETERMINED CONSTANT. | CONVERGENCE DETERMINATION CONDITION (CONV_CNT) | CORRECTION DIFFERENCE RANGE (dCRCTLIM) dCRCTLIM IS PREDETERMINED CONSTANT. | CORRECTION TABLE |
|---|---|---|---|---|---|
| 0 | 0.5 SECONDS | OBSCRCTML | 10 | dCRCTLIM | table0 |
| 1 | 1.0 SECONDS | 0.75*OBSCRCTML | 15 | 0.75*dCRCTLIM | table1 |
| 2 | 2.0 SECONDS | 0.5*OBSCRCTML | 20 | 0.5*dCRCTLIM | table2 |
| 3 | 4.0 SECONDS | 0.25*OBSCRCTML | 25 | 0.25*dCRCTLIM | table3 |
| 4 | 8.0 SECONDS | 0.125*OBSCRCTML | 30 | 0.125*dCRCTLIM | table4 |

DATA RECEIVING DEVICE AND DATA RECEIVING METHOD

TECHNICAL FIELD

The present invention relates to a data receiving device and a data receiving method for receiving video and audio data such as a transport stream (TS) in an MPEG (Motion Picture Experts Group) 2 system, for example.

BACKGROUND ART

There are needs for a data transmission system for transmitting a stream such as a TS by radio. The needs include, for example, a system for transmitting a TS output from an encoder in a data recording-reproducing apparatus through a wireless network (including a wireless sending device and a wireless receiving device) to a television (TV) set with a built-in digital tuner. In such data transmission system, the wireless sending device converts the TS, which is sent through a wired network (e.g., a network conforming to the IEEE1394 standard) from an encoder in the data recording-reproducing apparatus, into packets, and sends the packets through a wireless network to the wireless receiving device. The wireless receiving device reconstructs the received TS packets and sends them through a wired network (e.g., a network conforming to the IEEE1394 standard) to a TV with a built-in digital tuner. A decoder in the TV with a built-in digital tuner decodes the received TS.

Further, in such data transmission system, a PCR (program clock reference) is inserted into the TS in order to synchronize a clock in the sending-side encoder and a clock in the receiving-side decoder. The PCR is information used for adjusting a value of the STC (system time clock), which is a reference of time in the receiving-side decoder, to a value intended by the sending side. Accordingly, a timing when the PCR is input to the receiving-side decoder must be a timing intended by the sending side. In a TS, a TS packet including a PCR must be transmitted at least once in 100 ms. Therefore, the jitter in a TS including a PCR must be suppressed to several tens of microseconds (e.g., 50 μs) or less.

FIGS. 33A to 33C are diagrams for describing the conventional data transmission method. In FIG. 33A, timings, in which packets TS_0 to TS_17 are input to a wireless sending device, are shown, and TS's including the PCR (i.e., TS_0, TS_5, and TS_13) are marked with arrows. Further, in FIG. 33B, timings, in which the TS packets (packets TS_0 to TS_10 are shown) are transmitted from the wireless sending device to the wireless receiving device, are shown. Furthermore, in FIG. 33C, timings, in which the received TS's (TS_0 to TS_7 are shown) are output from the wireless receiving device, are shown. As shown in FIGS. 33A to 33C, the wireless receiving device outputs the TS's received from the wireless sending device with a predetermined amount of data delay. The amount of the jitter of the delayed received TS must be kept within a predetermined range, and, for this reason, the ATM (Asynchronous Transfer Mode) is used, for example (refer to Patent Documents 1 to 4, for example).

Patent Documents 1 to 4 describe a communication method using an SRTS (Synchronous Residual Time Stamp) method and another communication method using an adaptive clock method. The SRTS method is used when a common clock of the sending side and the receiving side can be referenced. The sending side measures the common clock at intervals of fixed data transfer rate information for every N bits, inserts just a portion of the measured value varied with fluctuation in the transmission clock frequency as synchronous residual time stamp information into the packet, and sends the packet. The receiving side reproduces the intervals of N-bit fixed rate information from the sent synchronous residual time stamp information and the common clock, and regenerates the clock in accordance with the intervals. On the other hand, in the adaptive clock method, the receiving side stores the fixed rate information included in the received packet in a buffer, and the read clock information of the buffer is controlled so that an amount of the stored information can be kept at a reference value.

Patent Document 1: Japanese Patent-Application Kokai (Laid Open) Publication No. H9-214477

Patent Document 2: Japanese Patent Application Kokai (Laid Open) Publication No. H7-46257

Patent Document 3: Japanese Patent Application Kokai (Laid Open) Publication No. H9-36846

Patent Document 4: Japanese Patent Application Kokai (Laid Open) Publication No. H5-210914

Patent Document 5: Japanese Patent Application Kokai (Laid Open) Publication No. H11-317768 (FIG. 1 and FIG. 2)

DISCLOSURE OF INVENTION

Problems to be Solved by the Invention

However, there is a problem that the clock regeneration method disclosed in Patent Documents 1 to 4 has a precondition in which data sending and receiving is performed at a constant bit rate (CBR), and an adequate adaptive clock in data sending and receiving at a variable bit rate (VBR) cannot be regenerated.

Further, the data transmission method disclosed in Patent Document 5 supports data transmission at the VBR, but this method adopts a process of transmitting effective packets with additional information, causing the throughput to be lowered in wireless transmission. The network band is compressed also in wired transmission for the same reason. Furthermore, in the data transmission method disclosed in Patent Document 5, there is a problem that the receiving device must store valid packets and invalid packets added in accordance with the additional information in a buffer, increasing the circuit size of the receiving device and complicating control of the receiving device.

Moreover, Patent Documents 1 to 5 assume that the receiving device is connected to the sending device basically in a one-to-one relationship (peer-to-peer connection). However, when the wireless transmission system shown in FIG. 34 is used to connect a plurality of different wired networks, the radio receiver 111 must receive the TS's output from a plurality of the radio senders 110. There is a problem that if the conventional SRTS method and the adaptive clock method, which are assumed to use a one-to-one connection, are applied to an N-to-1 or N-to-M connection (N and M are integers greater than or equal to 2), a clock cannot be appropriately regenerated for each TS on the receiver side. Especially, there is a problem that with the configuration disclosed in Patent Document 2, in which a clock is regenerated on the receiver side by performing PLL on the system clock in accordance with the remaining amount of the memory, and the method disclosed in Patent Document 4, in which a clock is regenerated by gating the clock signal, the clock cannot be regenerated for each of the TS's sent from the plurality of senders. In addition, the method disclosed in Patent Document 5 has also a problem that additional information transmitted for VBR degrades the transmission throughput of the TS.

To solve the above problems in the conventional art, according to the present invention, it is an object of the present invention to provide a data receiving device and a data receiving method which can prevent the throughput from being degraded and the receiving circuit from being complicated while allowing the memory on the receiving side to output data continuously without an underflow or overflow.

Means of Solving the Problem

The data receiving device of the present invention receives packet data through a transmission path and outputting the packet data in accordance with time information added beforehand to the packet data. The data receiving device includes a storage means for storing the received packet data; and a control means for separating the time information added to the received packet data and reading the packet data from the storage means in accordance with the separated time information. When the control means generates a read timing, the control means calculates a clock frequency deviation between a data sending device and the data receiving device in accordance with an integration result of an amount of the received packet data temporarily stored in the storage means and a measurement result of the integration time, and adds an offset amount based on the deviation to the read timing of the received packet data, thereby generating the read timing of the received packet data.

In the data receiving method of the present invention, packet data is received through a transmission path, and the packet data is output in accordance with time information added beforehand to the received packet data. The data receiving method includes the steps of storing the received packet data temporarily in a storage means; and separating the time information added to the received packet data and reading the packet data from the storage means in accordance with the separated time information. When a read timing of the received packet data is generated in the step of reading the packet data, a clock frequency deviation between a data sending device and a data receiving device is calculated in accordance with an integration result of an amount of the received packet data temporarily stored in the storage means and a measurement result of the integration time, and an offset amount based on the deviation is added to the read timing of the received packet data, thereby generating the read timing of the received packet data.

Effects of the Invention

With the data receiving device or data receiving method of the present invention, the clock frequency deviation between the data sending device and the data receiving device is calculated from the integral of the amount of the received packet data temporarily stored in the storage means and the measured integration time (measured period and the number of the processed received packets) when the read timing is generated, and the read timing of the received packet data is generated by adding the offset amount based on the calculated deviation to the read timing of the received packet data, so that the amount of the jitter in TS can be suppressed below a predetermined level.

BRIEF DESCRIPTION OF THE DRAWINGS

FIG. 28 is a diagram showing an example of a threshold table used to determine the measurement time to be used in each correction value calculation stage or to make a determination in the fourth embodiment;

FIG. 33A is a diagram showing a timing in which a TS including a PCR is input to a wireless sending device; FIG. 33B is a diagram showing a timing in which the TS packet is transmitted from the wireless sending device to the wireless receiving device; and FIG. 33C is a diagram showing a timing in which the received TS is output from the wireless receiving device.

EXPLANATION OF THE REFERENCE NUMERALS

10, 20, 30 wired network; 11 wireless sending/receiving device (A); 21 wireless sending/receiving device (B); 31 wireless sending/receiving device (C); 40 wireless sending device (sending device); 43 CPU; 44 sending-side memory control circuit; 45 memory; 46 wireless LAN module; 47 CPU bus; 441 time stamp generating circuit; 442 time stamp adding circuit; 443 TS memory write control circuit; 444 bus arbiter circuit; 50 wireless receiving device (receiving device); 51 wireless LAN module; 52 receiving-side memory control circuit; 53 memory; 54 CPU; 55 CPU bus; 521 TS data read timing generating circuit; 522 TS memory read control circuit; 523 bus arbiter circuit; 531 first TS storage area; 532 second TS storage area; 5213 time counter; 5214 time counter control circuit; 5215 time correction value storage register; 5216 time comparator; 5225 FIFO memory; 5226 FIFO memory control circuit; 5227 TS read address generating circuit; 5228 TS write address storage circuit; 5229 memory storage data amount integration circuit; 5230 integration result storage register; 5231 TS output counter; 5232 TS output count register; 5233 measurement time counter; 5234 measurement time storage register.

BEST MODE FOR CARRYING OUT THE INVENTION

First Embodiment

Figure 1:
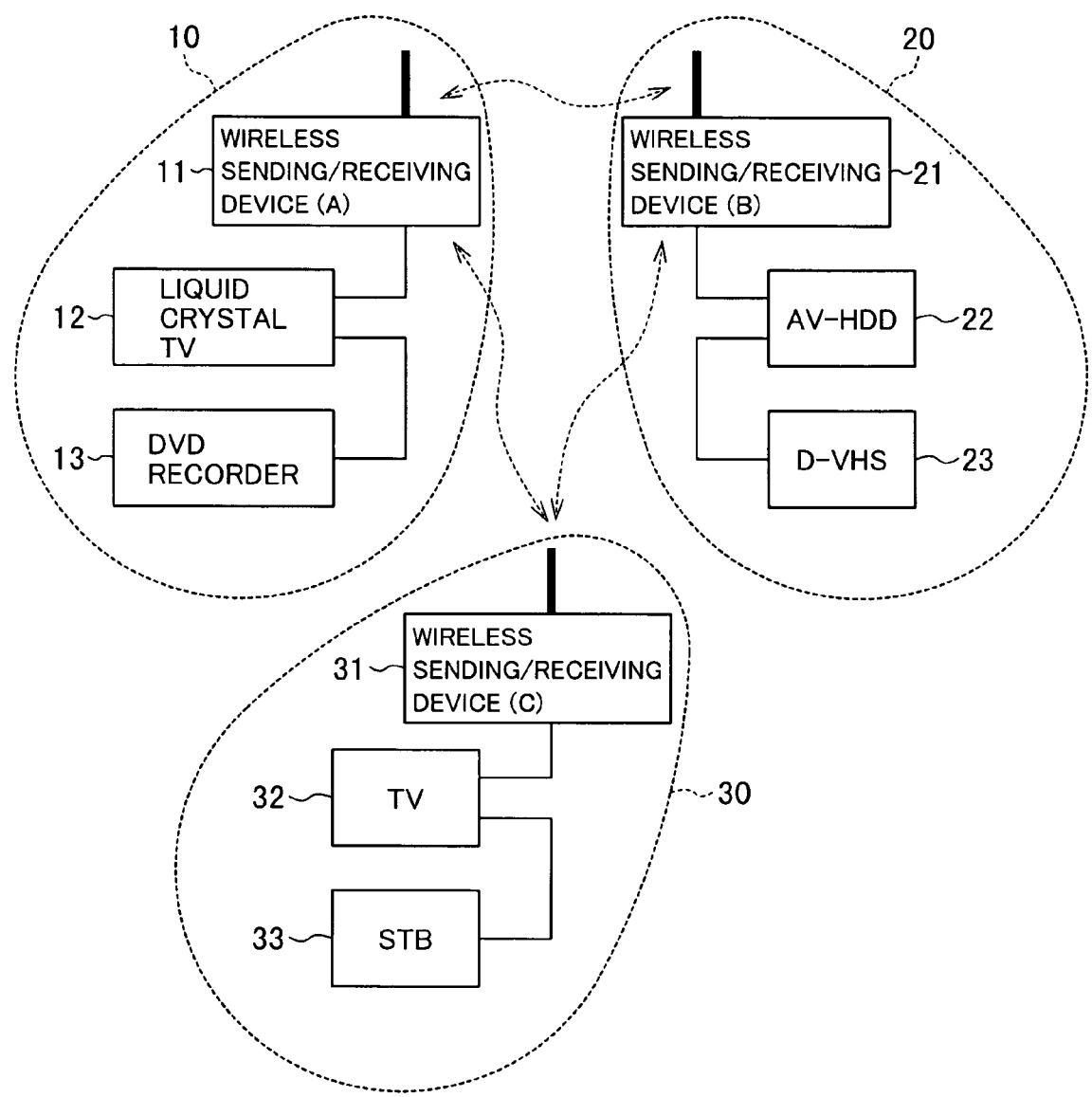
FIG. 1 is a diagram schematically showing a configuration of a data transmission system implementing a data receiving method according to the first to seventh embodiments of the present invention.

FIG. 1 is a diagram schematically showing a configuration of a data transmission system implementing a data receiving method according to the first embodiment of the present invention. The data transmission system shown in FIG. 1 includes a first wired network 10, a second wired network 20, and a third wired network 30. The first wired network 10, the second wired network 20, and the third wired network 30 forms a wireless network conforming to the IEEE 802.11a standard (wireless LAN), in which they can communicate with one another by radio. The entire configuration shown in FIG. 1 forms a home network.

The first wired network 10 includes a wireless sending/receiving device (A) 11, a liquid crystal television (liquid crystal TV) 12, and a DVD (digital versatile disc) recorder (DVD recording/reproducing apparatus) 13, which are connected through a wire by a method conforming to the IEEE1394 standard, for example. Further, the second wired network 20 includes a wireless sending/receiving device (B) 21, an AV-HDD recording/reproducing apparatus (audio-visual hard disk drive recording/reproducing apparatus) 22, and a D-VHS (data video home system) recording/reproducing apparatus 23, which are connected through a wire by a method conforming to the IEEE1394 standard, for example. Furthermore, the third wired network 30 includes a wireless sending/receiving device (C) 31, a television (TV) set 32, and an STB (set top box) 33, which are connected by a wire by a method conforming to the IEEE1394 standard, for example. The configuration shown in FIG. 1 is an example of a system configuration to which the data receiving method and the data receiving device of the present invention can be applied. The data receiving method and the data receiving device of the present invention can be applied to other systems.

Each of the wired networks 10, 20, and 30 conforming to the IEEE1394 standard is a network having no jitter. On the other hand, the wireless network conforming to the IEEE 802.11a standard is a network having jitter. In the first embodiment, the wired networks 10, 20, and 30, conforming to the IEEE1394 standard, shown in FIG. 1 are connected to allow wireless communication conforming to the IEEE 802.11a standard between them.

For example, in the data transmission system shown in FIG. 1, the liquid crystal TV 12 in the first wired network 10 receives a transport stream (TS) from the STB 33 in the third wired network 30 through the wireless sending/receiving device 31 and the wireless sending/receiving device 11 (i.e., the wireless network), and the DVD recorder 13 in the first wired network 10 receives and records a content recorded in the AV-HDD recording/reproducing apparatus 22 in the second wired network 20 through the wireless sending/receiving device 21 and the wireless sending/receiving device 11 (i.e., the wireless network). In this case, the wireless sending/receiving device 11 on the receiving side must regenerates a clock synchronized with (i.e., must be synchronized with) the second wired network 20 containing the wireless sending/receiving device 21 on the sending side and the third wired network 30 containing the wireless sending/receiving device 31. In the first embodiment, a case in which both the TS from the STB 33 and the TS from the AV-HDD recording/reproducing apparatus 22 are output at a variable bit rate (VBR)

will be explained. Further, in the first embodiment, the wireless sending/receiving device 11 will be described as a wireless receiving device (a reference numeral 50 in FIG. 5 which will be described later), and the wireless sending/receiving device 21 and the wireless sending/receiving device 31 will be described as a wireless sending device (a reference numeral 40 in FIG. 2 which will be described later), for the sake of simplifying the explanation. Actually, the wireless sending/receiving device 11, the wireless sending/receiving device 21, and the wireless sending/receiving device 31 have both the functions of the wireless sending device 40 shown in FIG. 2 which will be described later and the wireless sending device 50 shown in FIG. 5 which will be described later.

Figure 2:
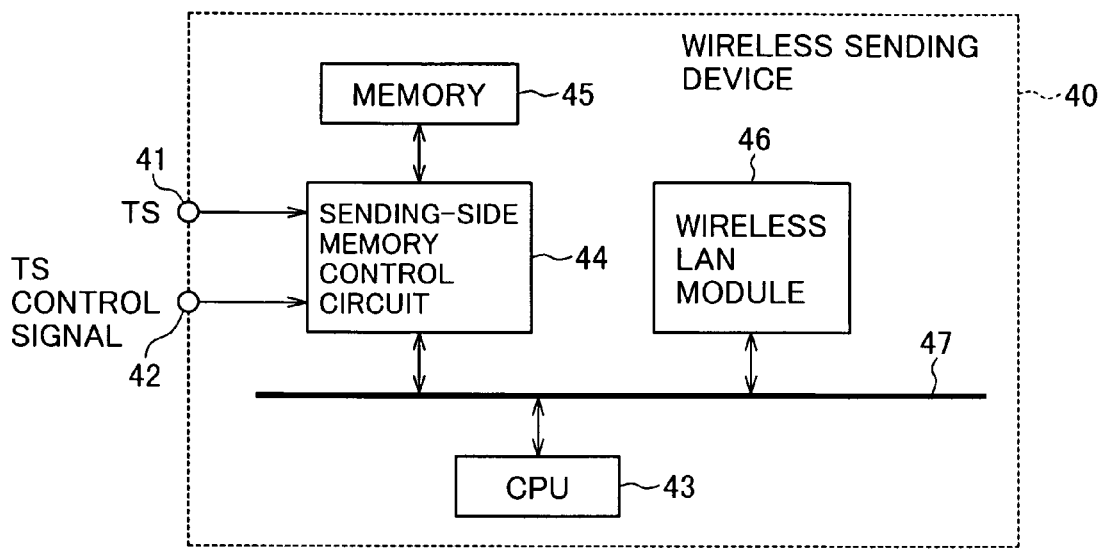
FIG. 2 is a block diagram schematically showing a configuration of a wireless sending device in the first to seventh embodiments.

Next, a configuration of the wireless sending device 40 will be described with reference to FIG. 2 to FIG. 4. FIG. 2 is a block diagram schematically showing a configuration of the wireless sending device 40 in the first embodiment. The wireless sending device 40 is a wireless sending circuit included in each of the wireless sending/receiving devices 11, 21, and 31 shown in FIG. 1. As shown in FIG. 2, the wireless sending device 40 includes an input terminal 41 for receiving a TS sent from a wired network conforming to the IEEE1394 standard; an input terminal 42 for receiving a TS control signal indicating a beginning of the TS, a signal area, and other information; a CPU (central processing unit) 43 for controlling the whole of the wireless sending device 40; a sending-side memory control circuit 44; a memory 45; a wireless LAN (local area network) module 46; and a CPU bus 47. The sending-side memory control circuit 44 adds a time stamp to the TS input through the input terminal 41 and writes the TS with the added time stamp (hereafter referred to as a "time-stamped TS") into the memory 45. Further, the sending-side memory control circuit 44 reads the time-stamped TS from the memory 45 in accordance with the control signal input from the CPU 43. The wireless LAN module 46 sends the time-stamped TS read from the memory 45 by radio, as instructed by the CPU 43.

Figure 3:
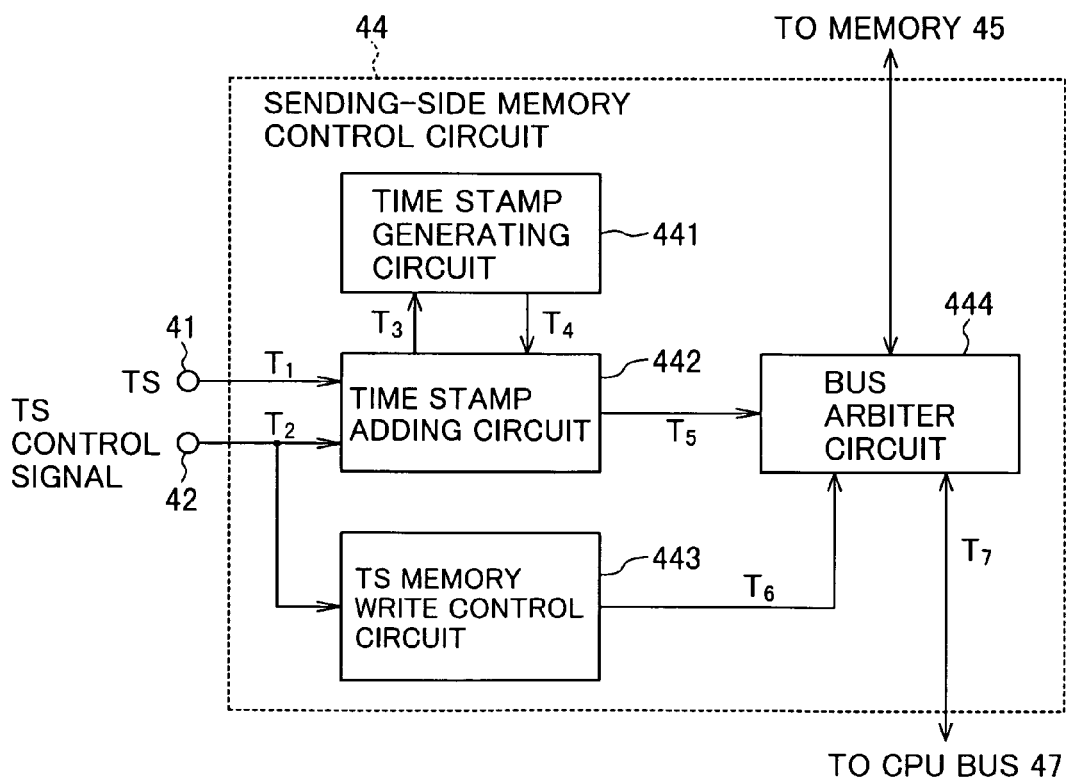
FIG. 3 is a block diagram schematically showing a configuration of a sending-side memory control circuit in the wireless sending device shown in FIG. 2.

FIG. 3 is a block diagram schematically showing a configuration of the sending-side memory control circuit 44 in the wireless sending device 40 shown in FIG. 2. As shown in FIG. 3, the sending-side memory control circuit 44 includes a time stamp generating circuit 441, a time stamp adding circuit 442, a TS memory write control circuit 443, and a bus arbiter circuit 444. The time stamp generating circuit 441 generates a time stamp (time information) to be added to the TS input from the input terminal 41 by using the reference clock of the wireless sending device 40. The time stamp adding circuit 442 adds the time stamp generated by the time stamp generating circuit 441 to the TS. The TS memory write control circuit 443 generates control signals such as a write address for writing the time-stamped TS output from the time stamp adding circuit 442 into the memory 45 in accordance with the TS control signal input from the input terminal 42. The bus arbiter circuit 444 arbitrates between the TS write control signal (TS write request) to the memory 45 output from the TS memory write control circuit 443 and the TS read control signal (TS read request) from the memory 45 output from the CPU 43.

Figure 4:
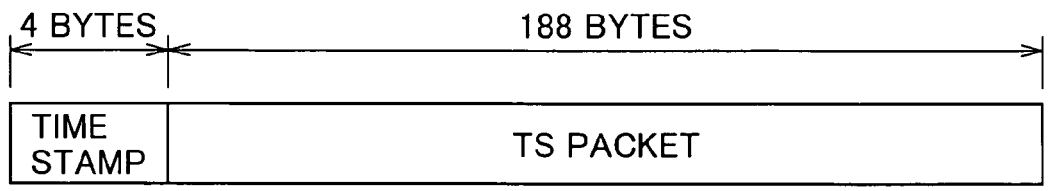
FIG. 4 is a diagram for describing a TS with an added time stamp.

FIG. 4 is a diagram showing an example of a signal format of the time-stamped TS transmitted by radio in the data transmission system of the first embodiment. As shown in FIG. 4, in the first embodiment, the TS packet has 188 bytes, and a 4-byte time stamp is added to the beginning of each TS.

Next, an overview of the operation of the wireless sending device 40 will next be given. As shown in FIG. 2, a time stamp is added to the TS input to the input terminal 41 by the sending-side memory control circuit 44, and then the TS is temporarily stored in the memory 45. The time-stamped TS stored in the memory 45 is read from the memory 45 in accordance with a memory read control signal output from the CPU 43 and is input to the wireless LAN module 46. The wireless LAN module 46 adds a header for wireless transmission to the input time-stamped TS, packetizes the TS, and sends the packets to another wireless sending/receiving device (a wireless receiving device 50, which will be described later) by radio. In the first embodiment, a predetermined number of the time-stamped TS's are collected to form a packet, in order to minimize the overhead in the wireless section in wireless transmission of the TS.

Next, the operation of each of the circuits forming the wireless sending device 40 will be described in detail with reference to FIG. 2 to FIG. 4. As shown in FIG. 3, a TS control signal $T_2$ input to the sending-side memory control circuit 44 through the input terminal 42 is supplied to the time stamp adding circuit 442 and the TS memory write control circuit 443. The time stamp adding circuit 442 detects a beginning of TS_$T_1$ input through the input terminal 41 in accordance with the input TS control signal $T_2$. When detecting a beginning of the TS, the time stamp adding circuit 442 outputs a time stamp request signal $T_3$ to the time stamp generating circuit 441. The time stamp generating circuit 441, which generates a reference time in the wireless sending device 40, outputs a current reference time $T_4$ in the wireless sending device 40 to the time stamp adding circuit 442 when receiving the time stamp request signal $T_3$ from the time stamp adding circuit 442. When receiving the reference time $T_4$ in the wireless sending device 40 from the time stamp generating circuit 441, the time stamp adding circuit 442 adds a time stamp to a beginning of the TS input from the input terminal 41, as shown in FIG. 4, and outputs a time-stamped TS_$T_5$ to the bus arbiter circuit 444, as shown in FIG. 3. In the first embodiment, a 4-byte time stamp is added to a beginning of the 188-byte TS_$T_1$ input through the input terminal 41, as shown in FIG. 4, and a predetermined number of the 188-byte TS's are collected to form a wireless packet to be transmitted. Further, in the first embodiment, data of seven TS's form a wireless packet.

On the other hand, as shown in FIG. 3, the TS memory write control circuit 443 outputs a write address to the memory 45 and a write control signal $T_6$, concerning the time-stamped TS_$T_5$ output from the time stamp adding circuit 442, in accordance with the TS control signal $T_2$ input through the input terminal 42. As shown in FIG. 3, when the writing of data of seven TS's to the memory 45 finishes, the bus arbiter circuit 444 generates a data read request signal $T_7$ through the CPU bus 47 to the CPU 43 (FIG. 2). When receiving the data read request signal $T_7$ from the bus arbiter circuit 444, the CPU 43 shown in FIG. 2 starts DMA (direct memory access), reads the data of seven TS's including time stamps from the memory 45, and writes the data through the CPU bus 47 to the wireless LAN module 46. To be more specific, as shown in FIG. 2, when a predetermined number of the input TS's are collected, the CPU 43 outputs a read control signal (read address and the like) to the memory 45. Further, as shown in FIG. 3, the bus arbiter circuit 444 arbitrates between the read control signal $T_7$ output from the CPU 43 (FIG. 2) and the TS data write control signal $T_6$ output from the TS memory write control circuit 443. To be more specific, the bus arbiter circuit 444 performs control to write the TS input in a period in which no data is read from the CPU 43 (access to the memory 45 is not made in at least once per two clocks even if the DMA is started by the CPU 43) to the memory 45.

When the wireless LAN module 46 shown in FIG. 2 receives the data of seven TS's, the wireless LAN module 46 adds a wireless header to a beginning of the input data of seven TS's to produce a wireless packet. In the first embodiment, information, such as data type information for discriminating among TS data, device control data, and other data, wireless packet length information, a MAC address (media access control address) for identifying the wireless sending device 40, device identification information specific to the wireless sending device 40 (such as an IP (Internet protocol) address), and device identification information specific to the wireless sending device 50 (e.g., an IP address), are added to the wireless header. The wireless LAN module 46 shown in FIG. 2 sends the packet data with an added wireless header by radio.

Figure 5:
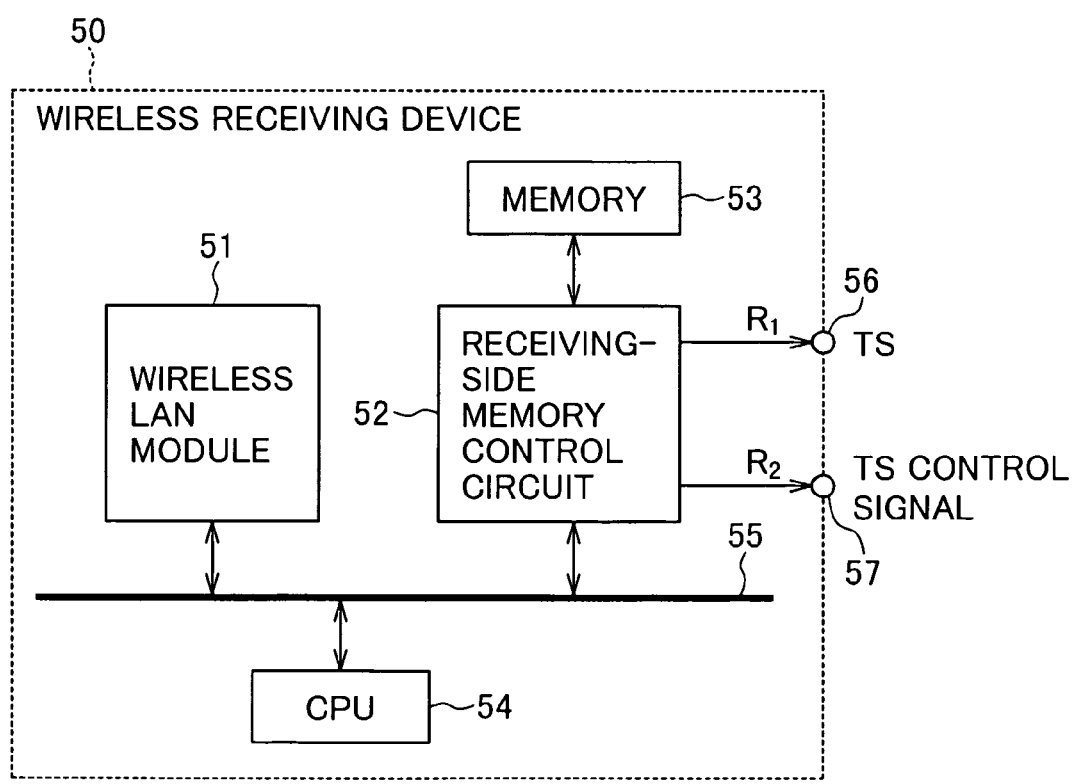
FIG. 5 is a block diagram schematically showing a configuration of a wireless receiving device (data receiving device) in the first to seventh embodiments.

Next, a configuration of the wireless receiving device (data receiving device) 50 implementing a data receiving method according to the first embodiment of the present invention will be described with reference to FIG. 5 to FIG. 9. FIG. 5 is a block diagram schematically showing a configuration of the wireless receiving device 50 in the first embodiment. The wireless receiving device 50 is a wireless receiving circuit included in each of the wireless sending/receiving devices 11, 21, and 31 shown in FIG. 1. In the first embodiment, the wireless receiving device 50 has a function to receive up to two TS's simultaneously. As shown in FIG. 5, the wireless receiving device 50 includes a wireless LAN module 51 for receiving a wireless packet sent from the wireless sending device 40, a receiving-side memory control circuit 52, a memory 53, a CPU (central processing unit) 54 for controlling the whole of the wireless receiving device 50, a CPU bus 55, an output terminal 56 for outputting a TS, and an output terminal 57 for outputting a TS control signal. The receiving-side memory control circuit 52 writes the TS received by the wireless LAN module 51 into the memory 53, in accordance with a write control signal (write address signal and the like) output from the CPU 54, and reads and outputs the TS written into the memory 53 (consequently stored there temporarily) at a timing based on the time stamp. In the first embodiment, as shown in FIG. 5, a $TS\_R_1$ signal is output to an apparatus connected in conformity with the IEEE1394 standard through the output terminal 56, and a TS control signal $R_2$ is output to an apparatus connected in conformity with the IEEE1394 standard through the output terminal 57.

Figure 6:
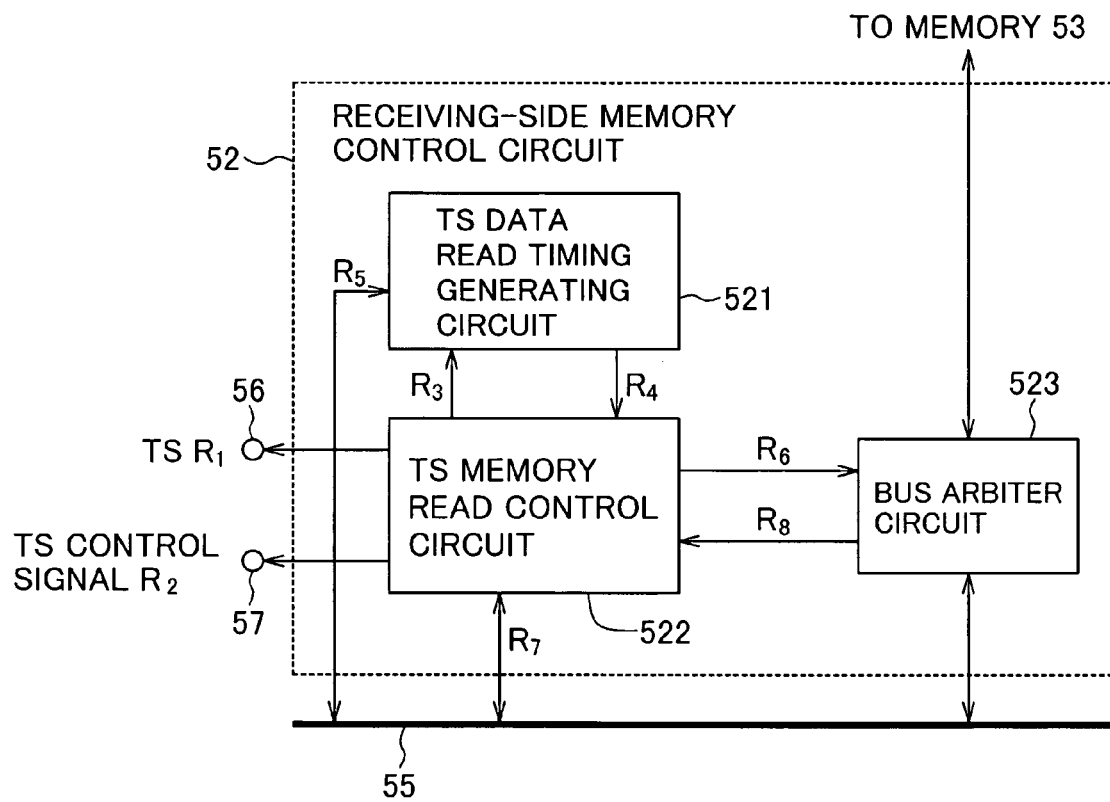
FIG. 6 is a block diagram schematically showing a configuration of a receiving-side memory control circuit in the wireless receiving device shown in FIG. 5.

FIG. 6 is a block diagram schematically showing a configuration of the receiving-side memory control circuit 52 in the wireless receiving device 50 shown in FIG. 5. As shown in FIG. 6, the receiving-side memory control circuit 52 includes a TS data read timing generating circuit 521, a TS memory read control circuit 522, and a bus arbiter circuit 523. The TS data read timing generating circuit 521 shown in FIG. 6 generates a read timing signal $R_4$ for reading the TS received by the wireless LAN module 51 (FIG. 5) and temporarily stored in the memory 53 (FIG. 5) from the memory 53 (FIG. 5). The TS memory read control circuit 522 shown in FIG. 6 generates a TS read control signal $R_6$ in accordance with a TS read timing signal $R_4$ output from the TS data read timing generating circuit 521. Further, the TS data read timing generating circuit 521 shown in FIG. 6 receives a time correction value (also referred to as a "clock jitter correction value" in the first embodiment) $R_5$ for correcting the TS read timing generated by the TS data read timing generating circuit 521 through the CPU bus 55. The bus arbiter circuit 523 shown in FIG. 6 arbitrates between a data write request to the memory 53 (FIG. 5), which is output from the CPU 54 (FIG. 5) and input through the CPU bus 55, and a data read request output from the TS memory read control circuit 522.

Figure 7:
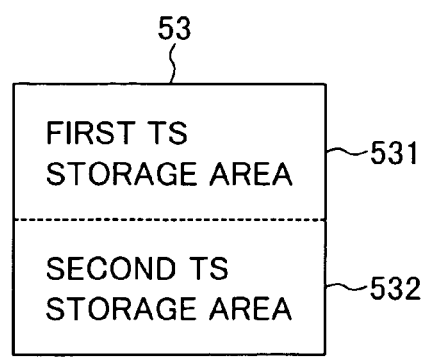
FIG. 7 is a diagram for describing a storage area of a memory in the wireless receiving device shown in FIG. 5.

FIG. 7 is a diagram schematically showing a configuration of a storage area of the memory 53 in the wireless receiving device 50 shown in FIG. 5. In the first embodiment, since the wireless receiving device 50 handles up to two TS's simultaneously, the memory 53 (FIG. 5) has a first TS storage area 531 for storing a first TS and a second TS storage area 532 for storing a second TS. The wireless receiving device 50 may handle three or more TS's simultaneously, and, in such case, the number of the storage areas must be increased depending on the number of the TS's to be handled simultaneously. Further, the receiving-side memory control circuit 52 (FIG. 5) contains as many TS data read timing generating circuits 521 and TS memory read control circuits 522 as the number of the TS storage areas in the memory 53, provided independently, which are not shown in the figure. The TS data read timing generating circuits 521 and the TS memory read control circuit 522 are provided independently for each of the storage areas.

Figure 8:
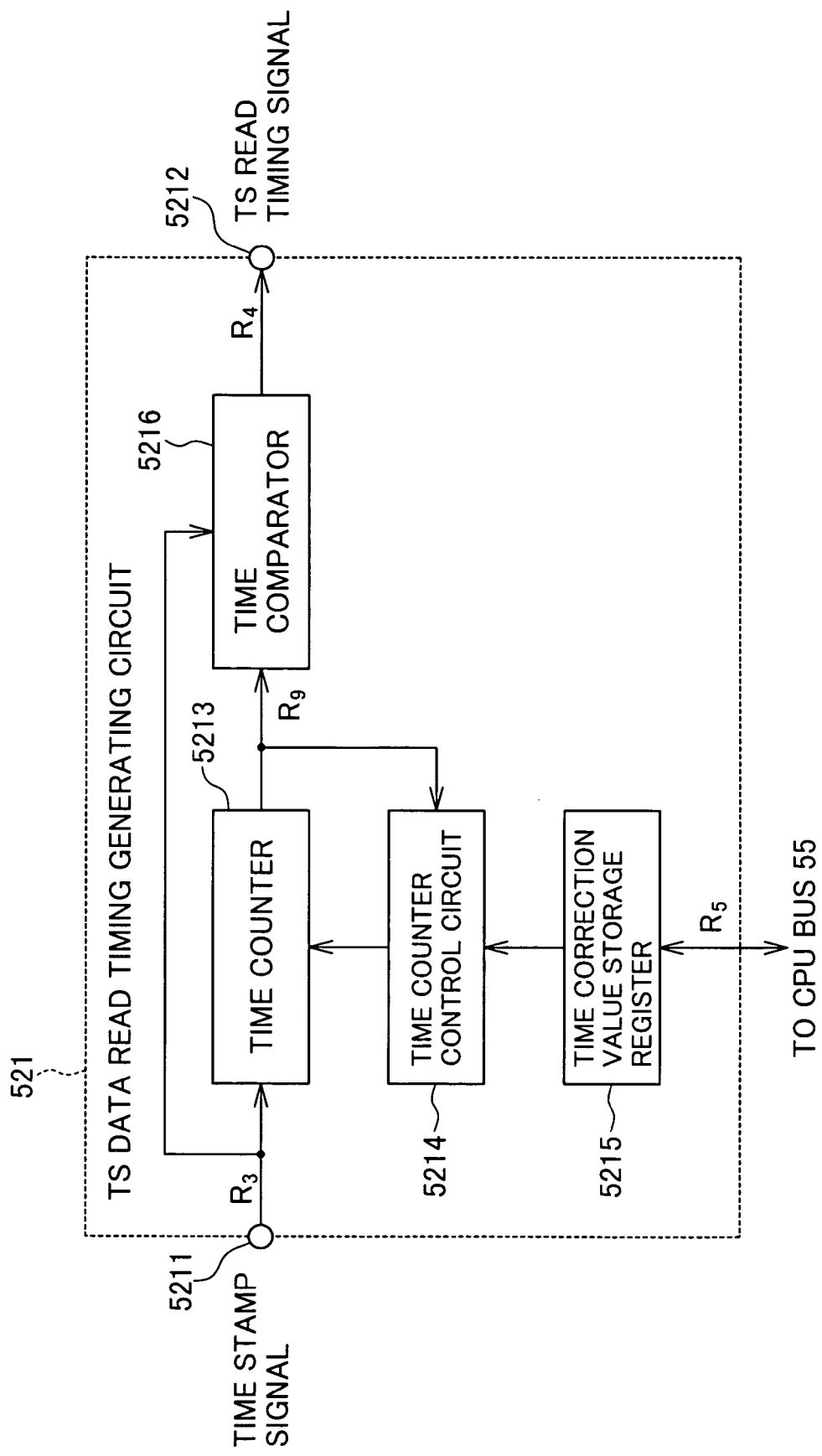
FIG. 8 is a block diagram schematically showing a configuration of a TS data read timing generating circuit in the receiving-side memory control circuit shown in FIG. 6.

FIG. 8 is a block diagram schematically showing a configuration of the TS data read timing generating circuit 521 in the receiving-side memory control circuit 52 shown in FIG. 6. As shown in FIG. 8, the TS data read timing generating circuit 521 includes an input terminal 5211 receiving a time stamp signal $R_3$ sent from the TS memory read control circuit 522 (FIG. 6), an output terminal 5212 for outputting a TS read timing signal $R_4$, a time counter 5213, a time counter control circuit 5214, a time correction value storage register 5215, and a time comparator 5216. The time counter 5213 shown in FIG. 8 measures the output timing of the received TS. The time correction value storage register 5215 shown in FIG. 8 stores a time correction value $R_5$ output from the CPU 54 (FIG. 5) and input through the CPU bus 55. The time counter control circuit 5214 shown in FIG. 8 controls a count value of the time counter 5213 in accordance with the time correction value stored in the time correction value storage register 5215. The time comparator 5216 shown in FIG. 8 compares a time stamp signal value (a time stamp value) $R_3$ input through the input terminal 5211 and a time counter value $R_9$ output from the time counter 5213, and generates the TS read timing signal $R_4$ when the time counter value $R_9$ exceeds the time stamp value $R_3$.

Figure 9:
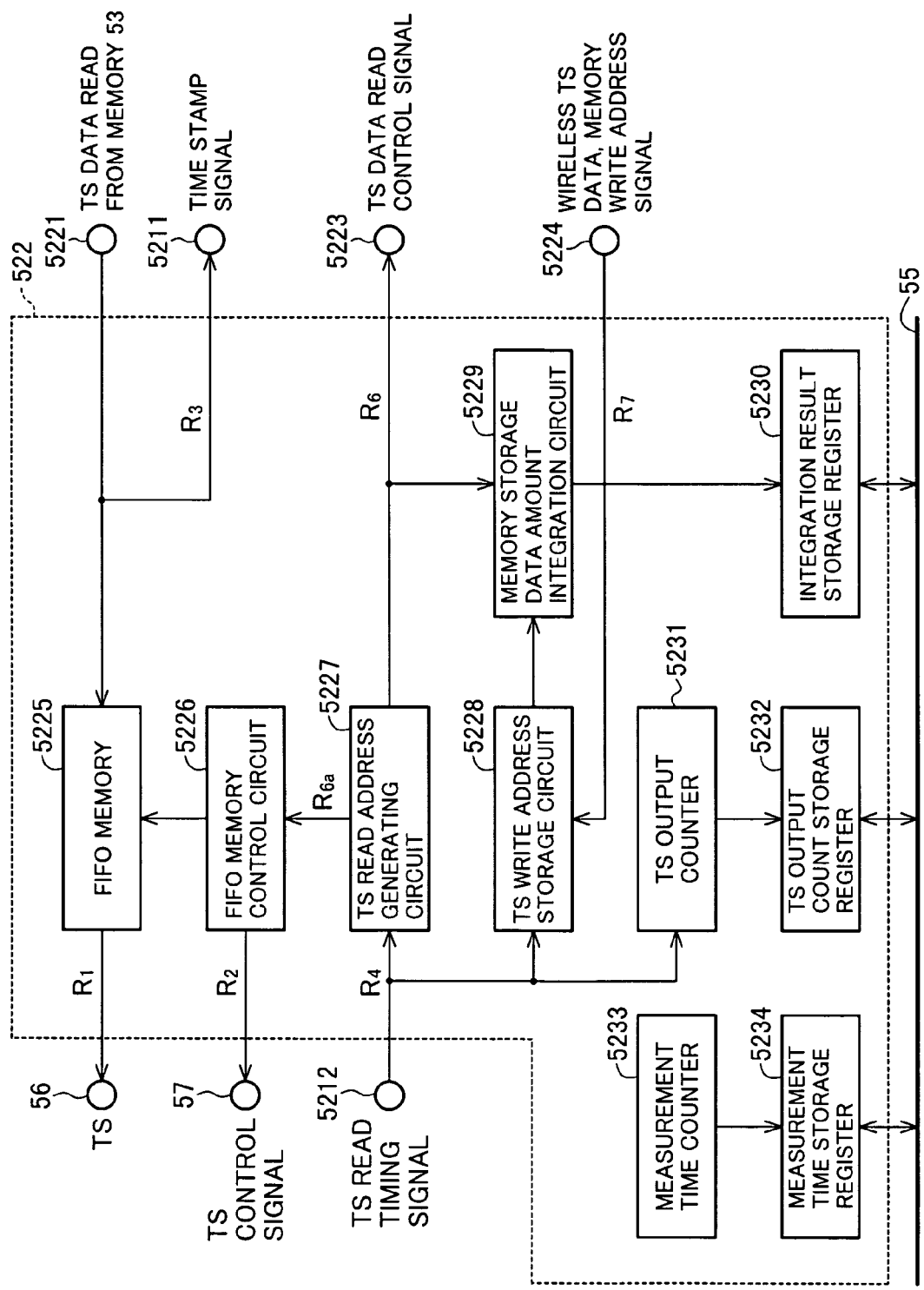
FIG. 9 is a block diagram schematically showing a configuration of a TS memory read control circuit in the receiving-side memory control circuit shown in FIG. 6.

FIG. 9 is a block diagram schematically showing a configuration of the TS memory read control circuit 522 in the receiving-side memory control circuit 52 shown in FIG. 6. As shown in FIG. 9, the TS memory read control circuit 522 includes a FIFO (first-in first-out) memory 5225, a FIFO memory control circuit 5226 for controlling the FIFO memory 5225, a TS read address generating circuit 5227, a TS write address storage circuit 5228, a memory storage data amount integration circuit 5229, an integration result storage register 5230, a TS output counter 5231 for measuring the number of times the TS has been output, a TS output count register 5232 for holding the count obtained by the TS output counter 5231, a measurement time counter 5233, and a measurement time storage register 5234 for holding the count obtained by the measurement time counter 5233.

The TS read address generating circuit 5227 shown in FIG. 9 generates a TS read control signal $R_6$ from the memory 53 (FIG. 5) in accordance with the TS read timing signal $R_4$ through the terminal 5212 of the TS data read timing generating circuit 521 (FIG. 6) and outputs the signal $R_6$ from the terminal 5223. The TS write address storage circuit 5228 stores address information input from the CPU 54 (FIG. 5) through the terminal 5224, i.e., address information $R_7$ to be used when the TS received by the wireless LAN module 51 (FIG. 5) is written into the memory 53 (FIG. 5).

Figure 13:
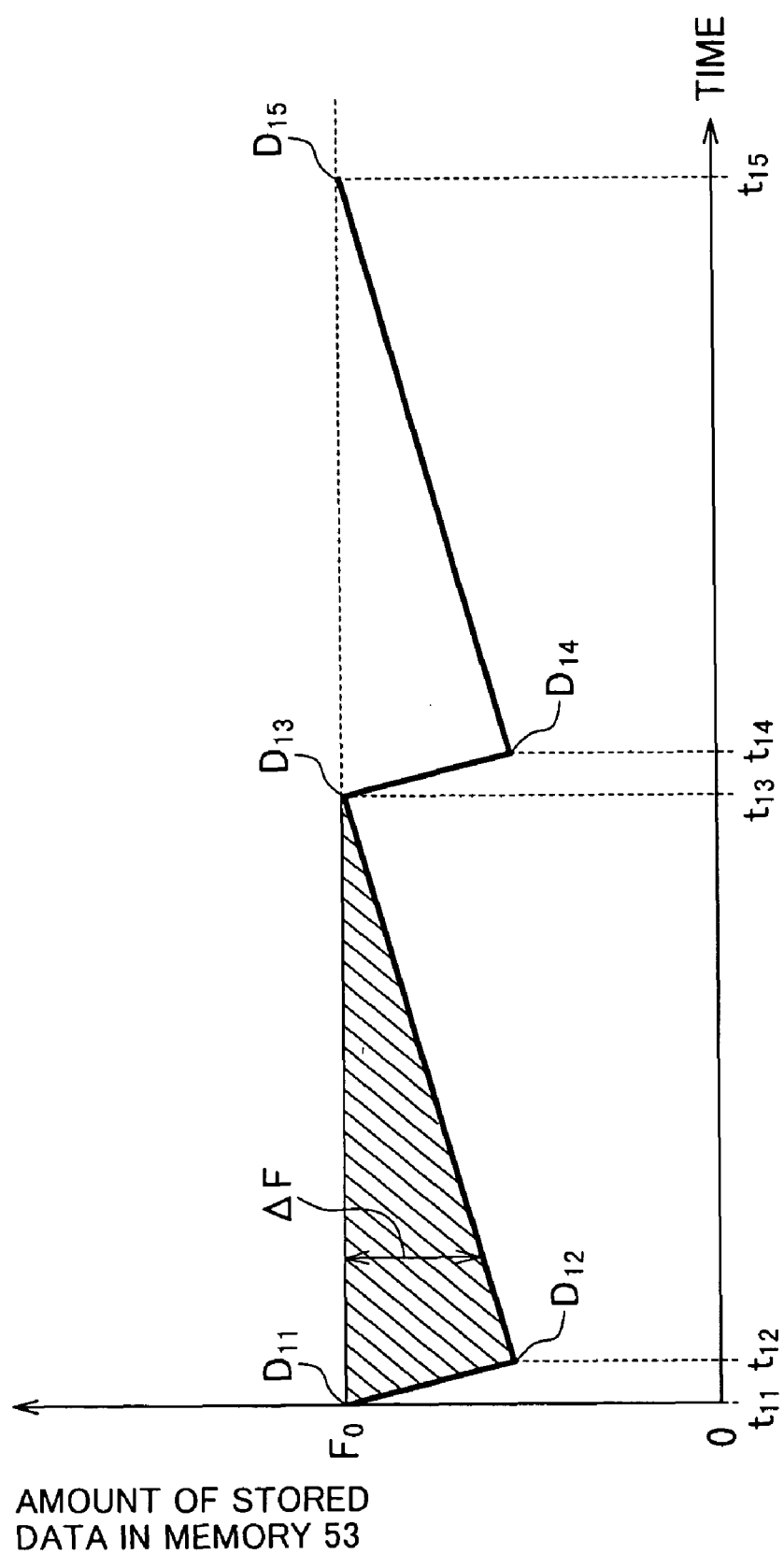
FIG. 13 is a diagram showing fluctuations in the amount of the stored data in the memory of the wireless receiving device when the wireless receiving device of the first to seventh embodiments receives a TS at a VBR.

The memory storage data amount integration circuit 5229 shown in FIG. 9 integrates the amount of the data written (temporarily stored) in the memory 53 (FIG. 5), in accordance with the TS read address information for reading the TS from the memory 53 (FIG. 5), output from the TS read address generating circuit 5227 and the write address information output from the TS write address storage circuit 5228, and outputs the integration result (which is equivalent to the area of the hatched region shown in FIG. 13). The integration result storage register 5230 shown in FIG. 9 holds the integration result output from the memory storage data amount integration circuit 5229. In the first embodiment, when the CPU 54 (FIG. 5) accesses the integration result storage register 5230, the integral obtained by the memory storage data amount integration circuit 5229 and the value of the integration result storage register 5230 are set to the initial value '0'.

The TS output counter 5231 shown in FIG. 9 counts the number of times the TS is output, and the TS output count register 5232 holds the count obtained by the TS output counter 5231. Further, the measurement time counter 5233 shown in FIG. 9 measures the measurement time measured by the memory storage data amount integration circuit 5229 and the TS output counter 5231.

The measurement time storage register 5234 shown in FIG. 9 holds the measurement result output from the measurement time counter 5233. In the first embodiment, when the CPU 54 (FIG. 5) accesses the TS output count register 5232 and the measurement time storage register 5234, the value of the TS output counter 5231, the value of the TS output count register 5232, the value of the measurement time counter 5233, and the value of the measurement time storage register 5234 are set to the initial value '0'.

Figure 10:
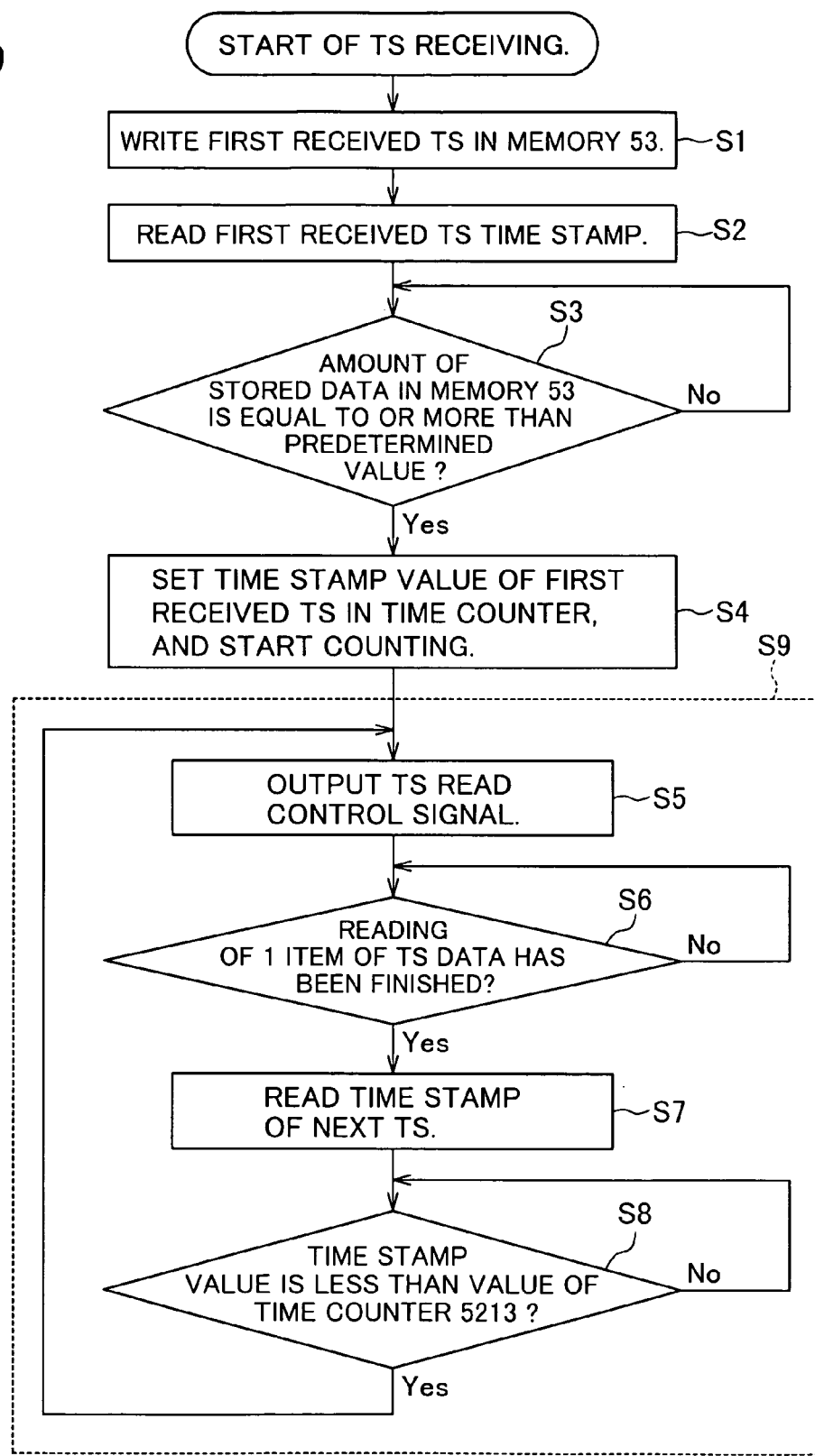
FIG. 10 is a flowchart showing an operation of the receiving-side memory control circuit shown in FIG. 6.
Figure 11:
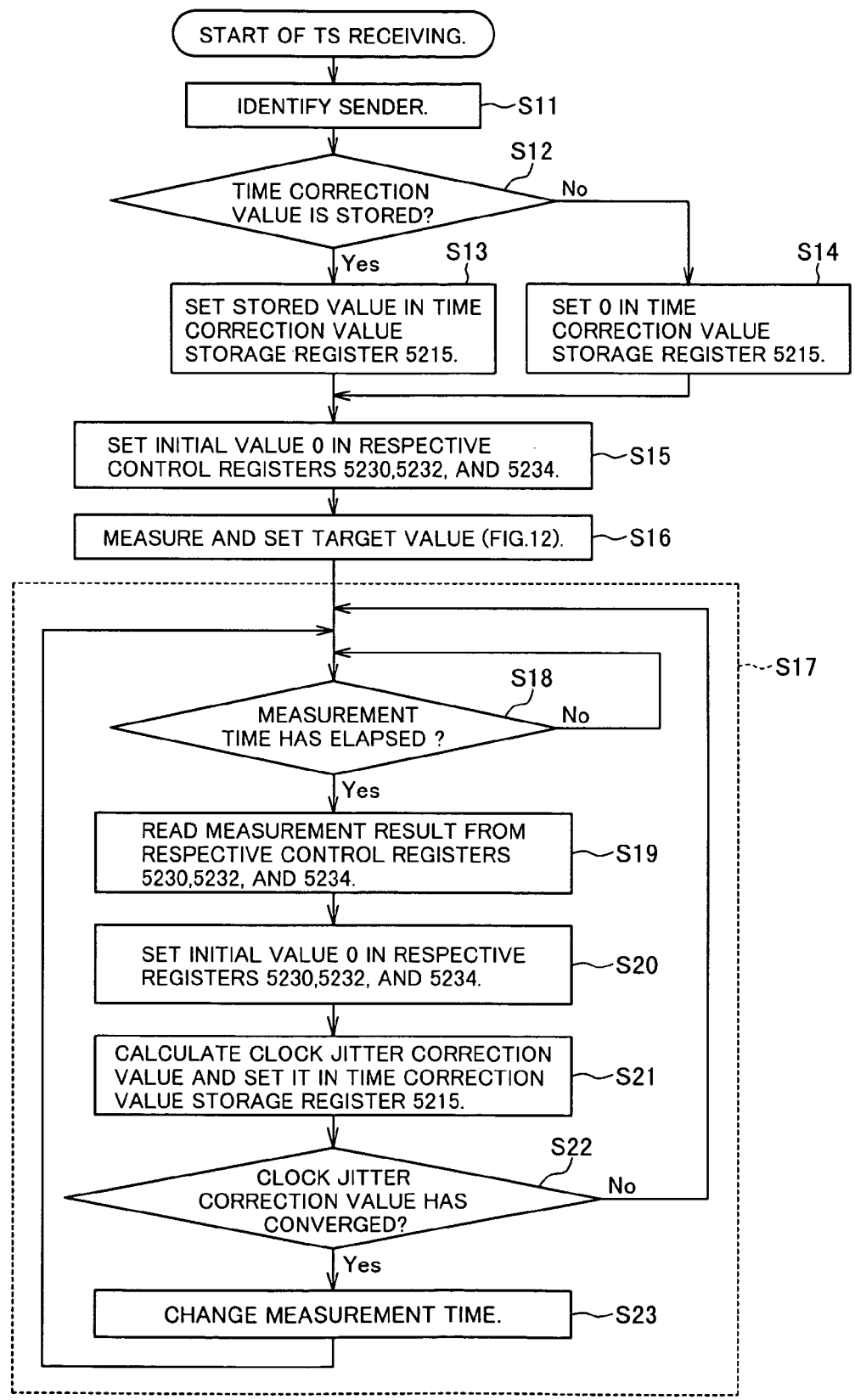
FIG. 11 is a flowchart showing a clock jitter detect operation of the wireless receiving device in the first embodiment.
Figure 12:
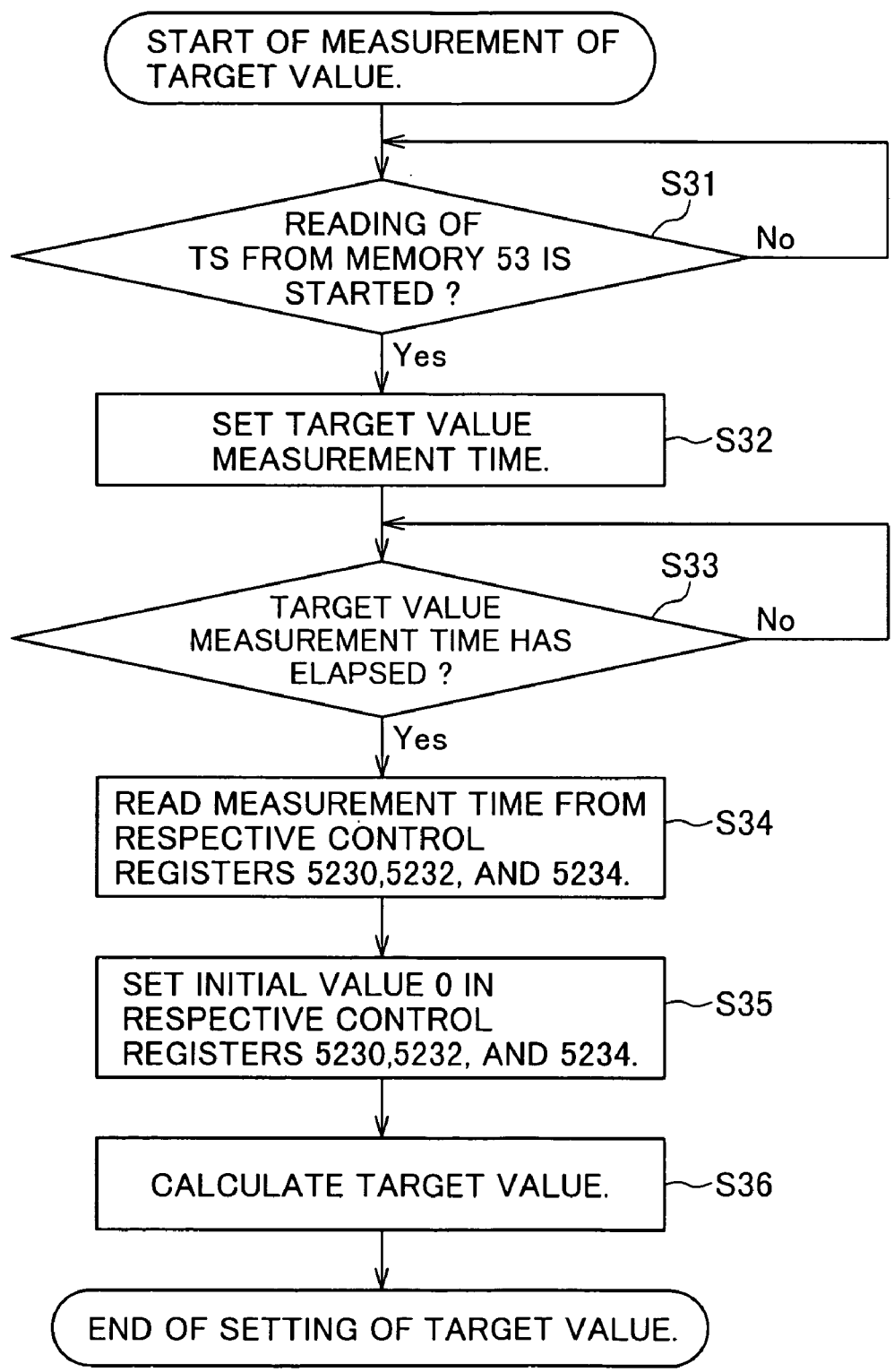
FIG. 12 is a flowchart showing an operation of calculating and setting a target value in a flow shown in FIG. 11.
Figure 14:
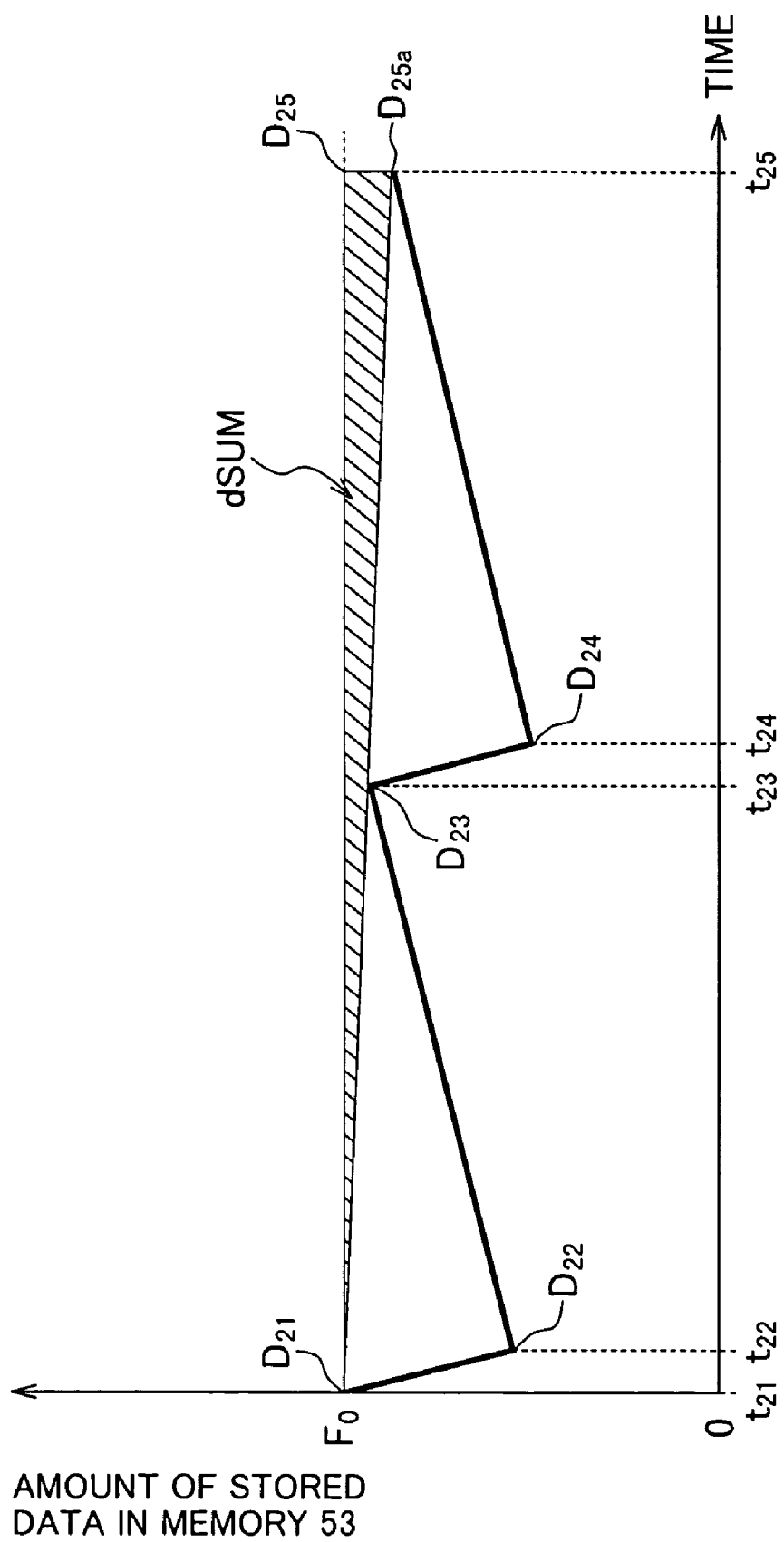
FIG. 14 is a diagram showing fluctuations in the amount of the stored data in the memory of the wireless receiving device when the data transmission system of the first to seventh embodiments has clock jitter.
Figure 15:
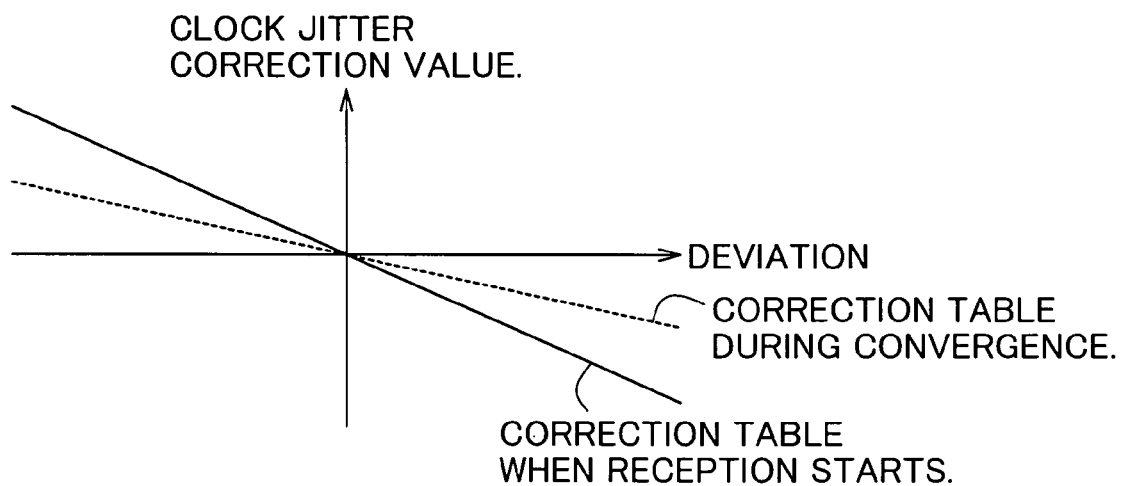
FIG. 15 is a diagram showing a conversion table which the wireless receiving device in the first embodiment holds to calculate a clock jitter correction value.

FIG. 10 is a flowchart showing an operation of the receiving-side memory control circuit 52 in the wireless receiving device 50 when the TS is received. Further, FIG. 11 is a flowchart showing the clock jitter detect operation of the CPU 54 in the wireless receiving device 50 of the first embodiment, and FIG. 12 is a flowchart showing an operation of calculating and setting a target value in the operation shown in FIG. 11 (step S16 in FIG. 11). Furthermore, FIG. 13 is a diagram schematically showing fluctuations in the amount of the data (the number of the TS lines) stored in the memory 53 of the wireless receiving device 50, and FIG. 14 is a diagram schematically showing fluctuations in the amount of the data (the number of the TS lines) temporarily stored in the memory 53 of the wireless receiving device 50 when the data transmission system of the first embodiment has clock jitter (the reference clock in the wireless receiving device 50 is faster than the reference clock in the wireless sending device 40). Moreover, FIG. 15 is a diagram showing an example of an amplitude conversion table used to calculate a clock jitter correction value in each correction value calculation stage (also referred to as a "correction value calculation stage") in which the wireless receiving device 50 in the first embodiment calculates a time correction value (also referred to as a "clock jitter correction value").

The operation of the wireless receiving device 50 which has received a wireless packet sent from the wireless sending device 40, including a TS, will be described below with reference to FIG. 5 to FIG. 15. When the wireless receiving device 50 receives a wireless packet transmitted from the wireless sending device 40, the wireless LAN module 51 (FIG. 5) in the wireless receiving device 50 analyzes the wireless header added to the beginning of the wireless packet to detect the wireless sending device (source) from which the packet has been sent and the wireless receiving device (destination) to which the packet has been sent. If it is detected that the wireless packet is not sent to the wireless receiving device 50, the wireless LAN module 51 (FIG. 5) in the wireless receiving device 50 discards the wireless packet. If the wireless packet is sent to the wireless receiving device 50, the wireless LAN module 51 (FIG. 5) in the wireless receiving device 50 identifies the type of the wireless packet and performs other operations, and outputs the results to the CPU 54 (FIG. 5) in the wireless receiving device 50. The CPU 54 (FIG. 5), which receives the detection result from the wireless LAN module 51 (FIG. 5), if the received data is a time-stamped TS, starts DMA to transfer the time-stamped TS to the memory 53 (FIG. 5) in the wireless receiving device 50. If the data received from the wireless LAN module 51 (FIG. 5) is device control data, the CPU 54 (FIG. 5) performs predetermined processing on the device control data and sends the device control data to device connected by an IEEE1394 interface. The IEEE1394 interface transmits the video stream (a TS signal and a DV signal) and the AV/C command (device control signal) on the same signal line by time division multiplexing. In the first embodiment, the sending and receiving of a TS stream is described in detail, and the IEEE1394 interface and the input and output terminals of the device control signal (AV/C command) are not shown in the figures.

Next, the receiving-side memory control circuit 52 (FIG. 5) in the wireless receiving device 50 writes the TS received by the wireless LAN module 51 (FIG. 5) into the memory 53 (FIG. 5), in accordance with the TS write control signal sent from the CPU 54 (FIG. 5) through the CPU bus 55, and stores the TS temporarily in the memory 53. In the first embodiment, the received TS is written into a first TS storage area 531 (FIG. 7) of the memory 53 (FIG. 5). When the TS is written into the memory 53 (FIG. 5), the TS data read timing generating circuit 521 (FIG. 6) generates a TS read timing signal $R_4$, taking the flow shown in FIG. 10. When the receiving of the TS from the wireless sending device 40 begins, the CPU 54 (FIG. 5) checks whether the memory 53 (FIG. 5) contains an area available to store the TS, and if the two storage areas 531 and 532 shown in FIG. 7 have already been occupied, notifies the wireless sending device 40 that the TS cannot be received, through the wireless LAN module 51 (FIG. 5).

The operation to store the received TS in the storage area will next be described. As shown in FIG. 10, when the wireless LAN module 51 (FIG. 5) starts receiving the TS, the CPU 54 (FIG. 5) in the wireless receiving device 50 determines the storage area in the memory 53 (FIG. 5) to store the received TS and reports the determined storage area to the TS memory read control circuit 522 (FIG. 6) in the receiving-side memory control circuit 52 (FIG. 5). The TS memory read control circuit 522 (FIG. 6) determines the storage area in the memory 53 (FIG. 5) from which the TS is read, in accordance with the determined storage area in the memory 53 (FIG. 5). After the receiving of the TS starts, the TS memory read control circuit 522 (FIG. 6) in the receiving-side memory control circuit 52 (FIG. 5) confirms that the first TS has been written into the memory 53 (FIG. 5) (step S1 of FIG. 10). In the first embodiment, the TS that has been written first at the beginning of the first TS storage area 531 (FIG. 7) in the memory 53 (FIG. 5) after the receiving starts is referred to as a "first TS". The TS memory read control circuit 522 (FIG. 6) in the receiving-side memory control circuit 52 (FIG. 5) can confirm that the writing of the first TS into the first TS storage area 531 (FIG. 7) in the memory 53 (FIG. 5) has been completed, by detecting a change in the write address information output from the TS write address storage circuit 5228 (FIG. 9) in the TS memory read control circuit 522 (FIG. 6) (i.e., by confirming that the write address information has been changed to the address of the second line).

After the writing of the first TS into the memory 53 (FIG. 5) has been confirmed, the TS memory read control circuit 522 (FIG. 6) in the receiving-side memory control circuit 52

(FIG. 5) reads the time stamp added to the first TS stored in the memory 53 (FIG. 5) (step S2 in FIG. 10).

When the reading of the time stamp is finished in step S2 in FIG. 10, the TS memory read control circuit 522 (FIG. 6) in the receiving-side memory control circuit 52 (FIG. 5) waits until the amount of the stored data in the memory 53 (FIG. 5) exceeds a predetermined level (step S3 in FIG. 10). This waiting is provided to allow clock regeneration using the clock frequency of the wireless receiving device 50 for the VBR TS.

When the VBR TS is received, the amount of the TS data stored in the memory 53 (FIG. 5) varies, as shown in FIG. 13, for example. FIG. 13 shows an example when a clock signal of the wireless sending device 40 is synchronized with a clock signal of the wireless receiving device 50. In FIG. 13, the vertical axis represents the amount of the TS data stored in the memory 53 (FIG. 5), and the horizontal axis represents time. The example shown in FIG. 13 is obtained, for example, when MPEG2 video data of the TS output from the AV-HDD recording/reproducing apparatus 22 (FIG. 1) or the like is read in units of frames. To be more specific, the TS transmission of a 20-Mbps HD (high definition) MPEG2 video stream will be described. In the first embodiment, it is assumed that one GOP (group of pictures) has fifteen frames and the amount of the intra-frame data in one GOP is 20% of the entire data amount of one GOP. In the first embodiment, the first TS storage area 531 (FIG. 7) in the memory 53 (FIG. 5) has such a data storage capacity that the data of one GOP can be stored.

In the first embodiment, it is assumed that the PCR (program clock reference) is added to the first TS of each frame and is transmitted at intervals of 33 ms, for the sake of simplifying the description. The throughput in the wireless transmission section between the wireless sending device 40 and the wireless receiving device 50 is about 20 Mbps, and the amount of the TS received by radio is input to the wireless receiving device 50 at an approximately constant ratio. However, data is read from the memory 53 (FIG. 5) in the wireless receiving device 50 in accordance with the time stamp added to the TS, on the basis of the clock frequency in transmitting. When intra-frame data is read from the memory 53 (FIG. 5), data of 20% of the data amount of one GOP is read in a very short period, and the amount of the TS data stored in the memory 53 (FIG. 5) decreases suddenly, as shown in FIG. 13 (a segment $D_{11}D_{12}$ in a period between $t_{11}$ and $t_{12}$ and a segment $D_{13}D_{14}$ in a period between $t_{13}$ and $t_{14}$ in FIG. 13). The amount of the stored data in the memory 53 gradually returns to an initial level $F_0$ over the period of one GOP (a segment $D_{12}D_{13}$ and a segment $D_{14}D_{15}$ in FIG. 13). Actually, the amount of the TS data stored in the memory 53 (FIG. 5) does not change linearly as shown in FIG. 13 (a segment $D_{11}D_{12}$, a segment $D_{12}D_{13}$, a segment $D_{13}D_{14}$, and a segment $D_{14}D_{15}$), but a straight-line segments are used in the first embodiment for ease of understanding the invention. When the receiving starts, the wireless receiving device 50 does not start a data read from the memory 53 (FIG. 5) before a predetermined amount of TS is stored in the memory 53 (FIG. 5), so that the TS stored in the memory 53 (FIG. 5) does not overflow nor underflow. In the first embodiment, the reading of the received TS starts when the memory 53 (FIG. 5) stores the TS of a half of the data amount of one GOP ($F_0$ in FIG. 13).

In step S3 of FIG. 10, when the amount of the stored data in the memory 53 (FIG. 5) exceeds a predetermined level, the time counter control circuit 5214 (FIG. 8) in the TS data read timing generating circuit 521 (FIG. 6) sets the time stamp value added to the first TS as the initial value in the time counter 5213 (FIG. 8), and outputs a control signal to start counting up for time measurement to the time counter 5213 (FIG. 8) (step S4 of FIG. 10). In step S4 of FIG. 10, the time counter 5213 (FIG. 8) in the TS data read timing generating circuit 521 (FIG. 6) starts counting up, and then the time comparator 5216 (FIG. 8) outputs a TS read timing signal $R_4$. The TS read address generating circuit 5227 (FIG. 9) outputs a read control signal $R_6$ for the data of one TS stored in the memory 53 (FIG. 5) from the terminal 5223, in accordance with the TS read timing signal $R_4$ (step S5 of FIG. 10).

The TS read from the memory 53 (FIG. 5) passes the bus arbiter circuit 523 (FIG. 6) in the receiving-side memory control circuit 52 (FIG. 5) and enters the FIFO memory 5225 (FIG. 9) in the TS memory read control circuit 522 (FIG. 6). The FIFO memory 5225 (FIG. 9) accommodates the delay time of the read data and the like between the TS write control signal from the CPU 54 (FIG. 5) and the TS read control signal from the TS memory read control circuit 522 (FIG. 6) in the bus arbitration by the bus arbiter circuit 523 (FIG. 6). In the first embodiment, the FIFO memory control circuit 5226 (FIG. 9) outputs such a read control signal to the FIFO memory 5225 (FIG. 9) that the TS is read from the FIFO memory 5225 (FIG. 9) with a predetermined delay, with reference to the TS read timing signal $R_4$ input from the TS data read timing generating circuit 521 (FIG. 6) in the receiving-side memory control circuit 52 (FIG. 5). The receiving-side memory control circuit 52 (FIG. 5) controls writing into the FIFO memory 5225 (FIG. 9) in the TS memory read control circuit 522 (FIG. 6), with the TS data read control signal $R_{6a}$ (FIG. 9) output from the TS read address generating circuit 5227 (FIG. 9) and a data read finish signal (not shown in FIG. 9, shown in FIG. 6 as signal $R_8$) output from the bus arbiter circuit 523 (FIG. 6) in the receiving-side memory control circuit 52 (FIG. 5), that is, a signal indicating that data read from the memory 53 (FIG. 5) has finished. The data read finish signal (not shown in FIG. 9, shown in FIG. 6 as a signal $R_8$) output from the bus arbiter circuit 523 (FIG. 6) is used also when the TS read address generating circuit 5227 (FIG. 9) generates a TS read address.

When the reading of the data of one TS from the memory 53 (FIG. 5) finishes in step S6 of FIG. 10, the TS read address generating circuit 5227 (FIG. 9) in the TS memory read control circuit 522 (FIG. 6) checks whether the memory 53 (FIG. 5) stores the TS of the next line, on the basis of the write address information stored in the TS write address storage circuit 5228 (FIG. 9), and if the TS is stored, the TS read address generating circuit 5227 generates a TS data read control signal $R_6$ for reading the time stamp of the TS of the next line (step S7 of FIG. 10). If the memory 53 (FIG. 5) does not store the TS of the next line, it is assumed that the memory 53 (FIG. 5) underflows, and the occurrence of underflow is reported to the CPU 54 (FIG. 5). In the first embodiment, when the occurrence of underflow is reported, the CPU 54 (FIG. 5) resets the receiving-side memory control circuit 52 (FIG. 5) to a predetermined initial state and reexecutes the TS receiving (processing starting from step S1 of FIG. 10).

In step S7 of FIG. 10, when the time stamp of the TS of the next line (also referred to as a "next TS") is received, the time comparator 5216 (FIG. 8) in the TS data read timing generating circuit 521 (FIG. 6) compares a time stamp signal $R_3$ and a time count value $R_9$ output from the time counter 5213 (FIG. 8), and if the time count value $R_9$ becomes greater than the input value of the time stamp signal $R_3$ (step S8 of FIG. 10), outputs a TS read timing signal $R_4$. The TS read address generating circuit 5227 (FIG. 9) receives the TS read timing signal $R_4$ and outputs a TS data read control signal $R_6$ (step S5 of FIG. 10).

The receiving-side memory control circuit 52 (FIG. 6) repeats the operation of steps S5 to S8 shown in FIG. 10 (i.e., step S9 surrounded by a broken line). When the reference clock on the receiving side, oscillated by an oscillator of the wireless receiving device 50 becomes faster than the reference clock on the sending side, oscillated by an oscillator of the wireless sending device 40 (i.e., when the clock frequency on the receiving side of the wireless receiving device 50 becomes higher than the clock frequency on the sending side of the wireless sending device 40), a deviation occurs between the reference time on the receiving side (clock frequency on the receiving side), based on the count value of the time counter 5213 (FIG. 8), and the reference time on the sending side (clock frequency on the sending side), based on the time stamp signal. The first embodiment is configured so that the receiving-side memory control circuit 52 (FIG. 6) delays the timing to read the TS temporarily stored in the memory 53 (FIG. 5) by a period based on the deviation.

The clock regeneration flow in the first embodiment will be described with reference to flowcharts shown in FIG. 11 and FIG. 12. When the receiving of the TS starts, the CPU 54 (FIG. 5) in the wireless receiving device 50 identifies the sending device (corresponding to the wireless sending device 40), on the basis of the header information added to the wireless packet (step S11 of FIG. 11). The sending device is identified by either or both of the MAC address added to the header information of the wireless packet and the device identification information (such as an IP address) specific to the sending device, for example. When the MAC address or the IP address is used as the device identification information, the device identification information can be obtained without adding new information to the wireless packet, allowing the processing load on the wireless sending device 40 and the wireless receiving device 50 to be reduced and allowing the sending and receiving to be performed without applying a load on the communication band.

After the sending device is identified, the CPU 54 (FIG. 5) checks whether the time correction value (previous time correction value) of the identified sending device has already been stored in a storage portion of the wireless receiving device 50 (e.g., a part of the memory 53 or another memory not shown), in accordance with the device identification information of the sending device (step S12 of FIG. 11). If the time correction value (i.e., the clock jitter correction value) of the identified sending device has already been stored in the wireless receiving device 50, the CPU 54 (FIG. 5) sets the stored time correction value (clock jitter correction value) as the initial value in the time correction value storage register 5215 (FIG. 8) of the TS data read timing generating circuit 521 (FIG. 6) (step S13 of FIG. 11). If the time correction value of the identified sending device is not stored in the wireless receiving device 50, the CPU 54 (FIG. 5) sets the initial value '0' in the time correction value storage register 5215 (FIG. 8) (step S14 of FIG. 11). If the time correction value (e.g., previous time correction value obtained from past data receiving) is stored in the wireless receiving device 50, the stored previous time correction value is used as the initial value for the following reason. The wireless receiving device 50 regenerates a clock of the VBR TS. The average data transmission rate of the VBR TS is about 20 Mbps, but the average data transmission rate varies greatly in a short period. In a little long period, the average data transmission rate is considered to be almost constant, and the clock jitter value can be estimated. So, the minimum measurement time in the first embodiment is set to the period of one GOP. Since it takes a very long time to estimate the clock jitter value once, the stored previous time correction value is used when the clock regeneration starts, if the wireless receiving device 50 stores the measurement result obtained when the TS was received before (previous time correction value). By doing this, the period until the time correction value converges in a predetermined range (time required to converge the time correction value in step S17 of FIG. 11) can be reduced.

After the initial value is set in the time correction value storage register 5215 (FIG. 8) of the TS data read timing generating circuit 521 (FIG. 6), the CPU 54 (FIG. 5) sets the initial value '0' in the integration result storage register 5230 (FIG. 9), the TS output count register 5232 (FIG. 9), and the measurement time storage register 5234 (FIG. 9) of the TS memory read control circuit 522 (FIG. 6). At the same time, the initial value '0' is set in the memory storage data amount integration circuit 5229 (FIG. 9), the TS output counter 5231 (FIG. 9), and the measurement time counter 5233 (FIG. 9) of the TS memory read control circuit 522 (FIG. 6) (step S15 of FIG. 11). After the registers are initialized, the CPU 54 (FIG. 5) measures and sets the target value (step S16 of FIG. 11). The method of measuring the target value will be described with reference to FIG. 12.

When the receiving of the TS starts, the measurement of the target value starts. When the target value is measured, the CPU 54 (FIG. 5) checks whether the reading of the TS from the memory 53 (FIG. 5) has started (step S31 of FIG. 12). When it is confirmed that the reading of the TS from the memory 53 (FIG. 5) has started, the CPU 54 (FIG. 5) sets a time for measuring the target value (a target value measurement time) in an internal timer (step S32 of FIG. 12). The target value measurement time is set to 0.5 seconds, which is a period of one GOP, for example. The target value measurement time may be set to a period of a plurality of GOPs.

The CPU 54 (FIG. 5) waits until the target value measurement time set in the timer elapses (step S33 of FIG. 12). After a lapse of the target value measurement time, the CPU 54 (FIG. 5) reads the measurement results held in the integration result storage register 5230 (FIG. 9), the TS output count register 5232 (FIG. 9), and the measurement time storage register 5234 (FIG. 9) of the TS memory read control circuit 522 (FIG. 6) (step S34 of FIG. 12). Then, the initial value '0' is set in the integration result storage register 5230 (FIG. 9), the TS output count register 5232 (FIG. 9), and the measurement time storage register 5234 (FIG. 9) (step S35 of FIG. 12). At this time, the memory storage data amount integration circuit 5229 (FIG. 9), the TS output counter 5231 (FIG. 9), and the measurement time counter 5233 (FIG. 9) in the TS memory read control circuit 522 (FIG. 6) are also set to the initial value '0'.

The CPU 54 (FIG. 5) calculates a target value, using the register values. To be more specific, a value $A_{110}$ held in the TS output count register 5232 (FIG. 9) of the TS memory read control circuit 522 (FIG. 6) is divided by a value $B_{110}$ held in the measurement time storage register 5234 (FIG. 9) to obtain a TS average read rate $C_{110}$ ($=A_{110}/B_{110}$). Next, a value $D_{110}$ stored in the integration result storage register 5230 (FIG. 9) is divided by the TS average read rate $C_{110}$ to obtain a target value $E_{110}$ ($=D_{110}/C_{110}$) (step S36 of FIG. 12). In the first embodiment, the memory storage data amount integration circuit 5229 (FIG. 9) integrates difference $\Delta F$ between a reference capacity $F_0$ and the amount of the stored data in the memory, as shown in FIG. 13. Accordingly, in FIG. 13, an area of the hatched region is outputs as the integral $D_{110}$ obtained by the memory storage data amount integration circuit 5229 (FIG. 9). Further, in the first embodiment, the memory storage data amount integration circuit 5229 (FIG. 9) performs integration at a timing in which the TS is read from the memory 53 (FIG. 5). Now, the measuring and setting of the target value $E_{110}$ has finished.

When the measuring and setting of the target value $E_{110}$ is completed, the calculation of the time correction value (clock jitter correction value) starts. The CPU 54 (FIG. 5) waits until a predetermined measurement time elapses (step S18 of FIG. 11). The measurement time in step S18 of FIG. 11 is the period of one GOP, which is the same as the target value measurement time used when the target value is set (step S32 of FIG. 12). After the measurement time elapses in step S18 of FIG. 11, the CPU 54 (FIG. 5) reads the measurements stored in the integration result storage register 5230 (FIG. 9), the TS output count register 5232 (FIG. 9), and the measurement time storage register 5234 (FIG. 9) (step S19 of FIG. 11) and then sets the integration result storage register 5230 (FIG. 9), the TS output count register 5232 (FIG. 9), and the measurement time storage register 5234 (FIG. 9) to the initial value '0' (step S20 of FIG. 11), in the same manner as the target value measurement. At this time, the memory storage data amount integration circuit 5229 (FIG. 9), the TS output counter 5231, and the measurement time counter 5233 are set to the initial value '0' at the same time.

Next, the CPU 54 (FIG. 5) then uses the register values in the same manner as the target value measurement (step S36 of FIG. 12). A value $A_{111}$ stored in the TS output count register 5232 (FIG. 9) is divided by a value $B_{111}$ stored in the measurement time storage register 5234 (FIG. 9) to obtain a TS average read rate $C_{111}$ (=$A_{111}/B_{111}$) in the period. Then, a value $D_{111}$ stored in the integration result storage register 5230 (FIG. 9) is divided by the TS average read rate $C_{111}$ to obtain measurement a value $E_{111}$ (=$D_{111}/C_{111}$).

The deviation (i.e., difference) between the measurement value $E_{111}$ and the target value $E_{110}$ is calculated, and a value corresponding to the calculated deviation is referred to as a "time correction value" (clock jitter correction value). In the first embodiment, two predetermined conversion tables as shown in FIG. 15, which are conversion tables associating calculated deviations with clock jitter correction values, are prepared for the clock jitter correction value, and the clock jitter correction value is calculated accordingly. The number of the conversion tables to be prepared may be one or three or more than three.

Next, the clock jitter value dSUM will be described in detail with reference to FIG. 14. In FIG. 14, the clock frequency on the receiving side of the wireless receiving device 50 is higher than the clock frequency on the sending side of the wireless sending device 40, and the reference clock of the wireless receiving device 50 is faster than the reference clock of the wireless sending device 40. The actual clock frequency deviation depends on the precision of the oscillator of the wireless sending device 40 and the oscillator of the wireless receiving device 50. If a crystal oscillator is used, the maximum clock deviation becomes around ±100 ppm (parts per million). In FIG. 14, the clock jitter value dSUM is exaggerated for ease of understanding (the shown gradient of a segment $D_{21}D_{25a}$ with reference to a segment $D_{21}D_{25}$ is greater than the real gradient). Since the clock frequency on the receiving side of the wireless receiving device 50 is higher than the clock frequency on the sending side of the wireless sending device 40, the time counter 5213 (FIG. 8) in the wireless receiving device 50 counts up faster, gradually decreasing the amount of the TS data stored in the memory 53 (FIG. 5) (as indicated by a segment $D_{21}D_{25a}$ shown in FIG. 14). In this case, the deviation between the clock frequency on the receiving side and the clock frequency on the sending side is constant (not varying with a change in the TS input rate or the like). Accordingly, the hatched region shown in FIG. 14 corresponds to the clock jitter value dSUM (a value corresponding to the difference between the measurement value $E_{111}$ and the target value $E_{110}$). Therefore, the CPU 54 (FIG. 5) calculates a clock jitter correction value depending on the clock jitter value. Then, the CPU 54 (FIG. 5) sets the calculated clock jitter correction value in the time correction value storage register 5215 (FIG. 8) (step S21 of FIG. 11). The calculated clock jitter correction value is based on the result controlled with the time correction value storage register 5215 (FIG. 8), and the clock jitter value calculated by the algorithm is the difference. Therefore, when the clock jitter correction value is set in the time correction value storage register 5215 (FIG. 8), the calculated clock jitter correction value is added to the current clock jitter correction value.

In the first embodiment, when the clock jitter correction value is calculated, the TS average read rates $C_{110}$ (when the target value $E_{110}$ is calculated) and $C_{111}$ (when the measurement value $E_{111}$ is calculated) are used for the following reason. To make it easier to control the timing of the integration of the amount of the stored data in the memory 53 (FIG. 5) by the memory storage data amount integration circuit 5229 (FIG. 9), the data reading is performed in synchronization with the timing in which the TS read address generating circuit 5227 (FIG. 9) reads the TS from the memory 53 (FIG. 5). The clock jitter value to be obtained (corresponding to the integral of the hatched region in FIG. 14) varies between when the TS with an average data transfer rate of 20 Mbps is received and when the TS with an average data transfer rate of 5 Mbps is received. Therefore, for the normalization, the clock jitter value is normalized by using the average read rate of the TS.

A clock regeneration method using the clock jitter correction value will next be described. The time counter control circuit 5214 (FIG. 8) in the TS data read timing generating circuit 521 (FIG. 6) adds the clock jitter correction value held in the time correction value storage register 5215 (FIG. 8) to the count value of the time counter 5213 at intervals of a predetermined period (at intervals of 100 ms in the first embodiment), to correct the output value of the time counter 5213 (FIG. 8). In the example shown in FIG. 14, the clock frequency on the receiving side of the wireless receiving device 50 is higher than the clock frequency on the sending side of the wireless sending device 40, and the amount of the stored data in the memory 53 (FIG. 5) is decreasing. In that case, the time counter 5213 counts down by the clock jitter correction value once in 100 ms (the time is forced to be delayed). By delaying the time by the clock jitter correction value, the reference time based on the clock frequency in the wireless receiving device 50 can be brought closer to the reference time based on the clock frequency in the wireless sending device 40.

In the wireless receiving device 50 of the first embodiment, the time correction value (clock jitter correction value) held in the time correction value storage register 5215 (FIG. 8) is added as an offset to the count value of the time counter 5213 (FIG. 8) in the TS data read timing generating circuit 521 (FIG. 6) at constant intervals in clock regeneration (clock jitter correction), so that appropriate clock can be regenerated without changing the system clock frequency of the wireless receiving device 50. Accordingly, with the wireless receiving device 50 of the first embodiment (or with the data receiving method of the first embodiment), the clock regeneration for the received TS's can be concurrently executed, by storing the TS's sent from a plurality of wireless sending devices separately in different storage areas of the memory 53 (FIG. 5), providing the time counter 5213 (FIG. 8) corresponding to each storage area to use the read timing of each of the TS's sent from the plurality of wireless sending devices.

When the calculating and setting of the clock jitter correction value is finished, the CPU 54 (FIG. 5) checks whether the clock jitter correction value has converged. To be more specific, it is determined that the value has converged when the calculated clock jitter correction value is within a predetermined range (step S22 of FIG. 11). If it is determined that the value has not converged, the clock jitter measurement restarts under the same measurement conditions. If it is determined that the value has converged, the measurement time is changed (step S23 of FIG. 11), and the clock jitter measurement restarts (step S18 and later in FIG. 11). It is preferable that the conversion table for calculating the clock jitter correction value be changed from the conversion table represented by a solid line (a straight line having a large gradient) in FIG. 15 to the conversion table represented by a broken line (a straight line having a smaller gradient). The reason is as follows: The clock jitter value depends on the deviation in system clock frequency and becomes approximately constant for predetermined device. When the clock jitter correction value is brought into a predetermined convergence range (e.g., immediately after the receiving starts), the gain of clock jitter correction value calculation (the gradient of the straight line representing the conversion table) is increased to reduce the time to bring in the value. After the clock jitter correction value is brought into a predetermined convergence range, the gain is decreased to improve the stability of the system. Accordingly, the time to bring in the clock jitter correction value into the convergence range can be reduced. After the clock jitter correction value is brought into the convergence range, the wireless receiving device 50 operates with stability. In the first embodiment, the measurement time is increased to improve the precision of the measurement value and to operate the wireless receiving device 50 with stability after the clock jitter correction value has converged. In the first embodiment, the PLL (phase-locked loop) control and the like are not used even after the clock jitter value has converged, so that the clock jitter correction value must be continuously updated when data is received.

As has been described above, with the data receiving method of the first embodiment (the wireless receiving device 50 of the first embodiment), the TS can be continuously output without underflow or overflow even when the VBR TS transmitted with jitter by radio is received. Therefore, when the MPEG2 TS is decoded and reproduced by the device on the receiving side, the MPEG2 data can be reproduced without interruption in video.

With the data receiving method of the first embodiment (the wireless receiving device 50 of the first embodiment), the receiving-side memory 53 has a plurality of storage areas, the packet data output from a plurality of data sending devices of a single wireless receiving device 50 can be received, and data can be output continuously without underflow or overflow in the received packet data. The receiving-side memory 53 has a plurality of storage areas, allowing a plurality of streams to be handled in a simple circuit configuration, suppressing the circuit size and reducing the power consumption and the production cost.

Second Embodiment

Figure 16:
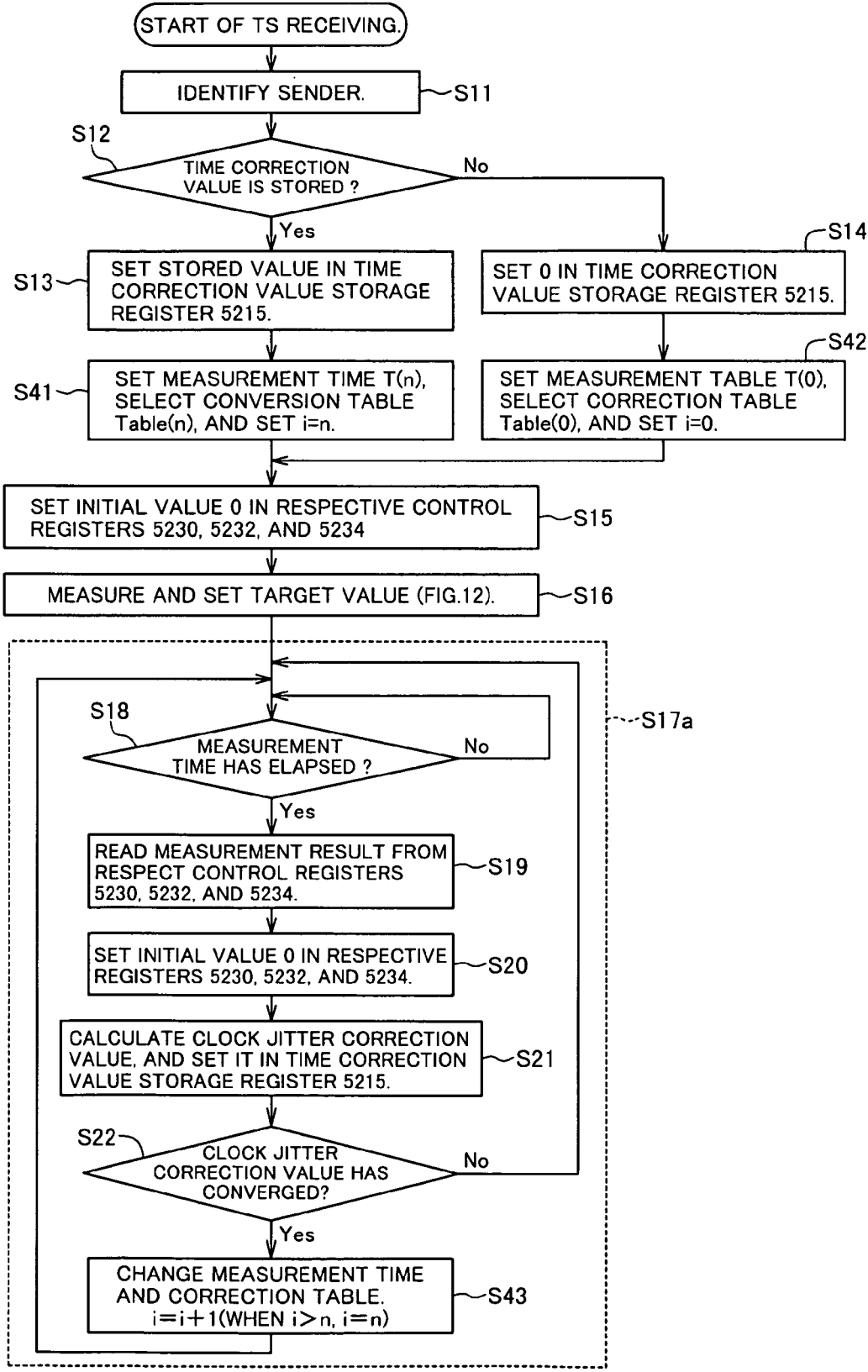
FIG. 16 is a flowchart showing a clock jitter detect operation of the wireless receiving device in the second embodiment.
Figures 17, 18:
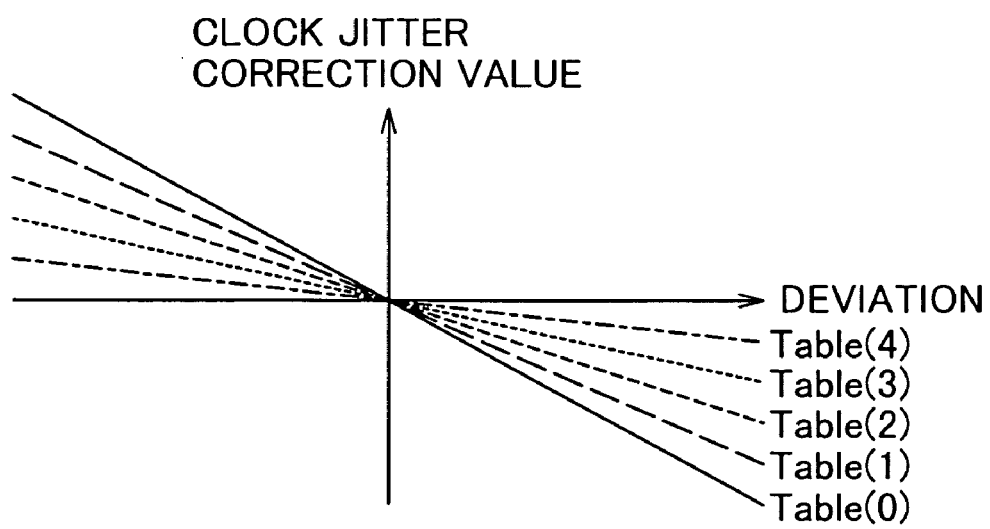
FIG. 17 is a diagram showing a table used by the wireless receiving device in the second embodiment to select a conversion table.
FIG. 18 is a diagram showing a conversion table which the wireless receiving device in the second embodiment uses to calculate a clock jitter correction value.

FIG. 16 is a flowchart showing a clock jitter detect operation of a wireless receiving device in a second embodiment of the present invention. Further, FIG. 17 is a diagram showing a table used to select a conversion table by the wireless receiving device in the second embodiment. Furthermore, FIG. 18 is a diagram showing a conversion table used to calculate a clock jitter correction value by the wireless receiving device in the second embodiment.

A data receiving method in the second embodiment is the same as the data receiving method in the first embodiment, except for the integration method of the memory storage data amount integration circuit 5229 (FIG. 9), the clock jitter correction value convergence determination method, and the clock jitter detection method. To be more specific, the second embodiment differs from the first embodiment in the following points. In the first embodiment, the timing at which the memory storage data amount integration circuit 5229 (FIG. 9) integrates the amount of the TS data stored in the memory 53 (FIG. 5) is synchronized with the timing at which the TS read address generating circuit 5227 (FIG. 9) in the TS memory read control circuit 522 (FIG. 6) reads the TS from the memory 53 (FIG. 5), for ease of control. In the second embodiment, the timing of integrating the amount of the stored TS data matches a predetermined timing based on the clock frequency on the receiving side in the wireless receiving device. FIG. 1 to FIG. 10 and FIG. 12, which are provided to describe the first embodiment, are also used to describe the second embodiment. In FIG. 16, the steps identical to the steps in FIG. 11 will be denoted by the same reference marks.

The clock regeneration flow in the wireless receiving device 50 when a wireless packet containing the TS sent from the wireless sending device 40 in the second embodiment will be described, with reference to FIG. 16 and FIG. 12. As shown in FIG. 16, when the receiving of the TS starts, the CPU 54 (FIG. 5) in the wireless receiving device 50 identifies the sending device (corresponding to the wireless sending device 40) in accordance with the header information added to the wireless packet (step S11 of FIG. 16). The sending device is identified by either or both of the MAC address added to the header information of the wireless packet and the device identification information (such as the IP address) specific to the sending device, for example. If the MAC address or the IP address is used as the device identification information, the device identification information can be obtained without adding any additional information to the wireless packet, so that the processing load on the wireless sending device 40 and the wireless receiving device 50 can be reduced, and the sending and receiving can be performed without applying the load on the communication band.

After the sending device is identified, the CPU 54 (FIG. 5) in the wireless receiving device 50 checks whether a storage section (e.g., a part of the memory 53 or another memory, not shown in the figure) in the wireless receiving device 50 already stores the time correction value of the sending device identified earlier (also referred to as a "previous time correction value"), in accordance with the device identification information of the sending device (step S12 of FIG. 16).

If the wireless receiving device 50 is found to contain the previous time correction value (clock jitter correction value) in step S12 of FIG. 16, the CPU 54 (FIG. 5) sets the stored previous time correction value as the initial value in the time correction value storage register 5215 (FIG. 8) of the TS data read timing generating circuit 521 (FIG. 6) (step S13 of FIG. 16). Then, a measurement time T(n) used to measure the target value is set, a conversion table Table(n) used to calculate the clock jitter correction value is set (step S41 of FIG. 16), where n is i. As shown in FIG. 17, i in the second embodiment can take five values of 0 to 4. The measurement time T(n) and the conversion table Table(n) for calculating the clock jitter correction value can be switched by changing the value of i in accordance with the result of convergence in the calculation of the clock jitter correction value.

If the wireless receiving device 50 is not found to contain the previous time correction value in step S12 of FIG. 16, the initial value '0' is set in the time correction value storage register 5215 (FIG. 8) (step S14 of FIG. 16). Then, with n=i=0, the measurement time is set to T(0), and the conversion table for calculating the clock jitter correction value is set to Table(0) (step S42 of FIG. 16), for the following reason:

In the clock regeneration for the VBR TS, the average data transmission rate varies greatly in a short unit time of the measurement time, in the same manner as the first embodiment. In a little long period, the average data transmission rate is considered to be almost constant, and the clock jitter value can be estimated. However, there is no guarantee that the amount of the received data in one GOP used in the first embodiment is not necessarily constant. Therefore, the measurement time must be extended to estimate the clock jitter value with a much higher precision. On the other hand, when the clock frequency deviation between the crystal oscillators of the wireless sending device 40 and the wireless receiving device 50 is −100 ppm (parts per million) with respect to the center frequency of the wireless sending device 40, and is +100 ppm with respect to the center frequency of the wireless receiving device 50 and when the system clock is 27 MHz, the device has the following system clock frequency:

Clock frequency of the wireless sending device 40=26.9973 MHz

Clock frequency of the wireless receiving device 30=27.0027 MHz

Accordingly, the difference in the clock count per second is 5400 (=27.0027 MHz−26.9973 MHz=0.0054 MHz), and the amount of the time deviation per second is (5400/27 MHz) seconds, i.e., about 200 μs.

On the other hand, since the maximum value of the permissible jitter of the TS is 50 μs, the wireless receiving device 50 must converge the clock jitter correction as early as possible. The minimum control unit of VBR is one GOP. In addition, when the sending and receiving start, the clock jitter correction control in units of GOPs starts. Therefore, the clock jitter value must be suppressed to below a predetermined level of clock frequency deviation as early as possible. Accordingly, a plurality of measurement times and a plurality of jitter correction tables are provided for the estimation of the clock jitter value. When the sending and receiving start (and in a period immediately after the sending and receiving start), rough adjustment is executed to converge the clock jitter value rapidly (rough clock jitter correction), and fine adjustment (high-precision clock jitter correction) is executed in accordance with the degree of convergence of the clock jitter value. In the second embodiment, if the measurement result carried out in previous TS receiving from the wireless sending device 40 is stored, the system operation can be stabilized from the beginning of receiving by using the stored time correction value (i.e., by using the time correction value which can suppress the clock frequency deviation), in the same manner as the first embodiment.

After completing the setting of the measurement time T(n) and the conversion table Table(n) for calculating the clock jitter correction value, the CPU 54 (FIG. 5) sets the initial value '0' in the integration result storage register 5230 (FIG. 9), the TS output count register 5232 (FIG. 9), and the measurement time storage register 5234 (FIG. 9) in the TS memory read control circuit 522 (FIG. 6). At this time, the memory storage data amount integration circuit 5229 (FIG. 9), the TS output counter 5231, and the measurement time counter 5233 in the TS memory read control circuit 522 (FIG. 6) are also set to the initial value '0' (step S15 of FIG. 16).

After the initialization of the registers is finished, a target value is measured and set (step S16 of FIG. 16). The method of measuring the target value in the second embodiment will be described below with reference to FIG. 12.

In the second embodiment, the wireless receiving device 50 starts measuring a target value when the receiving of the TS starts, in the same manner as the first embodiment. The operation of steps S31 to S33 of FIG. 12 is the same as the corresponding operation in the first embodiment. In the second embodiment, an example with the measurement time of target value measurement (referred to as a "target value measurement time") set to 2 seconds will be described. After the target value measurement time has elapsed (2 seconds after the first TS received is read), the CPU 54 (FIG. 5) reads the measurement results held in the integration result storage register 5230 (FIG. 9), the TS output count register 5232 (FIG. 9), and the measurement time storage register 5234 (FIG. 9) of the TS memory read control circuit 522 (FIG. 6) (step S34 of FIG. 12). At the same time, the integration result storage register 5230 (FIG. 9), the TS output count register 5232 (FIG. 9), and the measurement time storage register 5234 (FIG. 9) are initialized to '0' (step S35 of FIG. 12). At this time, the memory storage data amount integration circuit 5229 (FIG. 9), the TS output counter 5231 (FIG. 9), and the measurement time counter 5233 (FIG. 9) in the TS memory read control circuit 522 (FIG. 6) are also set to initial value '0'.

Next, the CPU 54 (FIG. 5) calculates the target value, using the various kind of register values. To be more specific, a value $A_{120}$ held in the TS output count register 5232 (FIG. 9) of the TS memory read control circuit 522 (FIG. 6) is divided by a value $B_{120}$ held in the measurement time storage register 5234 (FIG. 9) to calculate a TS average read rate $C_{120}$ (=$A_{120}/B_{120}$), and the calculation result is stored. Next, the CPU 54 (FIG. 5) divides a value $D_{120}$ held in the integration result storage register 5230 (FIG. 9) by the value $B_{120}$ held in the measurement time storage register 5234 (FIG. 9) to calculate a target value $E_{120}$ (=$D_{120}/B_{120}$) (step S36 of FIG. 12). In the second embodiment, a difference ΔF between the reference capacity $F_0$ and the amount of the stored data in the memory is integrated, as shown in FIG. 13, in the same manner as the first embodiment. The value equivalent to an area of the hatched region in FIG. 13 is output as the integral $D_{120}$ in the memory storage data amount integration circuit 5229 (FIG. 9). In the second embodiment, the integration time of the memory storage data amount integration circuit 5229 (FIG. 9) is created on the basis of the reference clock of the wireless receiving device 50, which differs from the first embodiment, in which the integration timing in the memory storage data amount integration circuit 5229 (FIG. 9) is synchronized with the TS read timing. When the target value is set, the integral of the memory storage data amount integration circuit 5229 (FIG. 9) is divided by the measurement time to obtain the target value, although the integral of the memory storage data amount integration circuit 5229 (FIG. 9) is divided by the average read rate of the TS read from the memory 53 (FIG. 5) in the first embodiment.

After the target value is measured and set as described above, the calculation of the clock jitter correction value starts. The CPU 54 (FIG. 5) waits until a predetermined measurement time T(n) elapses (step S18 of FIG. 16). In the second embodiment, the measurement time T(n) is set on the basis of i=n shown in FIG. 17. If the clock jitter correction value has already been obtained (i=4), the measurement time T(n) is set to 8 seconds (i=4 in FIG. 17). If the clock jitter correction value is not obtained, the measurement time T(n) is set to 0.5 seconds (i=0 in FIG. 17). After a lapse of measurement time T(n), the CPU 54 (FIG. 5) reads the results of measurement held in the integration result storage register 5230 (FIG. 9), the TS output count register 5232 (FIG. 9), and the measurement time storage register 5234 (FIG. 9) in the TS memory read control circuit 522 (FIG. 6) (step S19 of FIG. 16) and resets the integration result storage register 5230 (FIG. 9), the TS output count register 5232 (FIG. 9), and the measurement time storage register 5234 (FIG. 9) to the initial value '0' (step S20 of FIG. 16), in the same manner as the target value measurement. The memory storage data amount integration circuit 5229 (FIG. 9), the TS output counter 5231 (FIG. 9), and the measurement time counter 5233 (FIG. 9) are also set to the initial value '0'.

Next, the CPU 54 (FIG. 5) calculates the measurement value, using register values, in the same manner as the target value measurement (step S36 of FIG. 12). To be more specific, a value $A_{121}$ held in the TS output count register 5232 (FIG. 9) is divided by a value $B_{121}$ held in the measurement time storage register 5234 (FIG. 9) to obtain a TS average read rate $C_{121}$ ($=A_{121}/B_{121}$) in the period. It is checked whether the TS read data rate changes, exceeding a predetermined level within the measurement period, from the TS average read rate information. If the TS average read rate $C_{121}$ changes, exceeding a predetermined level, the routine of setting the target value is reexecuted to change the target value, in the second embodiment, for the following reason. The clock jitter value depends on the frequency deviation between the system clocks of the wireless sending device 40 and the wireless receiving device 50. Accordingly, a change in read rate during receiving does not change the clock jitter value. In the second embodiment, after a predetermined amount of TS is stored in the memory 53 (FIG. 5), the read control starts. If the TS average read rate changes in the wireless receiving device 50, a delay time for a predetermined number of the TS's stored in the memory 53 (FIG. 5) is provided. If the average read data rate changes from 20 Mbps to 12 Mbps, the average amount of the stored data in the memory 53 (FIG. 5) decreases by the amount corresponding to the delay time, or the difference (8 Mbps) in TS read rate, in comparison with the amount of the TS stored in the memory 53 (FIG. 5) when 20-Mbps TS is received. If the average read data rate increase from 8 Mbps to 20 Mbps, the average amount of the stored data in the memory 53 (FIG. 5) increases by the amount corresponding to the delay time, or the difference in TS read rate (12 Mbps). Accordingly, it is determined in the second embodiment whether the target value is reset in accordance with the calculated TS average read rate.

If the target value does not need to be reset, a value $D_{121}$ held in the integration result storage register 5230 (FIG. 9) of the TS memory read control circuit 522 (FIG. 6) is divided by a value $B_{121}$ stored in the measurement time storage register 5234 (FIG. 9) to obtain a measurement value $E_{121}$ ($=D_{121}/B_{121}$).

The deviation (difference) between the measurement value $E_{121}$ (measurement value obtained for a TS received after the first TS) and the target value $E_{120}$ (measurement value obtained for the first TS) is calculated, and the value corresponding to the calculated deviation is set as a time correction value (clock jitter correction value). In the second embodiment, a plurality of conversion tables (five conversion tables in the second embodiment) associating the calculated result (deviation) and the clock jitter correction value are provided, as shown in FIG. 18, and the clock jitter correction table is switched in accordance with the value of i, to calculate the clock jitter correction value. The calculated result is set as the clock jitter correction value in the time correction value storage register 5215 (FIG. 8) (step S21 of FIG. 16). The calculated clock jitter correction value is based on the result obtained through control by the time correction value storage register 5215 (FIG. 8), so that the clock jitter value calculated by the algorithm is the difference, in the same manner as the first embodiment. When the clock jitter correction value is set in the time correction value storage register 5215 (FIG. 8) of the TS data read timing control circuit 521 (FIG. 6), the sum of the current clock jitter correction value and the calculated clock jitter correction value is set.

Next, the method of regenerating a clock by using the clock jitter correction value will be described. In the same manner as the first embodiment, the time counter control circuit 5214 (FIG. 8) in the TS data read timing generating circuit 521 (FIG. 6) corrects the output value of the time counter 5213 (FIG. 8) by adding the clock jitter correction value stored in the time correction value storage register 5215 (FIG. 8) to the time counter value at predetermined time intervals (at intervals of 100 ms in the second embodiment). In the example shown in FIG. 14, the clock frequency on the receiving side of the wireless receiving device 50 is higher than the clock frequency on the sending side of the wireless sending device 40, and the amount of the stored data in the memory 53 (FIG. 5) is decreasing. In this case, the time of the time counter 5213 is delayed (i.e., is forced to be delayed) by the amount corresponding to the clock jitter correction value once in 100 ms. The reference time based on the clock frequency of the wireless receiving device 50 can be brought closer to the reference time based on the clock frequency of the wireless sending device 40 by delaying the time by the amount corresponding to the clock jitter correction value.

After the clock jitter correction value is calculated and set, the CPU 54 (FIG. 5) checks whether the clock jitter correction value has converged. To be more specific, if the calculated clock jitter correction value is within a predetermined range, it is determined that the value has converged (step S22 of FIG. 16). If it is determined that the value does not converge, the clock jitter measurement is conducted again under the same measurement conditions. If it is determined that the value has converged, the measurement time T(n) and clock jitter calculation table Table(n) are changed, and then the clock jitter measurement is performed again (i=i+1 is also performed) (step S43 of FIG. 16). In the meantime, the conversion table for calculating the clock jitter correction value is modified, as shown in FIG. 18. If i=4, it is determined that the convergence has been completed, and the measurement time and the clock jitter correction table are not changed.

The control operation is performed for the following reason, which is the same as the reason in the first embodiment. Clock jitter depends on the deviation in system clock frequency, and the value is almost constant for predetermined device. Therefore, when the clock jitter correction value is brought into a predetermined convergence range, the gain of clock jitter correction value calculation (gradient of segments in FIG. 18) is increased to reduce the time to bring in the value. After the clock jitter correction value is brought into a predetermined convergence range, the gain of clock jitter correction value calculation is decreased to improve the stability of the system. By switching the control operation in a plurality of stages, the system can converge earlier, and the stability in system operation can be improved even before the convergence. Similarly, the measurement time is increased to improve the precision of the measurement value and to stabilize the system in the convergence. In the second embodiment, PLL control and the like are not used even after the clock jitter value has converged, so that clock jitter correction value must be continuously updated when data is received.

As has been described above, with the data receiving method of the second embodiment, the TS can be continuously output without underflow or overflow even if the VBR TS transmitted by radio with jitter is received. Therefore, when the MPEG2 TS is decoded and reproduced by the device on the receiving side, the MPEG2 data can be reproduced without interruption in video. Except for the above described points, the second embodiment is the same as the first embodiment.

Further, with the data receiving method of the second embodiment, the target value used to calculate the deviation in clock frequency is reset when the average read rate varies greatly. Accordingly, the clock regeneration can be performed even if the average read rate of the received data changes. Therefore, when the MPEG2 TS is decoded and reproduced by the device on the receiving side, the MPEG2 data can be reproduced without interruption in video.

Third Embodiment

The data receiving method according to the third embodiment of the present invention differs from the data receiving method according to the first embodiment in the clock jitter detect operation by the CPU 54 in the wireless receiving device 50. Except for this point, the data receiving method according to the third embodiment is the same as the data receiving method according to the first embodiment. Therefore, FIG. 1 to FIG. 10, FIG. 13, and FIG. 14, which are used to describe the first embodiment, are also used to describe the third embodiment.

Figure 19:
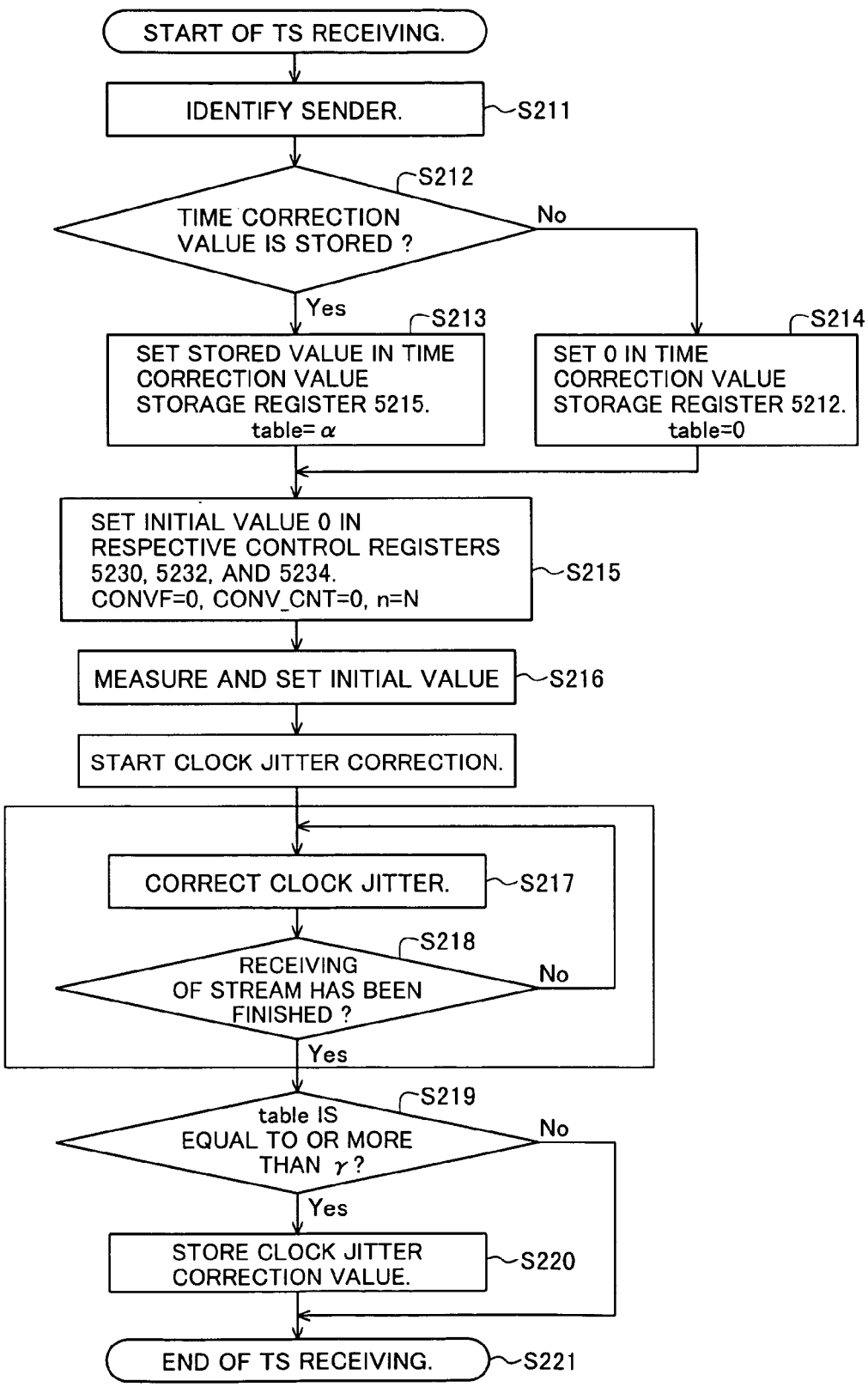
FIG. 19 is a flowchart showing a clock jitter detect operation of the wireless receiving device in the third embodiment.
Figure 20:
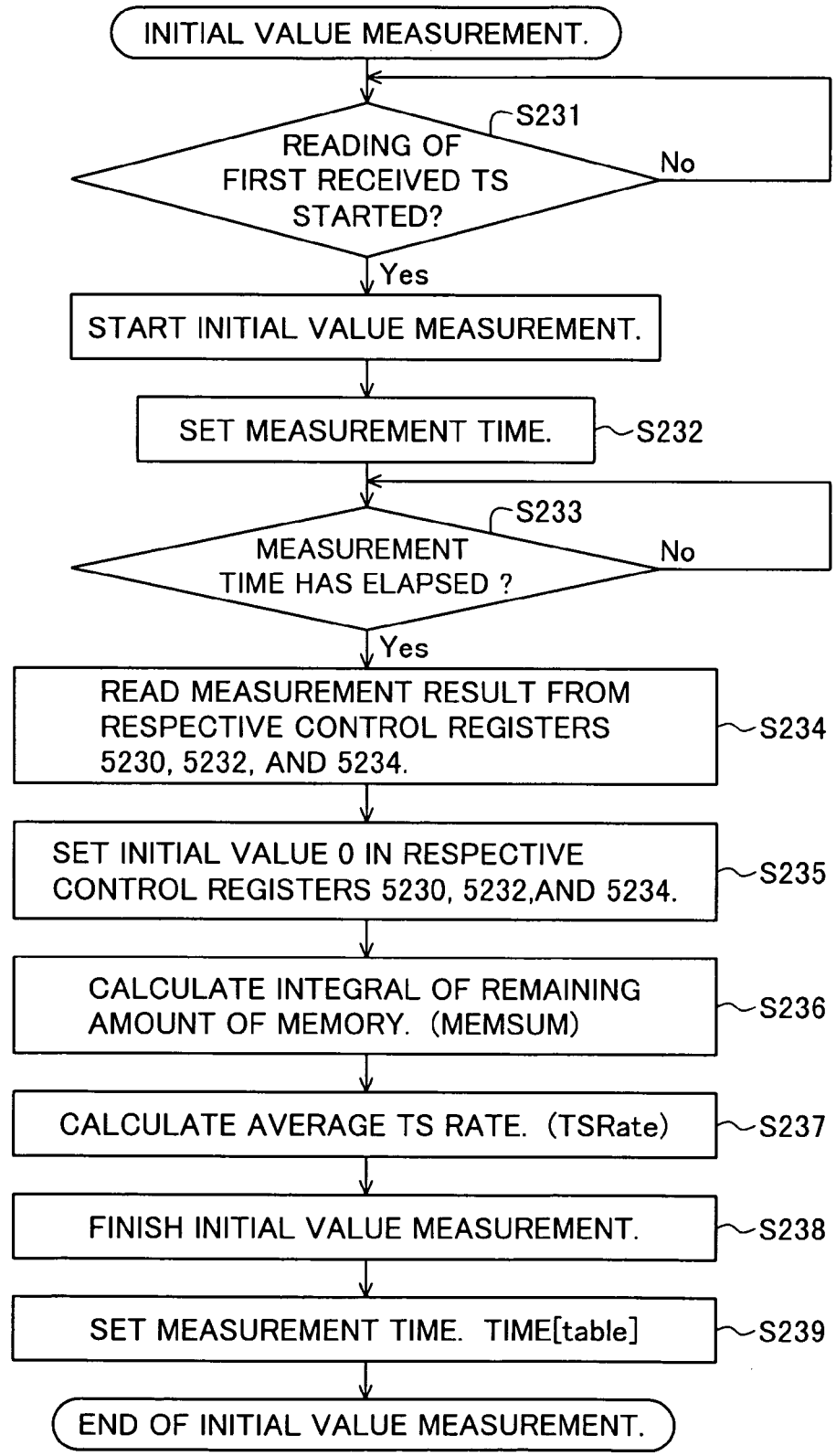
FIG. 20 is a flowchart showing an operation of calculating and setting an initial value in the flowchart of FIG. 19.
Figure 21:
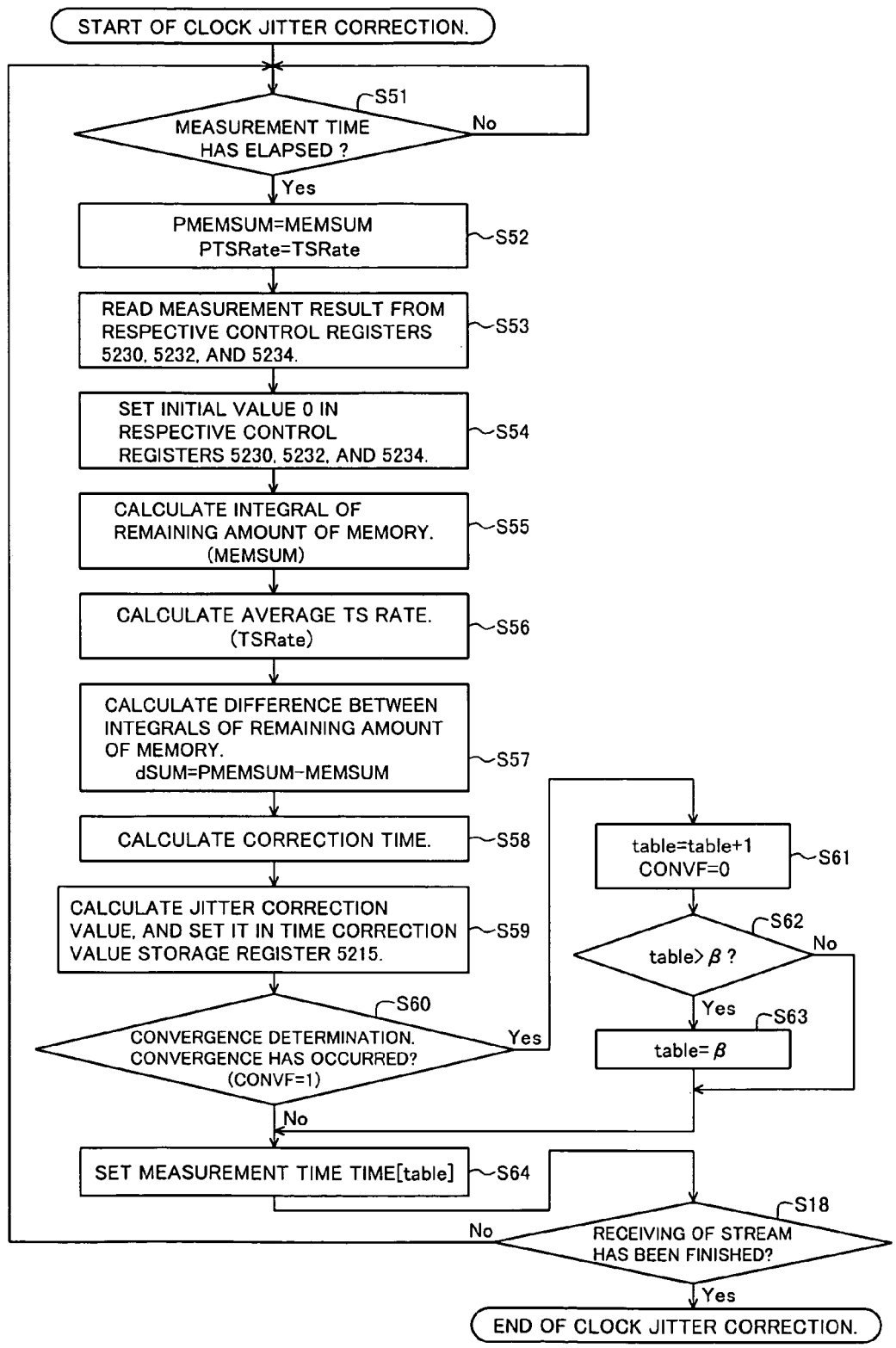
FIG. 21 is a flowchart showing an operation of correcting clock jitter (calculating a clock jitter value) in a flow shown in the flowchart of FIG. 19.
Figure 22:
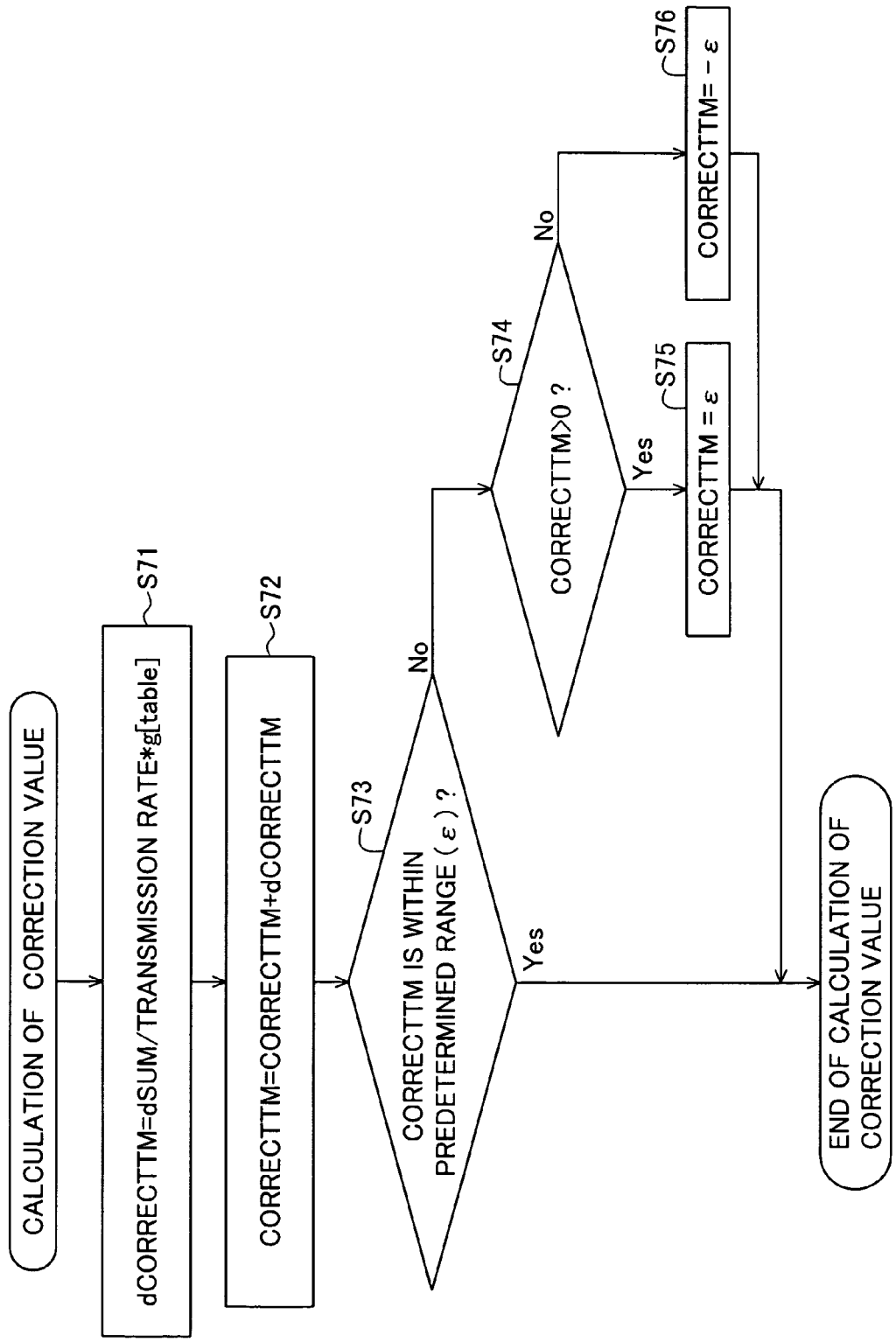
FIG. 22 is a flowchart showing an operation of calculating a clock jitter correction value in a flow shown in the flowchart of FIG. 21.
Figure 23:
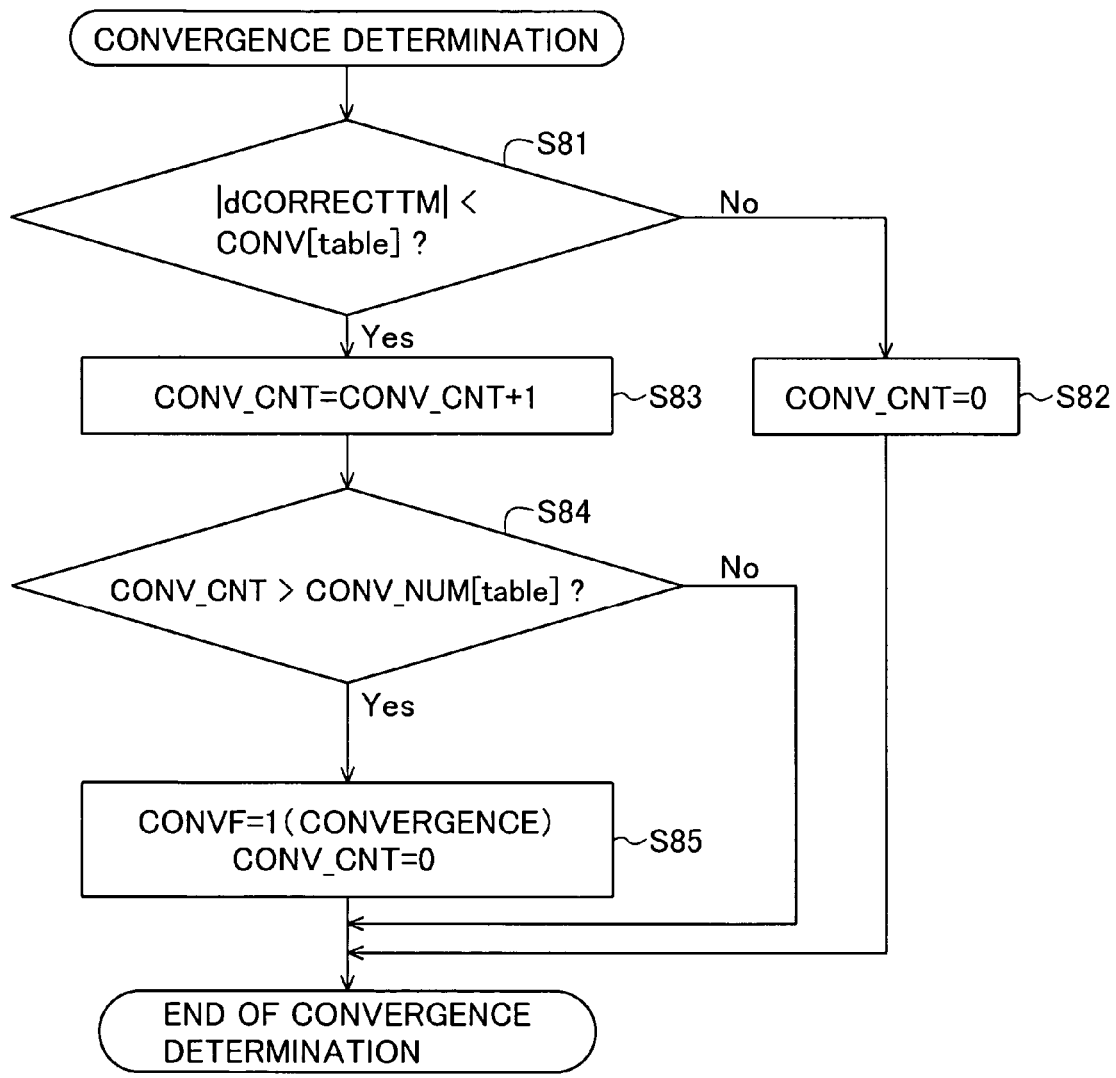
FIG. 23 is a flowchart showing an operation of determining whether the clock jitter correction value has converged in the calculation of the clock jitter value in a flow shown in the flowchart of FIG. 21.
Figures 24, 25:
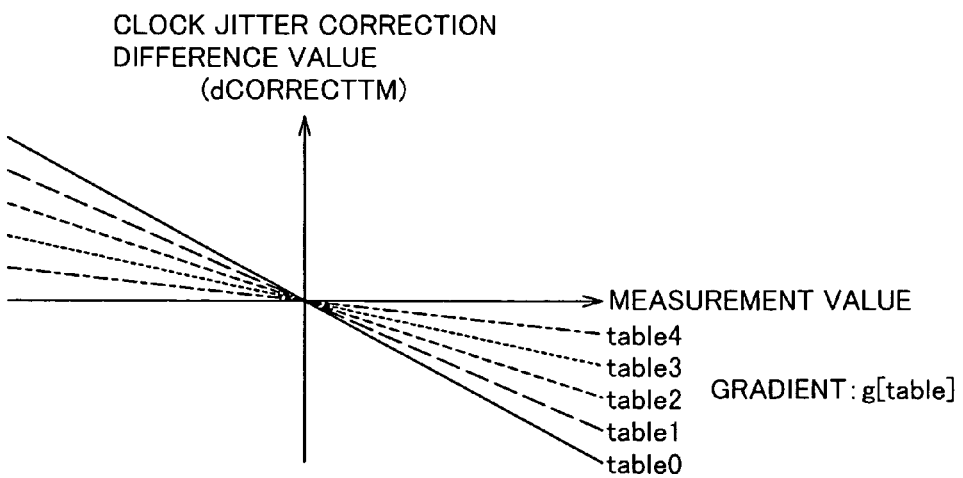
FIG. 24 is a diagram showing an example of a threshold table used to determine the measurement time and to determine whether a convergence is made, to be used in each correction value calculation stage of the third embodiment.
FIG. 25 is a diagram showing an example of a conversion table used by the wireless receiving device to calculate a clock jitter correction value in the third embodiment.

FIG. 19 is a flowchart showing the clock jitter detect operation of the CPU 54 in the wireless receiving device 50 in the third embodiment, and FIG. 20 is a flowchart showing an operation of measuring and setting an initial value (step S216 of FIG. 19) in the operation shown in FIG. 19. Further, FIG. 21 is a flowchart showing an operation of calculating a clock jitter value in the third embodiment. FIG. 22 is a flowchart showing an operation of calculating a clock jitter correction value in the third embodiment. FIG. 23 is a flowchart showing an operation of determining whether the clock jitter correction value has converged in the calculation of the clock jitter value in the third embodiment. Furthermore, FIG. 24 is a diagram showing an example of a table which is used when the wireless receiving device 50 in the third embodiment calculates the time correction value (clock jitter correction value) and which contains the measurement time, the threshold used to determine whether a convergence is made, and the convergence determination condition to be used in each correction value calculation stage. Moreover, FIG. 25 is a diagram showing an example of a conversion table (a table of gains, by which the measurement value is multiplied) used by the wireless receiving device in the third embodiment to calculate a clock jitter correction value.

The operation of the wireless receiving device 50 in the third embodiment, which has received a wireless packet including a TS sent from the wireless sending device 40, will be described below with reference to FIG. 5 to FIG. 10, FIG. 13, FIG. 14, and FIG. 19 to FIG. 25. When the wireless receiving device 50 in the third embodiment receives a wireless packet transmitted from the wireless sending device 40, the wireless LAN module 51 (FIG. 5) in the wireless receiving device 50 analyzes the wireless header added to the beginning of the wireless packet and detects the wireless sending device (source) from which the received packet has been sent and the wireless receiving device (destination) to which the packet has been sent. If the destination of the wireless packet is not the wireless receiving device 50 itself, the wireless LAN module 51 (FIG. 5) in the wireless receiving device 50 discards the wireless packet. If the destination of the wireless packet is the wireless receiving device 50 itself, the wireless LAN module 51 (FIG. 5) in the wireless receiving device 50 identifies the type of the wireless packet and performs other operations, and outputs the results to the CPU 54 (FIG. 5) in the wireless receiving device 50. The CPU 54 (FIG. 5) receives the detection result from the wireless LAN module 51 (FIG. 5), and if the received data is a time-stamped TS, the CPU 54 starts DMA to transfer the time-stamped TS to the memory 53 (FIG. 5) in the wireless receiving device 50. If the data received by the wireless LAN module 51 (FIG. 5) is device control data, the CPU 54 (FIG. 5) performs a predetermined processing on the device control data and then sends the device control data to devices connected by an IEEE1394 interface. The IEEE1394 interface transmits the video stream (a TS signal and a DV signal) and the AV/C command (device control signal) on the same signal line by time division multiplexing. In the third embodiment, the sending and receiving of a TS stream is described in detail, and the IEEE1394 interface and the input and output terminals of the device control signal (AV/C command) are not shown in the figures.

Next, the receiving-side memory control circuit 52 (FIG. 5) in the wireless receiving device 50 writes the TS received by the wireless LAN module 51 (FIG. 5) into the memory 53 (FIG. 5), in accordance with the TS write control signal sent from the CPU 54 (FIG. 5) through the CPU bus 55, and stores the TS temporarily in the memory 53. In the third embodiment, the received TS is written in a first TS storage area 531 (FIG. 7) of the memory 53 (FIG. 5). When the TS is written into the memory 53 (FIG. 5), the TS data read timing generating circuit 521 (FIG. 6) generates a TS read timing signal $R_4$, in accordance with the flow shown in FIG. 10. When the receiving of the TS from the wireless sending device 40 begins, the CPU 54 (FIG. 5) checks whether the memory 53 (FIG. 5) contains an area available to store the TS, and if the two storage areas 531 and 532 shown in FIG. 7 have already been occupied, notifies the wireless sending device 40 that the TS cannot be received, through the wireless LAN module 51 (FIG. 5).

The operation to store the received TS in the storage area will next be described. As shown in FIG. 10, when the wireless LAN module 51 (FIG. 5) starts receiving the TS, the CPU 54 (FIG. 5) in the wireless receiving device 50 determines the storage area in the memory 53 (FIG. 5) to store the received TS and reports the determined storage area to the TS memory read control circuit 522 (FIG. 6) in the receiving-side memory control circuit 52 (FIG. 5). The TS memory read control circuit 522 (FIG. 6) determines the storage area in the memory 53 (FIG. 5) from which the TS is read, in accordance with the determined storage area in the memory 53 (FIG. 5). After the receiving of the TS starts, the TS memory read control circuit 522 (FIG. 6) in the receiving-side memory control circuit 52 (FIG. 5) confirms that the first TS has been written into the memory 53 (FIG. 5) (step S1 of FIG. 10). In the third embodiment, the first TS that has been written at the beginning of the first TS storage area 531 (FIG. 7) in the memory 53 (FIG. 5) after the receiving starts is referred to as a "first TS". The TS memory read control circuit 522 (FIG. 6) in the receiving-side memory control circuit 52 (FIG. 5) can confirm that the writing of the first TS into the first TS storage area 531 (FIG. 7) in the memory 53 (FIG. 5) has been completed, by detecting a change in the write address information output from the TS write address storage circuit 5228 (FIG. 9) in the TS memory read control circuit 522 (FIG. 6) (i.e., by confirming that the write address information has been changed to the address of the second line).

After the writing of the first TS into the memory 53 (FIG. 5) can been confirmed, the TS memory read control circuit 522 (FIG. 6) in the receiving-side memory control circuit 52 (FIG. 5) reads the time stamp added to the first TS stored in the memory 53 (FIG. 5) (step S2 of FIG. 10).

When the reading of the time stamp is finished in step S2 of FIG. 10, the TS memory read control circuit 522 (FIG. 6) in the receiving-side memory control circuit 52 (FIG. 5) waits until the amount of the stored data in the memory 53 (FIG. 5) exceeds a predetermined level (step S3 of FIG. 10). This wait time is provided to allow clock regeneration using the clock frequency of the wireless receiving device 50 for the VBR TS.

When the VBR TS is received, the amount of the TS data stored in the memory 53 (FIG. 5) varies, as shown in FIG. 13, for example. FIG. 13 shows an example when the clock signals of the wireless sending device 40 and the wireless receiving device 50 are synchronized. In FIG. 13, the vertical axis represent the amount of the TS data stored in the memory 53 (FIG. 5), and the horizontal axis represents time. The example shown in FIG. 13 is obtained, for example, when the MPEG2 video data of the TS output from the AV-HDD recording/reproducing apparatus 22 (FIG. 1) or the like is read in units of frames. To be more specific, the TS transmission of a 20-Mbps HD (high definition) MPEG2 video stream will be described. In the third embodiment, it is assumed that one GOP has 15 frames and the amount of the intra-frame data in one GOP is 20% of the entire data amount of one GOP. In the third embodiment, the first TS storage area 531 (FIG. 7) in the memory 53 (FIG. 5) has such a data storage capacity that the data of one GOP can be stored.

In the third embodiment, the PCR is added to the first TS of each frame and is transmitted at intervals of 33 ms, for the sake of simplifying the description. The throughput in the wireless transmission section between the wireless sending device 40 and the wireless receiving device 50 is about 20 Mbps, and the amount of the TS received by radio is input to the wireless receiving device 50 at an approximately constant ratio. However, data is read from the memory 53 (FIG. 5) in the wireless receiving device 50 in accordance with the time stamp added to the TS, on the basis of the clock frequency in transmitting. When the intra-frame data is read from the memory 53 (FIG. 5), data of 20% of the data amount of one GOP is read in a very short period, and the amount of the TS data stored in the memory 53 (FIG. 5) decreases suddenly, as shown in FIG. 13 (a segment $D_{11}D_{12}$ in the period between $t_{11}$ and $t_{12}$ and a segment $D_{13}D_{14}$ in the period between $t_{13}$ and $t_{14}$ in FIG. 13). The amount of the stored data in the memory 53 gradually returns to an initial level $F_0$ over the period of one GOP (a segment $D_{12}D_{13}$ and a segment $D_{14}D_{15}$ in FIG. 13). Actually, the amount of the TS data stored in the memory 53 (FIG. 5) does not change linearly as shown in FIG. 13 (a segment $D_{11}D_{12}$, a segment $D_{12}D_{13}$, a segment $D_{13}D_{14}$, and a segment $D_{14}D_{15}$), but the straight-line segments are used in the third embodiment for ease of understanding the invention. When the receiving starts, the wireless receiving device 50 does not start a data read from the memory 53 (FIG. 5) before a predetermined amount of the TS is stored in the memory 53 (FIG. 5), so that the TS stored in the memory 53 (FIG. 5) does not overflow nor underflow. In the third embodiment, the reading of the received TS starts when the memory 53 (FIG. 5) stores the TS of a half of the data amount of one GOP ($F_0$ in FIG. 13).

In step S3 of FIG. 10, when the amount of the stored data in the memory 53 (FIG. 5) exceeds a predetermined level, the time counter control circuit 5214 (FIG. 8) in the TS data read timing generating circuit 521 (FIG. 6) sets the time stamp value added to the first TS as the initial value in the time counter 5213 (FIG. 8), and outputs a control signal to start counting up for time measurement to the time counter 5213 (FIG. 8) (step S4 of FIG. 10). In step S4 of FIG. 10, the time counter 5213 (FIG. 8) in the TS data read timing generating circuit 521 (FIG. 6) starts counting up, and then the time comparator 5216 (FIG. 8) outputs a TS read timing signal $R_4$. The TS read address generating circuit 5227 (FIG. 9) outputs a read control signal $R_6$ for the data of one TS stored in the memory 53 (FIG. 5) from the terminal 5223, in accordance with the TS read timing signal $R_4$ (step S5 of FIG. 10).

The TS read from the memory 53 (FIG. 5) passes the bus arbiter circuit 523 (FIG. 6) in the receiving-side memory control circuit 52 (FIG. 5) and enters the FIFO memory 5225 (FIG. 9) in the TS memory read control circuit 522 (FIG. 6). The FIFO memory 5225 (FIG. 9) accommodates the delay time of the read data and the like between the TS write control signal from the CPU 54 (FIG. 5) and the TS read control signal from the TS memory read control circuit 522 (FIG. 6) in the bus arbitration by the bus arbiter circuit 523 (FIG. 6). In the third embodiment, the FIFO memory control circuit 5226 (FIG. 9) outputs such a read control signal to the FIFO memory 5225 (FIG. 9) that the TS is read from the FIFO memory 5225 (FIG. 9) with a predetermined delay, with reference to the TS read timing signal $R_4$ input from the TS data read timing generating circuit 521 (FIG. 6) in the receiving-side memory control circuit 52 (FIG. 5). The receiving-side memory control circuit 52 (FIG. 5) controls writing into the FIFO memory 5225 (FIG. 9) in the TS memory read control circuit 522 (FIG. 6), with the TS data read control signal $R_{6a}$ (FIG. 9) output from the TS read address generating circuit 5227 (FIG. 9) and a data read finish signal (not shown in FIG. 9, shown in FIG. 6 as signal $R_8$) output from the bus arbiter circuit 523 (FIG. 6) in the receiving-side memory control circuit 52 (FIG. 5), that is, a signal indicating that data read from the memory 53 (FIG. 5) has finished. The data read finish signal (not shown in FIG. 9, shown in FIG. 6 as a signal $R_8$) output from the bus arbiter circuit 523 (FIG. 6) is used also when the TS read address generating circuit 5227 (FIG. 9) generates a TS read address.

When the reading of data of one TS from the memory 53 (FIG. 5) finishes in step S6 of FIG. 10, the TS read address generating circuit 5227 (FIG. 9) in the TS memory read control circuit 522 (FIG. 6) checks whether the memory 53 (FIG. 5) stores the TS of the next line, on the basis of the write address information stored in the TS write address storage circuit 5228 (FIG. 9), and if the TS is stored, generates a TS data read control signal $R_6$ for reading the time stamp of the TS of the next line (step S7 of FIG. 10). If the memory 53 (FIG. 5) does not store the TS of the next line, it is assumed that the memory 53 (FIG. 5) underflows, and the occurrence of underflow is reported to the CPU 54 (FIG. 5). In the third embodiment, when the occurrence of underflow is reported, the CPU 54 (FIG. 5) resets the receiving-side memory control circuit 52 (FIG. 5) to a predetermined initial state and reexecutes the TS receiving (processing starting from step S1 of FIG. 10).

In step S7 of FIG. 10, when the time stamp of the TS of the next line (next TS) is received, the time comparator 5216 (FIG. 8) in the TS data read timing generating circuit 521 (FIG. 6) compares the time stamp signal $R_3$ and the time count value $R_9$ output from the time counter 5213 (FIG. 8), and if the time count value $R_9$ becomes greater than the input value of the time stamp signal $R_3$ (step S8 of FIG. 10), outputs a TS read timing signal $R_4$. The TS read address generating circuit 5227 (FIG. 9) receives the TS read timing signal $R_4$ and outputs a TS data read control signal $R_6$ (step S5 of FIG. 10).

The receiving-side memory control circuit 52 (FIG. 6) repeats the operation of steps S5 to S8 shown in FIG. 10 (step S9 surrounded by a broken line). When the reference clock on the receiving side, oscillated by an oscillator of the wireless receiving device 50 becomes faster than the reference clock on the sending side, oscillated by an oscillator of the wireless sending device 40 (i.e., when the clock frequency on the receiving side of the wireless receiving device 50 becomes higher than the clock frequency on the sending side of the wireless sending device 40), a deviation occurs between the reference time on the receiving side (clock frequency on the receiving side), based on the count value of the time counter 5213 (FIG. 8), and the reference time on the sending side (clock frequency on the sending side), based on the time stamp signal. The third embodiment is configured so that the receiving-side memory control circuit 52 (FIG. 6) delays the timing to read the TS temporarily stored in the memory 53 (FIG. 5) by a period based on the deviation.

Next, the clock regeneration flow in the third embodiment will be described with reference to flowcharts shown in FIG. 19 and FIG. 23. When the receiving of the TS starts, the CPU 54 (FIG. 5) in the wireless receiving device 50 identifies the sending device (corresponding to the wireless sending device 40), on the basis of the header information added to the wireless packet (step S211 of FIG. 19). The sending device is identified by either or both of the MAC address added to the header information of the wireless packet and the device identification information (such as an IP address) specific to the sending device, for example. When the MAC address or the IP address is used as the device identification information, the device identification information can be obtained without adding new information to the wireless packet, allowing the processing load on the wireless sending device 40 and the wireless receiving device 50 to be reduced and allowing the sending and receiving to be performed without applying a load on the communication band.

After the sending device is identified, the CPU 54 (FIG. 5) checks whether the time correction value (previous time correction value) of the identified sending device has already been stored in a storage portion of the wireless receiving device 50 (such as a part of the memory 53 or another memory not shown in the figure), in accordance with the device identification information of the sending device (step S212 of FIG. 19). If the time correction value (clock jitter correction value) of the identified sending device has already been stored in the wireless receiving device 50, the CPU 54 (FIG. 5) sets the stored time correction value (clock jitter correction value) as the initial value in the time correction value storage register 5215 (FIG. 8) of the TS data read timing generating circuit 521 (FIG. 6) (step S213 of FIG. 19). A table containing threshold control values used in the clock jitter correction is also set ('table=α' in FIG. 19). The wireless receiving device 50 of the third embodiment has five tables (table0 to table4), as shown in FIG. 24 and FIG. 25. If the table used when the time correction value is stored is table4, α=3 is set, for example, in the third embodiment. If the time correction value of the identified sending device is not stored in the wireless receiving device 50, the CPU 54 (FIG. 5) sets the initial value '0' in the time correction value storage register 5215 (FIG. 8) and 'table=0' (step S214 of FIG. 19).

If the time correction value (previous time correction value obtained from past data receiving, for example) is stored in the wireless receiving device 50, the stored previous time correction value is used as the initial value for the following reason. The wireless receiving device 50 regenerates a clock of the VBR TS. The average data transmission rate of the VBR TS is about 20 Mbps, but the average data transmission rate varies greatly in short periods. In a little long period, the average data transmission rate is considered to be almost constant, and the clock jitter value can be estimated. So, the minimum measurement time is set to the period of one GOP (about 0.5 seconds) in the third embodiment. Since it takes a very long time to estimate the clock jitter value once, the stored previous time correction value is used when the clock regeneration starts, if the wireless receiving device 50 stores the measurement result obtained when the TS was received before (previous time correction value). By doing this, the period until the time correction value converges in a predetermined range (time required to converge the time correction value in step S217 of FIG. 19) can be reduced. When the TS received by the MPEG2 decoder is decoded to reproduce the image, the video signal can be reproduced without interruption.

After the initial value is set in the time correction value storage register 5215 (FIG. 8) of the TS data read timing generating circuit 521 (FIG. 6), the CPU 54 (FIG. 5) sets the initial value '0' in the integration result storage register 5230 (FIG. 9), the TS output count register 5232 (FIG. 9), and the measurement time storage register 5234 (FIG. 9) of the TS memory read control circuit 522 (FIG. 6). At this time, the initial value '0' is set in the memory storage data amount integration circuit 5229 (FIG. 9), the TS output counter 5231 (FIG. 9), and the measurement time counter 5233 (FIG. 9) of the TS memory read control circuit 522 (FIG. 6) (step S215 of FIG. 19). Further, the CPU 54 sets parameters used to calculate the time correction value (hereafter referred to as a "clock jitter correction value") to the initial values (step S215 of FIG. 19). CONVF in the figure is a convergence determination flag. If the clock jitter correction value has converged in a stage of calculating each clock jitter correction value (each stage), a convergence determination flag CONVF is set to '1' (step S85 of FIG. 23). CONV_CNT is the count value of the counter counting how many times continuously difference value dCORRECTTM of the clock jitter correction value, which will be described later, enters a predetermined convergence range in the stage of calculating each clock jitter correction value (step S83 of FIG. 23). n is the count value of the counter counting a stop period if the operation to calculate the clock jitter correction value stops until a sudden change in the TS storage capacity of the TS memory 53 (FIG. 5) has converged when the TS rate used in another embodiment to be described later changes greatly. After the registers are initialized, the CPU 54 (FIG. 5) measures and sets the initial value (step S16 of FIG. 11). The method of measuring the initial value will be described with reference to FIG. 12.

When the receiving of the TS starts, the measurement of the initial value starts. When the initial value is measured, the CPU 54 (FIG. 5) checks whether the reading of the TS from the memory 53 (FIG. 5) has started (step S231 of FIG. 20). When it is confirmed that the reading of the TS from the memory 53 (FIG. 5) has started, the CPU 54 (FIG. 5) sets the time for measuring the initial value (initial value measurement time) in an internal timer (step S232 of FIG. 20). The initial value measurement time is set to 0.5 seconds, which is a period of one GOP, for example. The initial value measurement time may be set to a period of a plurality of GOPs.

The CPU 54 (FIG. 5) waits until the initial value measurement time set in the timer elapses (step S233 of FIG. 20). After a lapse of the initial value measurement time, the CPU 54 (FIG. 5) reads the measurement results held in the integration result storage register 5230 (FIG. 9), the TS output count register 5232 (FIG. 9), and the measurement time storage register 5234 (FIG. 9) of the TS memory read control circuit 522 (FIG. 6) (step S234 of FIG. 20). Then, the initial value '0' is set in the integration result storage register 5230 (FIG. 9), the TS output count register 5232 (FIG. 9), and the measurement time storage register 5234 (FIG. 9) (step S235 of FIG. 20). The memory storage data amount integration circuit 5229 (FIG. 9), the TS output counter 5231 (FIG. 9), and the measurement time counter 5233 (FIG. 9) in the TS memory read control circuit 522 (FIG. 6) are also set to the initial value '0'.

The CPU 54 (FIG. 5) calculates an initial value, using the register values. To be more specific, a value $D_{10}$ held in the integration result storage register 5230 (FIG. 9) is divided by a value $B_{10}$ held in the measurement time storage register 5234 (FIG. 9) to obtain an initial value MEMSUM (=$D_{10}/B_{10}$) (step S236 of FIG. 20). Then, a value $A_{10}$ held in the TS output count register 5232 (FIG. 9) of the TS memory read control circuit 522 (FIG. 6) is divided by the value $B_{10}$ held in the measurement time storage register 5234 (FIG. 9) to obtain a TS average read rate TSRate (=$A_{10}/B_{10}$) (step S237 of FIG. 20). In the third embodiment, the memory storage data amount integration circuit 5229 (FIG. 9) integrates difference ΔF between reference capacity $F_0$ and the amount of the stored data in the memory, as shown in FIG. 13. Accordingly, the area of the hatched region in FIG. 13 is output as the integral $D_{10}$ from the memory storage data amount integration circuit 5229 (FIG. 9). In the third embodiment, the memory storage data amount integration circuit 5229 (FIG. 9) integrates difference ΔF measured from the control signal generated by the integral measurement time generation counter (not shown) provided in the memory storage data amount integration circuit 5229 (FIG. 9) at constant intervals. Now, the measuring and setting of the initial value MEMSUM is completed. In the third embodiment, when the memory storage data amount integration circuit 5229 (FIG. 9) measures and integrates the number of the TS's stored in the memory 53 (FIG. 5), an example of the integrating difference ΔF measured from the control signal generated by the integral measurement time generation counter (not shown) provided in the memory storage data amount integration circuit 5229 (FIG. 9) at constant intervals. The difference ΔF may also be measured from the TS read timing signal output from the TS data read timing generating circuit 521 (FIG. 6), for example.

When the measuring and setting of the initial value MEMSUM finishes (step S238 of FIG. 20), the measurement time (TIME[table]) used to calculate the time correction value (clock jitter correction value) is set (step S239 of FIG. 20). If the time correction value (i.e., the clock jitter correction value) of the identified sending device has already been stored in the wireless receiving device 50, the measurement time is set to 4 seconds (table=3), for example, in the third embodiment. If the time correction value of the identified sending device has not been stored in the wireless receiving device 50, the measurement time is set to 0.5 seconds (table=0). If the wireless receiving device 50 stores the time correction value measured at the last time, the time correction value is used to enable a time-corrected stream to be transmitted and received from when the video stream the sending and receiving start. If the reference clock in the wireless sending device 40 and the wireless receiving device 50 has a crystal precision (maximum frequency deviation of about 100 ppm, for example), no special problem would occur. If the frequency deviation is about 1%, PLL in the MPEG2 decoding circuit is not taken until the clock jitter correction value is taken into a predetermined range, and the image may be corrupted. In the third embodiment, the clock jitter correction value is not measured from the beginning, and the previous correction result is used, so that the clock jitter correction value can be brought to the level of convergence immediately after the sending and receiving start. In the examples described above, the image can be transmitted or received without degradation from the beginning.

In the clock jitter correction, one measurement period is very long, as the measurement time of each table shown in FIG. 24 indicates. It takes about several tens of seconds to several minutes to converge the clock jitter correction value (convergence period from table0 to table1). Accordingly, in order to converge the clock jitter correction value early in the stage of table0, the measurement time is usually reduced, and a system gain g[table] (a gradient of a straight-line segment in FIG. 25) used to calculate the clock jitter correction value from the measurement result is increased. If the measurement time is reduced, a change in the input rate of the input TS creates a disturbance, lowering the level of stability around the converged value of the clock jitter correction value. In other words, control becomes sensitive to a change in rate of the input TS. If the system gain g[table] used to calculate the clock jitter correction is increased, the convergence time is reduced, but the stability decreases around the converged value of the clock jitter correction value. Accordingly, the third embodiment provides a plurality of stages in the calculation of the clock jitter correction value, and the measurement time, the threshold of convergence determination, and the system gain used to calculate the clock jitter correction value are selected in each stage to reduce the measurement time and to increase gain g[table], so that an early convergence is made when the sending and receiving of the TS stream starts between the wireless sending device 40 and the wireless receiving device 50. When the clock jitter correction value is almost converged, the measurement time is increased to make the disturbance caused by a change in the TS rate due to the VBR and the like smaller and to reduce the system gain g[table], so that the system can be stabilized. Now, the convergence time in the calculation of the clock jitter correction value can be reduced, and the area in which the clock jitter correction value has converged becomes less prone to a change in the TS rate due to the VBR and the like, and the system operation can be stabilized.

In step S239 of FIG. 20, when the setting of the measurement time (TIME[table]) used in the calculation of the time correction value (clock jitter correction value) finishes, the calculation of the time correction value starts. The CPU 54 (FIG. 5) waits until a predetermined measurement time elapses (step S51 of FIG. 21). Like the initial value measurement time used when the initial value is set (step S232 of FIG. 20), the measurement time in step S51 of FIG. 21 is one GOP in the third embodiment. After a lapse of the measurement time in step S51 of FIG. 21, a measurement value MEMSUM measured at the last time and an average read rate TSRate are first saved temporarily as the previous measurement value PMEMSUM and the previous average read rate PTSRate (step S52 of FIG. 21). Then, in the same manner as the initial value measurement, the CPU 54 (FIG. 5) reads the results of measurement held in the integration result storage register 5230 (FIG. 9), the TS output count register 5232 (FIG. 9), and the measurement time storage register 5234 (FIG. 9) (step S53 of FIG. 21), then sets the integration result storage register 5230 (FIG. 9), the TS output count register 5232 (FIG. 9), and the measurement time storage register 5234 (FIG. 9) to the initial value '0' (step S54 of FIG. 21). At this time, the memory storage data amount integration circuit 5229 (FIG. 9), the TS output counter 5231, and the measurement time counter 5233 are also set to the initial value '0'. Then, the CPU 54 (FIG. 5) uses register values in the same manner as the initial value measurement (step S236 of FIG. 20), and divides a value $D_{10}$ held in the integration result storage register 5230 (FIG. 9) by a value $B_{10}$ held in the measurement time storage register 5234 (FIG. 9) to obtain a MEMSUM (=$D_{10}/B_{10}$) (step S55 of FIG. 21). Then, a value $A_{10}$ held in the TS output count register 5232 (FIG. 9) of the TS memory read control circuit 522 (FIG. 6) is divided by the value $B_{10}$ held in the measurement time storage register 5234 (FIG. 9) to obtain a TS average read rate TSRate(=$A_{10}/B_{10}$) (step S56 of FIG. 21).

A deviation (difference) between the measurement value MEMSUM and the initial value PMEMSUM is calculated as expressed below, and the clock jitter value dSUM is obtained (step S57 of FIG. 21).

$$dSUM = PMEMSUM - MEMSUM$$

The calculated clock jitter value dSUM is used in step S58 to obtain a clock jitter correction value. The calculating flow of the clock jitter correction value in the third embodiment will be described with reference to FIG. 22. In step S71, the clock jitter value dSUM is used to obtain the difference value dCORRECTTM (also referred to as a "clock jitter correction difference value" or as a "dCORRECTTM value") of the clock jitter correction value (step S71 of FIG. 22). To be more specific, the expression $$dCORRECTTM = dSUM/TSRate \times g[table]$$

is used for the calculation. In FIG. 25, the vertical axis represents the clock jitter correction difference value (dCORRECTTM value), and the horizontal axis represents the measurement value (dSUM/TSRate). In the figure, the gradient of a straight-line segment corresponds to the system gain g[table] of each table. When the dCORRECTTM value is calculated, the measurement value MEMSUM(PMEMSUM) is divided by the TS average read rate TSRate at the time of each measurement, the difference between the results is obtained, and the deviation dSUM is calculated actually. In the third embodiment, if the measurement time is the same, the reception TS rate is approximately constant, so the average read rate last measured is used as a divisor in step S71 for the sake of simplifying the description.

In the third embodiment, when the dCORRECTTM value is calculated, the clock jitter value dSUM is divided by the TS average read rate TSRate for the following reason. When the memory storage data amount integration circuit 5229 (FIG. 9) integrates the amount of the stored data in the memory 53 (FIG. 5), the magnitude of the clock jitter value to be obtained (corresponding to the integral of the hatched region in FIG. 14) varies with when the TS with an average data transfer rate of 20 Mbps is received and when the TS with an average data transfer rate of 5 Mbps is received. The difference is normalized by the TS average read rate. After the dCORRECTTM value is calculated, the clock jitter correction value corrected before (CORRECTTM value) and the clock jitter correction difference value currently calculated (dCORRECTTM value) are added to obtain a clock jitter correction value (step S72 of FIG. 22). The calculated dCORRECTTM value is based on the results of control by the time correction value storage register 5215 (FIG. 8), and the clock jitter correction difference value calculated in the algorithm above is the difference. Accordingly, when the clock jitter correction value is set in the time correction value storage register 5215 (FIG. 8), the clock jitter correction difference value calculated above is added to the clock jitter correction value which is currently being set.

Next, with reference to FIG. 14, the clock jitter value dSUM will be described in further detail. FIG. 14 shows an example when the clock frequency on the receiving side of the wireless receiving device 50 is higher than the clock frequency on the sending side of the wireless sending device 40, and the reference clock of the wireless receiving device 50 is faster than the reference clock of the wireless sending device 40. The actual clock frequency deviation depends on the precision of the oscillator of the wireless sending device 40 and the oscillator of the wireless receiving device 50. If a crystal oscillator is used, the maximum clock deviation is about ±100 ppm. In FIG. 14, the clock jitter value dSUM is exaggerated for ease of understanding (the gradient of a segment $D_{21}D_{25a}$ with respect to a segment $D_{21}D_{25}$ is greater than the true gradient). Since the clock frequency on the receiving side of the wireless receiving device 50 is higher than the clock frequency on the sending side of the wireless sending device 40, so that the time counter 5213 (FIG. 8) of the wireless receiving device 50 counts up faster, decreasing the amount of the TS data stored in the memory 53 (FIG. 5) gradually (as indicated by a segment $D_{21}D_{25a}$ in FIG. 14). In this case, the deviation between the clock frequency on the receiving side and the clock frequency on the sending side clock frequency is constant (does not vary with a change in TS input rate or the like), so the hatched part shown in FIG. 14 corresponds to the clock jitter value dSUM (value corresponding to the difference between the measurement value MEMSUM and the initial value PMEMSUM.

In the third embodiment, when the clock jitter correction value CORRECTTM is calculated, clipping is executed in steps S73 to step S76 in such a way that the clock jitter correction value CORRECTTM is within a range defined by a predetermined value (denoted by $\epsilon$ in FIG. 22). As has been described above, if the reference clock of the wireless sending device 40 and the wireless receiving device 50 is generated by a crystal oscillator, the maximum value of the clock frequency deviation (clock jitter correction value) between the both devices is within the maximum clock frequency deviation of the crystal used as the oscillator. Therefore, in the third embodiment, the clock jitter correction value is calculated as shown in the flowchart of FIG. 22. If the calculated clock jitter correction value is a value exceeding a range of the correction value determined by the crystal frequency precision described above, the calculated clock jitter correction value is considered to be resulting from a cause other than the reference clock frequency deviation between the both devices. Therefore, the third embodiment is configured in such a way that the clock jitter correction value CORRECTTM is controlled to be within a range defined by a predetermined value. In this way, by controlling the amplitude of the clock jitter correction value CORRECTTM in such a way that the clock jitter correction value CORRECTTM is limited to within a predetermined range, an effect that the system control (clock jitter correction control) of the wireless receiving device 50 can be stabilized is obtained. For the reason described above, it is checked in step S73 whether the clock jitter correction value CORRECTTM is within a predetermined range ($-\epsilon \leq$ CORRECTTM $\leq \epsilon$), in the third embodiment. If the value is within the predetermined range, the operation to calculate the clock jitter correction value is finished. If the predetermined range is exceeded, whether CORRECTTM is positive is checked in step S74. If CORRECTTM is positive, CORRECTTM=$\epsilon$ is set, and the operation to calculate the clock jitter correction value is finished (step S75 of FIG. 22). If CORRECTTM is negative, CORRECTTM=$-\epsilon$ is set, and the operation to calculate the clock jitter correction value is finished (step S76 of FIG. 22).

With the configuration as described above, even if an disturbance caused by something other than the reference clock frequency deviation between the wireless sending device 40 and the wireless receiving device 50 is input to the system, extreme clock jitter correction will not be carried out by keeping the clock jitter correction value CORRECTTM within a range predetermined by the clock frequency precision between the devices, and the entire system including the MPEG2 decoding circuit can be operated with stability. Since clock synchronization does not exceed a predetermined level, jitter in the TS stream can be suppressed below a predetermined level, and overflow or underflow of the memory 53 can be suppressed, and the video signal can be decoded by the MPEG2 decoding circuit without interruption. When the calculation of the clock jitter correction value CORRECTTM finishes, the CPU 54 (FIG. 5) sets the calculated clock jitter correction value CORRECTTM in the time correction value storage register 5215 of the TS data read timing generating circuit 521 (FIG. 6) (step S59 of FIG. 21). After the clock jitter correction value CORRECTTM is set, the CPU 54 (FIG. 5) determines whether the clock jitter correction value CORRECTTM has converged (step S60 of FIG. 21).

The flow for determining whether clock jitter correction value CORRECTTM has converged in the third embodiment will be described with reference to FIG. 23. The CPU 54 (FIG. 5) sets the clock jitter correction value CORRECTTM in the time correction value storage register 5215 of the TS data read timing generating circuit 521 (FIG. 6) and confirms that the clock jitter correction difference valued CORRECTTM is within a predetermined range (|dCORRECTTM|<CONV[table]) (step S81 of FIG. 23). FIG. 24 shows thresholds for judging the convergence in the stages (CONV[table]). In the figure, CRCTML is a predetermined constant. As shown in FIG. 24, higher stages have lower thresholds (clock jitter correction value CORRECTTM is brought to convergence). As has been described in the calculation of clock jitter correction value CORRECTTM, one measurement period is very long, such as 0.5 seconds in stage 0 (table0). In order to converge the clock jitter correction value CORRECTTM as early as possible, the clock jitter correction value must be roughly calculated first, then the precision must be improved in the subsequent stages. Especially when the clock frequency deviation between the wireless sending device 40 and the wireless receiving device 50 is large, the clock jitter correction value must converge roughly and quickly. Otherwise, when the sending and receiving of a video stream starts, the TS jitter cannot be sufficiently accommodated for a while (until the clock frequency deviation between the wireless sending device 40 and the wireless receiving device 50 has converged within a predetermined range), the MPEG2 decoding circuit cannot provide clock synchronization, and the displayed image will be corrupted. Accordingly, the third embodiment is configured to determine the convergence in five stages, and to increase the precision of convergence of the clock jitter value gradually. Since the clock jitter value is brought close to the range of convergence roughly and quickly when the sending and receiving start, the period in which the MPEG2 decoding circuit cannot provide clock synchronization, corrupting the displayed image can be minimized. Once the clock jitter correction value has converged, clock synchronization can be ensured by a stable operation even if disturbance caused by a change in TS rate and the like occurs. In the third embodiment, the determination of the convergence is controlled in five stages, but the present invention is not limited to this example. The same effect can be obtained by the number of the stages is set to any value other than five, such as two, three, and ten. In the third embodiment, different parameters are used in the stages, but the same effect can be obtained by changing the convergence determination conditions from table3 (using the same values in table0 to table2).

It is determined in step S81 that clock jitter correction difference value dCORRECTTM is outside a predetermined range, the CPU 54 (FIG. 5) ends the operation to determine the convergence, setting a variable CONV_CNT to 0 (step S82 of FIG. 23). If it is determined in step S81 that clock jitter correction difference value dCORRECTTM is within a predetermined range, the CPU 54 (FIG. 5) adds 1 to CONV_CNT (step S83 of FIG. 23) and compares the result with CONV_NUM[table] (step S84 of FIG. 23). If the result does not exceed CONV_NUM[table], the convergence determination is finished. If the result exceeds CONV_NUM[table], it is considered that the convergence has been made, the convergence determination flag (CONVF) is set to '1', CONV_CNT is set to '0', and the operation determine the convergence is finished. In the third embodiment, if the clock jitter correction difference value dCORRECTTM is found to be within the predetermined range several times continuously, it is determined that the clock jitter correction value CORRECTTM has converged. This eliminates a coincidence in which the clock jitter correction difference value dCORRECTTM enters the predetermined range because of a change in the TS rate or another reason, even if the clock jitter correction value CORRECTTM has not converged. With this configuration, the convergence of the clock jitter correction value CORRECTTM can be determined with reliability, and the system can operate with stability. In the third embodiment, if the clock jitter correction difference value dCORRECTTM is found to be within a predetermined range several times continuously, it is determined that the clock jitter correction value CORRECTTM has converged. The present invention is not limited to the example. The same effect can be obtained, for example, by determining that the clock jitter correction value CORRECTTM has converged when the value is calculated within a predetermined threshold range.

If it is determined that the clock jitter correction value CORRECTTM has converged (CONVF=1) (step S60 of FIG. 21), the CPU 54 (FIG. 5) adds 1 to the table value and sets the convergence determination flag to '0' (step S61 of FIG. 21). In step S62, the table is compared with a predetermined value of β (β=4 in the third embodiment) (step S62 of FIG. 21). If β is exceeded, β is set as the table value (step S63 of FIG. 21). In the third embodiment, β becomes 4. When the convergence determination is finished, the CPU 54 (FIG. 5) sets the measurement time (step S64 of FIG. 21). After the measurement time is set, the CPU 54 (FIG. 5) checks whether the stream receiving from the wireless sending device 40 is finished. If not, the CPU 54 waits for the measurement time to calculate the next clock jitter correction value, set in step S64 (step S51 of FIG. 21), then calculates the clock jitter correction value. If the stream receiving has finished, it is checked whether the stage in which the convergence is determined (table value) is γ or higher (step S219 of FIG. 19). If the table is lower than γ, the operation to receive TS is finished. If the table is γ or higher, the current table value and the clock jitter correction value CORRECTTM are stored (step S220 of FIG. 19), then the operation to receive TS is finished.

A clock regeneration method using clock jitter correction value CORRECTTM will next be described. The time counter control circuit 5214 (FIG. 8) in the TS data read timing generating circuit 521 (FIG. 6) adds the clock jitter correction value CORRECTTM held in the time correction value storage register 5215 (FIG. 8) to the count value of the time counter 5213 at intervals of a predetermined period (at intervals of 100 ms in the third embodiment), to correct the output value of the time counter 5213 (FIG. 8). In the example shown in FIG. 14, the clock frequency on the receiving side of the wireless receiving device 50 is higher than the clock frequency on the sending side of the wireless sending device 40, and the amount of the stored data in the memory 53 (FIG. 5) is decreasing. In this case, the time counter 5213 counts down by the clock jitter correction value CORRECTTM once in 100 ms (the time is delayed). By delaying the time by the clock jitter correction value CORRECTTM, the operation time based on the clock frequency in the wireless receiving device 50 can be brought closer to the operation time based on the clock frequency in the wireless sending device 40.

In the wireless receiving device 50 of the third embodiment, the time correction value (clock jitter correction value) held in the time correction value storage register 5215 (FIG. 8) is added as an offset to the count value of the time counter 5213 (FIG. 8) in the TS data read timing generating circuit 521 (FIG. 6) at constant intervals in clock regeneration (clock jitter correction), so that appropriate clock can be regenerated without changing the system clock frequency of the wireless receiving device 50. Accordingly, with the wireless receiving device 50 of the third embodiment (or with the data receiving method of the third embodiment), the clock regeneration for the received TS's can be independently executed, by storing the TS's sent from a plurality of wireless sending devices separately in different storage areas of the memory 53 (FIG. 5), providing the time counter 5213 (FIG. 8) corresponding to each storage area to use the read timing of each of the TS's sent from the plurality of wireless sending devices.

As has been described, with the data receiving method of the third embodiment (the wireless receiving device 50 of the third embodiment), even when the VBR TS transmitted by radio with jitter is received, the wireless sending device 40 and the wireless receiving device 50 can be brought into clock synchronization, and the TS can be continuously output because the memory 53 (FIG. 5) in the wireless receiving device 50 can be controlled without underflow or overflow. When an MPEG2 TS is decoded and reproduced by the device on the receiving side, the MPEG2 data can be reproduced without video interruption.

With the data receiving method of the third embodiment (the wireless receiving device 50 of the third embodiment), a single wireless receiving device 50 can receive the packet data output from a plurality of data sending devices because the receiving-side memory 53 has a plurality of storage areas, and data can be output without underflow or overflow for the data of each received packet. Since the receiving-side memory 53 has a plurality of storage areas, a plurality of streams can be handled by a circuit having a simple configuration, enabling the circuit size to be suppressed and the power consumption and the production cost to be reduced. As has been described, the clock jitter value depends on the deviation in system clock frequency, the value is almost constant for predetermined device. When the clock jitter correction value is brought into a predetermined convergence range (such as immediately after the receiving starts), the gain of the calculation of the clock jitter correction value (a gradient of the straight-line segment representing a conversion table) is increased to reduce the convergence time. After the clock jitter correction value is brought into a predetermined convergence range, the gain is decreased, and great importance is placed on the stability of the system. Now, the time required to bring the clock jitter correction value into the convergence range can be reduced, and after the clock jitter correction value is brought into the convergence range, the wireless receiving device 50 can operate with stability. In the third embodiment, the measurement time is increased to improve the precision of the measurement value and enable the wireless receiving device 50 to operate with stability after the clock jitter correction value has converged. In the third embodiment, the clock jitter value has converged, but PLL control or the like is not used, so that the clock jitter correction value must be continuously updated when data is received.

Fourth Embodiment

Figure 26:
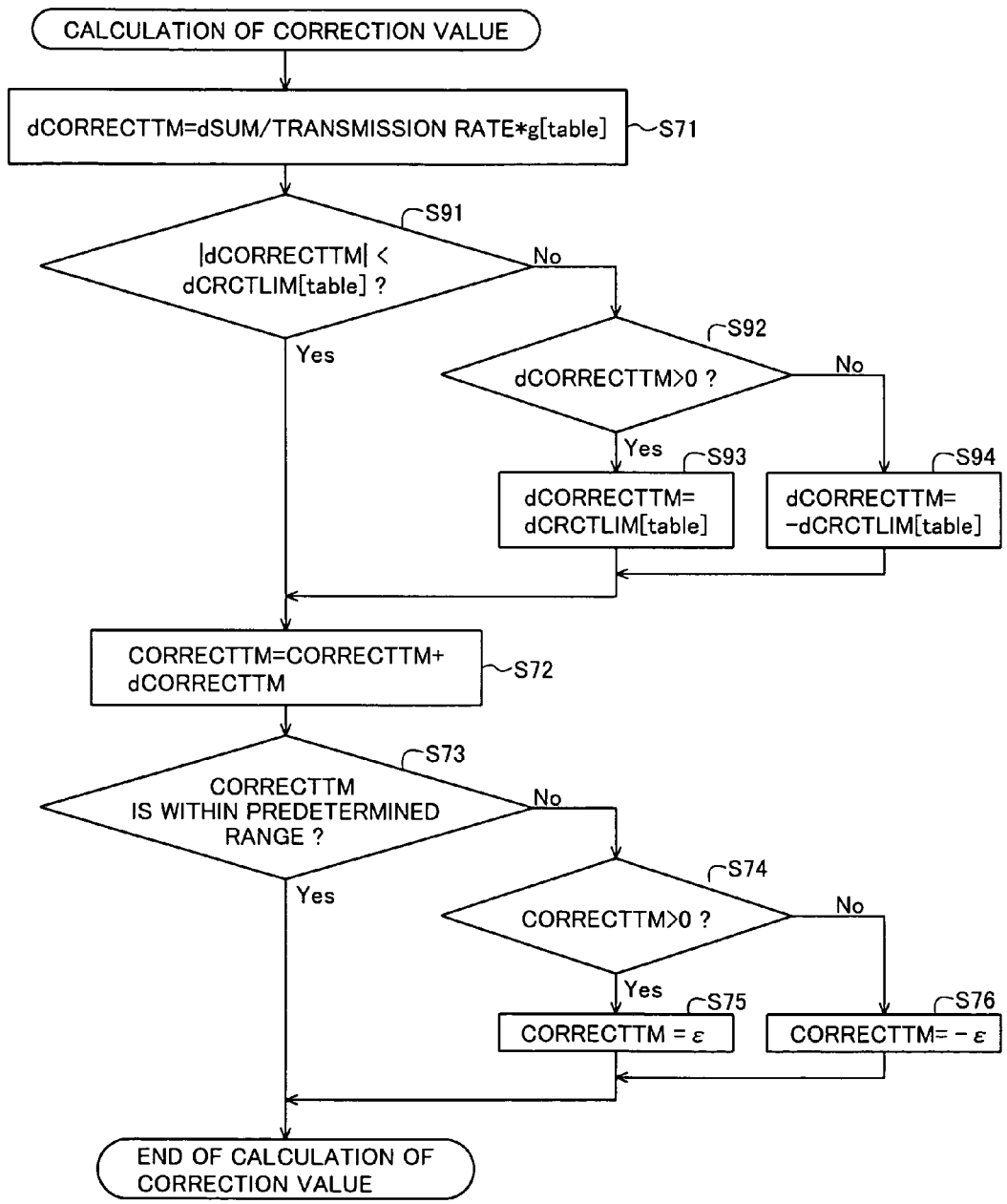
FIG. 26 is a flowchart showing an operation of the clock jitter correction value of the fourth embodiment in a flow shown in the flowchart of FIG. 21.
Figure 27:
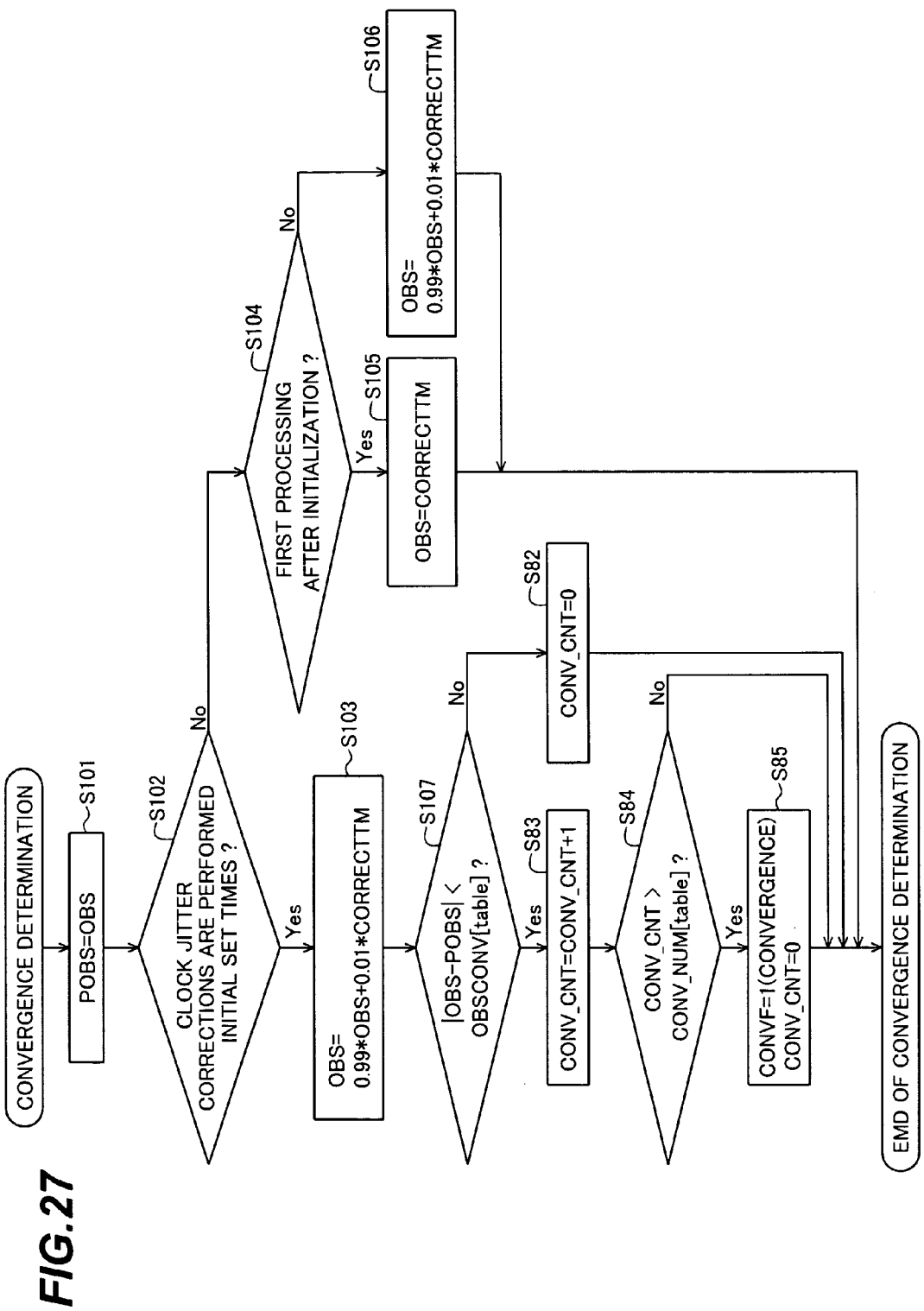
FIG. 27 is a flowchart for describing an operation to determine a clock jitter correction value in the calculation of the clock jitter value of the fourth embodiment in a flow shown in the flowchart of FIG. 21.

FIG. 26 is a flowchart showing an operation when the clock jitter correction value of the wireless receiving device in the fourth embodiment of the present invention. FIG. 27 is a flowchart showing an operation to determine convergence when the clock jitter correction value of the wireless receiving device in the fourth embodiment is calculated. FIG. 28 is a diagram showing an example of measurement times used in the correction value calculation stages, threshold tables used to determine the convergence, and the like in the fourth embodiment. The fourth embodiment differs from the third embodiment in that a new flow of limiting the correction range of the clock jitter correction difference value dCORRECTTM (also referred to as a "dCORRECTTM value") is added. Further, the data receiving method of the fourth embodiment is the same as the data receiving method of the third embodiment, except for the operation flow in calculating the clock jitter correction value and the flow of determining whether the clock jitter correction value has converged. To be more specific, the third embodiment differs from the fourth embodiment in the following two points.

The first difference is that limits are imposed on the amplitude of the dCORRECTTM value calculated when the clock jitter correction value is calculated, for the following reason. Especially, when the clock jitter is calculated, the TS input to the present system does not have a CBR (constant bit rate) but has a VBR. For clock synchronization of VBR systems, the dCORRECTTM value calculated to obtain the clock jitter correction value contains a change in TS read rate resulting from the VBR, the effect of retransmission control of wireless packet in the wireless section, and the like, as well as the clock jitter value resulting from the clock frequency deviation between the wireless sending device 40 and the wireless receiving device 50 (see the hatched part in FIG. 14). In the fourth embodiment, the system is configured to operate with higher stability against a factor (disturbance) other than the clock jitter value by imposing limitations on the amplitude of the dCORRECTTM value when the clock jitter correction value is calculated. Accordingly, even if the TS read rates varies with the VBR, changing the dCORRECTTM value greatly, the amplitude is limited in a predetermined range, so that clock jitter can be corrected without departing greatly from the original clock jitter correction value.

The second difference is that an observer OBS is introduced into the flow for determining whether the clock jitter correction value has converged. In the third embodiment, the clock jitter correction value is directly used as a convergence determination condition. In the fourth embodiment, an observer is introduced to improve the precision of convergence determination. To be more specific, a filter for extracting a low-frequency component of the clock jitter correction value is provided, and the filter output is used to determine whether the clock jitter correction value has converged. Accordingly, whether the clock jitter correction value has converged can be determined while the change in the TS read rate due to VBR, the wireless packet retransmission control in the wireless section, and other effects of disturbance are minimized.

The clock regeneration procedure in the wireless receiving device 50 when a wireless packet including a TS sent from the wireless sending device 40 of the fourth embodiment will be described with reference to FIG. 26 to FIG. 28. In the description of the fourth embodiment, FIG. 1 to FIG. 10, FIG. 13, FIG. 14, FIG. 18 to FIG. 25, which are used to describe the third embodiment, are also referenced. The same steps in FIGS. 26 and 27 and FIGS. 22 and 23 are referenced by the same reference marks. In the same manner as the third embodiment, when the TS receiving starts, the CPU 54 (FIG. 5) of the wireless receiving device 50 identifies the sending device (corresponding to the wireless sending device 40) in accordance with the header information added to the wireless packet (step S211 of FIG. 19). The sending device is identified by either or both of the MAC address added to the header information of the wireless packet and the device identification information specific to the sending device (such as the IP address), for example.

After the sending device is identified, the CPU 54 (FIG. 5) in the wireless receiving device 50 checks whether a storage device (part of the memory 53 or another memory, not shown in the figure, for example) in the wireless receiving device 50 already stores the time correction value of the sending device identified earlier (also referred to as a "previous time correction value"), in accordance with the device identification information of the sending device (step S212 of FIG. 19). If the wireless receiving device 50 is found to contain the previous time correction value (clock jitter correction value) in step S212 of FIG. 19, the CPU 54 (FIG. 5) sets the stored previous time correction value as the initial value in the time correction value storage register 5215 (FIG. 8) of the TS data read timing generating circuit 521 (FIG. 6) and sets α to the table value of the correction table (i.e., table=α) (step S213 of FIG. 19). If the wireless receiving device 50 does not store the previous time correction value (clock jitter correction value), the CPU 54 (FIG. 5) sets the initial value '0' in the time correction value storage register 5215 (FIG. 8) in the TS data read timing generating circuit 521 (FIG. 6) and sets the value '0' to the table value of the correction table (table=0) (step S214 of FIG. 19). Then, the CPU 54 (FIG. 5) sets the initial value '0' in the integration result storage register 5230 (FIG. 9), the TS output count register 5232 (FIG. 9), and the measurement time storage register 5234 (FIG. 9) of the TS memory read control circuit 522 (FIG. 6) (step S215 of FIG. 19). At the same time, the initial value '0' is set in the memory storage data amount integration circuit 5229 (FIG. 9), the TS output counter 5231 (FIG. 9), and the measurement time counter 5233 (FIG. 9) of the TS memory read control circuit 522 (FIG. 6). The CPU 54 sets the initial values to parameters CONVF, CONV_CNT, and n used to calculate the time correction value (step S215 of FIG. 19). CONVF is a convergence determination flag. If the clock jitter correction value has converged in the calculation of the clock jitter correction value stages, the convergence determination flag CONVF is set to '1'. CONV_CNT is a count value of the counter counting the number of times continuously the difference dCORRECTTM of the clock jitter correction value in a predetermine convergence range in the clock jitter correction value calculation stages. n is a count value of the counter counting a stop period in which the clock jitter correction value calculation operation is stopped because of a great change in TS rate until the great change in the TS storage capacity of the memory 53 (FIG. 5) has converged.

The initial value is measured and set in step S216 of FIG. 19, taking the procedure shown in FIG. 20. After the initial value is set in step S216 of FIG. 19, the CPU 54 (FIG. 5) starts calculating the clock jitter correction value. The operation to calculate the clock jitter correction value will be described with reference to FIG. 21. After the measurement time used when the clock jitter correction value is calculated is set in step S239 (see FIG. 20), the CPU 54 (FIG. 5) waits until the predetermined measurement time elapses (step S51 of FIG. 21). After a lapse of the measurement time in step S51, the measurement value MEMSUM and the average read rate TSRate measured at the last time in step S52 are saved in PMEMSUM and PTSRate. Then, in step S53, the CPU 54 (FIG. 5) reads the results of measurement held in the integration result storage register 5230 (FIG. 9), the TS output count register 5232 (FIG. 9), and the measurement time storage register 5234 (FIG. 9), and sets the initial value '0' in the integration result storage register 5230 (FIG. 9), the TS output count register 5232 (FIG. 9), and the measurement time storage register 5234 (FIG. 9) in step S54. At the same time, the initial value '0' is set also in the memory storage data amount integration circuit 5229 (FIG. 9), the TS output counter 5231, and the measurement time counter 5233. The CPU 54 (FIG. 5) then calculates the measurement value MEMSUM and the average read rate TSRate, using the register values, taking the procedure described in the third embodiment (steps S55 and S56 of FIG. 21).

In step S57, the deviation (difference) between the measurement value MEMSUM and the initial value PMEMSUM is calculated, and clock jitter value dSUM is calculated. With the clock jitter value dSUM calculated in step S58, the clock jitter correction value CORRECTTM is calculated. The calculation flow of the clock jitter correction value in the fourth embodiment will be described with reference to FIG. 26. In the same manner as the third embodiment, the clock jitter value dSUM is used to calculate the clock jitter correction difference value dCORRECTTM in step S71. The CPU 54 (FIG. 5) finishes the calculation of the clock jitter correction difference value dCORRECTTM and compares the absolute value of the amplitude with constant dCRCTLIM[table] in step S91. If the absolute value exceeds dCRCTLIM[table], the amplitude is limited. To be more specific, if clock jitter correction difference value dCORRECTTM is positive in step S92

$$d\text{CERRECTTM}=d\text{CRCTLIM[table]}$$

(step S93 of FIG. 26). If the clock jitter correction difference value dCORRECTTM is negative, $$d\text{CERRECTTM}=-d\text{CRCTLIM[table]}$$

(step S94 of FIG. 26).

The reason is as follows: As has been described above, the calculation of the clock jitter correction difference value dCORRECTTM contains a change in the TS read rate due to VBR, the effect of wireless packet retransmission control in the wireless section, and the like as well as the clock jitter value resulting from the clock frequency deviation between the wireless sending device 40 and the wireless receiving device 50 (see the hatched part in FIG. 14). When the clock jitter correction value is calculated, the system must be operated with stability against disturbance other than the clock jitter value. Accordingly, the clock jitter correction value will not depart greatly from a predetermined range in the fourth embodiment even if a great external disturbance is input, because the correction range of the clock jitter correction value is limited by imposing limitations on the amplitude of the clock jitter correction difference value dCORRECTTM. Since the clock jitter correction value can be kept in a range set in each convergence determination stage, the system can operate with stability. The dCRCTLIM[table] value is varied in the convergence determination stages, so that clock jitter value dSUM can converge early immediately after the TS receiving starts, and the clock jitter correction value can be kept in a predetermined range in the converged stage even if a great disturbance is input.

When the calculation of clock jitter correction difference value dCORRECTTM is completed, the clock jitter correction value corrected before and the currently calculated clock jitter correction difference value dCORRECTTM are added to obtain a clock jitter correction value (step S72 of FIG. 26). Since the calculated clock jitter correction difference value is a result of control by the time correction value storage register 5215 (FIG. 8), the clock jitter correction difference value calculated in the algorithm above is a difference. Therefore, when the clock jitter correction value is set in the time correction value storage register 5215 (FIG. 8), the calculated clock jitter correction difference value is added to the current clock jitter correction value.

In the same manner as the third embodiment, when the clock jitter correction value is calculated in the fourth embodiment, clipping is executed in steps S73 to S76 in such a way that the clock jitter correction value CORRECTTM is within arrange defined by a predetermined value (denoted by ϵ in FIG. 26). To be more specific, it is checked in step S73 whether the CORRECTTM value is within a predetermined range (−ϵ≦CORRECTTM≦ϵ). If the CORRECTTM value is within the predetermined range, the operation to calculate the clock jitter correction value is finished. On the other hand, if the CORRECTTM value exceeds the predetermined range, it is checked in step S74 whether the CORRECTTM value is positive. If the CORRECTTM value is positive, CORRECTTM=ϵ is set, and the operation to calculate the clock jitter correction value finishes (step S75 of FIG. 26). If the CORRECTTM value is negative, CORRECTTM=−ϵ is set, and the operation to calculate the clock jitter correction value finishes (step S76 of FIG. 26). When the calculation of the clock jitter correction value (CORRECTTM value) is finished, the CPU 54 (FIG. 5) sets the above-mentioned calculated clock jitter correction value in the time correction value storage register 5215 of the TS data read timing generating circuit 521 (FIG. 6) (step S59 of FIG. 21). When the setting of the clock jitter correction value is finished, the CPU 54 (FIG. 5) determines whether the clock jitter correction value has converged (step S60 of FIG. 21).

The procedure for determining whether the clock jitter correction value has converged in the fourth embodiment will be described with reference to FIG. 27 and FIG. 28. In the fourth embodiment, the observer OBS is used to determine whether the clock jitter correction value has converged, as has been described above. To be more specific, the calculated clock jitter correction value is input to a low-pass filter having a comparatively great time constant, and the low-frequency component is extracted. The extracted low-frequency component of the clock jitter correction value is used to determine the convergence in each convergence stage. The procedure for determining convergence in the fourth embodiment with reference to the flowchart shown in FIG. 27. The CPU 54 (FIG. 5) sets the clock jitter correction value in the time correction value storage register 5215 of the TS data read timing generating circuit 521 (FIG. 6), and then determines convergence in accordance with the procedure for determining the convergence shown in FIG. 26. When the convergence determination is made, the observer OBS measured at the last time in step S101 is saved as POBS. Immediately after the TS receiving starts, the observer OBS is not calculated, and '0' is entered as POBS. In the determination of convergence of the clock jitter correction value using the observer OBS in the fourth embodiment, the low-frequency component of the clock jitter correction value is extracted to determine the convergence, as has been described above. Accordingly, in the fourth embodiment the convergence of the clock jitter correction value is not determined a predetermined number of times immediately after the TS receiving starts, and just the low-frequency component of the clock jitter correction value is extracted (step S102 of FIG. 27).

If the clock jitter correction is not completed the number of times (e.g., ten times) more than that set in step S102, the operation to determine whether the clock jitter correction value has converged is skipped in step S102. If it is determined in step S102 that the clock jitter correction fails more than a predetermined number of times (e.g., ten times), the CPU 54 (FIG. 5) checks in step S104 whether the processing is first processing after initialization. If the processing is first processing after initialization, the CORRECTTM value is substituted into the observer OBS as the initial value (step S105 of FIG. 27). If the processing is not immediately after initialization, the observer OBS is calculated to extract the low-frequency component of the clock jitter correction value, as given below (step S106 of FIG. 27).

$$OBS=0.99*OBS+0.01*CORRECTTM$$

The processing is repeated a predetermined number of times to finish the initialization of the observer OBS. Then, the processing to determine whether the clock jitter correction value has converged starts (step S102 of FIG. 27).

After OBS is initialized, the CPU 54 (FIG. 5) calculates the observer OBS in step S103. In the fourth embodiment, the time constant used to calculate the observer OBS in step S106 matches the time constant used to calculate the observer OBS in step S103. However, the same effect can be obtained even if the time constant in step S106 is smaller than the time constant in step S103. In the fourth embodiment, the convergence stages uses the same time constant in step S103, as shown in FIG. 27. However, the same effect can be obtained even if the convergence determination stages use increasing time constants in the calculation of the observer OBS.

When the calculation of the observer OBS is finished in step S103, the CPU 54 (FIG. 5) checks whether |OBS-POBS| is within a predetermined range (OBSCONV[table]) (step S107 of FIG. 27). FIG. 28 shows the convergence determination thresholds (OBSCONV[table]) in the stages. In the figure, OBSCRCTML is a predetermined constant. As shown in the figure, higher stages have lower thresholds (bringing the clock jitter correction value into convergence), in the same manner as the third embodiment. In the fourth embodiment, the parameters of the stages are set as shown in FIG. 28, but other parameters may also be used.

If |OBS-POBS| is found to be beyond a predetermined range in step S107, the CPU 54 (FIG. 5) sets the variable CONV_CNT to 0 and finished the convergence determination operation (step S82 of FIG. 27). If |OBS-POBS| is within the predetermined range, the CPU 54 (FIG. 5) adds 1 to CONV_CNT (step S83 of FIG. 27) and compares the result with CONV_NUM[table] (step S84 of FIG. 27). If the result does not exceed CONV_NUM[table], the convergence determination is finished. If the result exceeds CONV_NUM [table], it is determined that the convergence has been made. With the convergence determination flag (CONVF) set to 1 and CONV_CNT set to 0, the convergence determination operation is finished. In the fourth embodiment, if |OBS-POBS| enters the predetermined range several times continuously, it is determined that the clock jitter correction value has converged, in the same manner as the third embodiment.

If it is determined that the clock jitter correction value has converged (CONVF=1) (step S60 of FIG. 21), the CPU 54 (FIG. 5) adds '1' to the table value and sets the convergence determination flag to '0' (step S61 of FIG. 21). In step S62, the table value is compared with the predetermined value β ('4' in the third embodiment) (step S62 of FIG. 21). If β is exceeded by the table value, the table value is set to β (step S63 of FIG. 21). In the fourth embodiment, β is 4. When the convergence determination is finished, the CPU 54 (FIG. 5) sets the measurement time (step S64 of FIG. 21). After the measurement time is set, the CPU 54 (FIG. 5) detects whether the stream receiving from the wireless sending device 40 has ended. If the stream receiving has not ended, the CPU waits until the measurement time set to calculate the next clock jitter correction value in step S64 elapses (step S51 of FIG. 21) and calculates the clock jitter correction value again. If the stream has ended, it is checked whether the convergence determination stage (table value) is γ or greater (step S219 of FIG. 19). If γ is not exceeded, the TS receiving operation is finished. If γ is exceeded, the current table value and the clock jitter correction value are stored (step S220 of FIG. 19), and the TS receiving operation is finished. The clock regeneration method using the clock jitter correction value is the same as the third embodiment, and will not be described here again.

In the fourth embodiment, the clock jitter correction value is calculated, and the convergence of the clock jitter correction value is determined, as described earlier. In the calculation of the dCORRECTTM value, because the correction range of the clock jitter correction value is limited, the clock jitter correction value will not depart greatly from a predetermined range even if a great external disturbance is input. Accordingly, the clock jitter correction value can be kept within a range predetermined in each convergence determination stage, and the system can operate with stability. In the convergence determination of the clock jitter correction value, because an observer is introduced as described earlier, a wrong convergence determination of the clock jitter correction value will not be made even if a great external disturbance is input, and the system can be controlled with higher stability (control precision can be improved). To be more specific, the low-frequency component extracted from the clock jitter correction value is used to determine whether the clock jitter correction value has converged, so that the convergence of the clock jitter correction value can be determined while a change in TS read rate due to VBR, the effect of wireless packet retransmission control in the wireless section, and the like are minimized.

With the data receiving method of the fourth embodiment, because clock synchronization between the wireless sending device 40 and the wireless receiving device 50 can be stabilized, the TS can be continuously output without underflow or overflow even if the VBR TS transmitted by radio with jitter is received. Accordingly, when an MPEG2 TS is decoded and reproduced by an apparatus on the receiving side, the MPEG2 data can be reproduced without video interruption.

Fifth Embodiment

Figure 29:
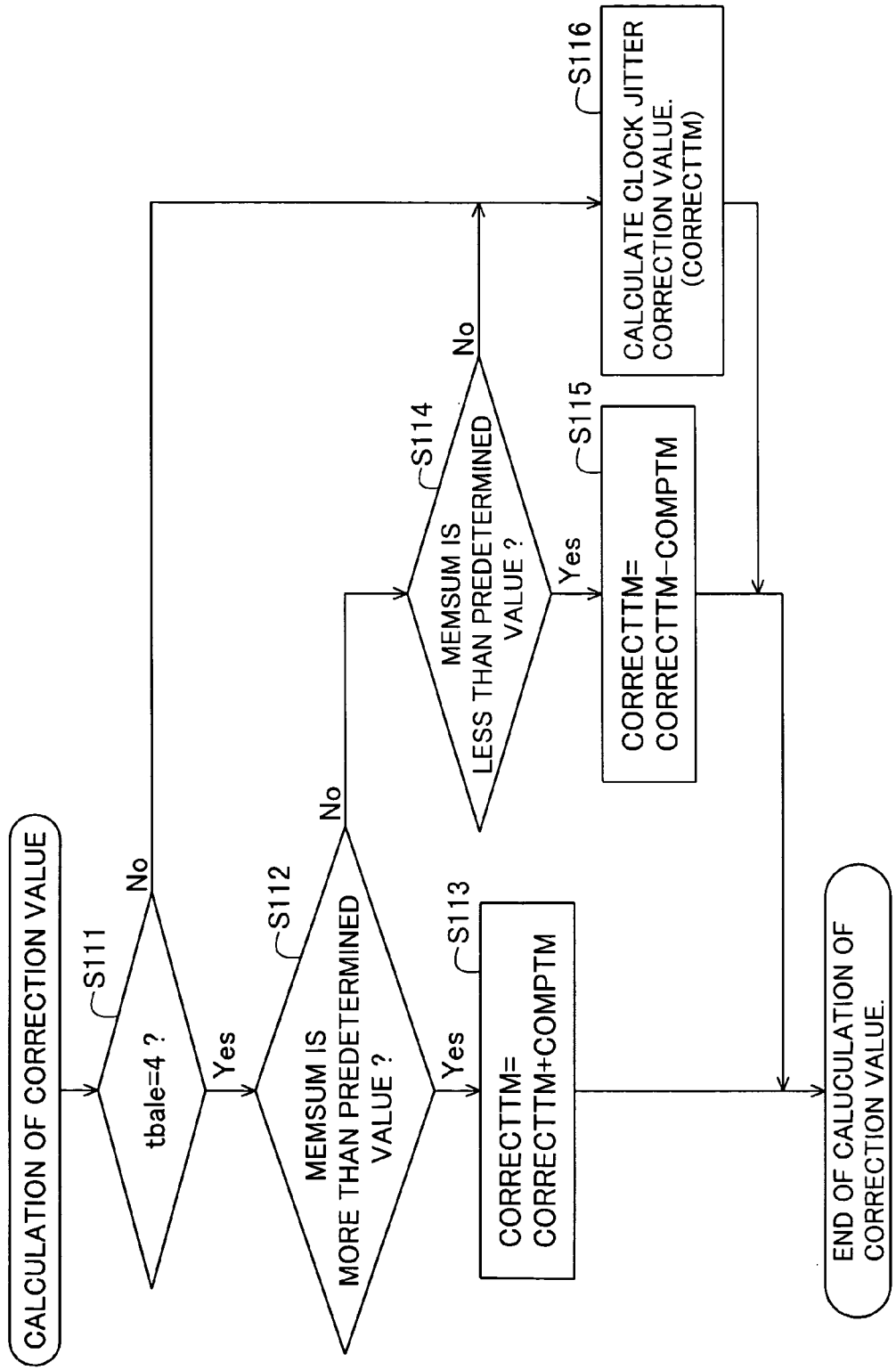
FIG. 29 is a flowchart showing an operation of the clock jitter correction value of the fifth embodiment in a flow shown in the flowchart of FIG. 21.

FIG. 29 is a flowchart showing an operation of the wireless receiving device 50 in the fifth embodiment of the present invention when the clock jitter correction value is calculated. The fifth embodiment differs from the third embodiment in that a new flow is employed to add an offset to the clock jitter correction value in accordance with the amount of the stored TS in the memory 53 (FIG. 5) and to keep the control target value in a predetermined range when the clock jitter correction is made. With this configuration, the clock jitter correction can be made with higher stability even after the clock jitter correction value has converged. The principle of the fifth embodiment will be briefly described below with reference to FIG. 14. FIG. 14 shows an example in which a clock frequency on the receiving side of the wireless receiving device 50 is higher than a clock frequency on the sending side of the wireless sending device 40, and a reference clock of the wireless receiving device 50 is faster than a reference clock of the wireless sending device 40. As shown in the figure, in the calculation of the clock jitter correction value, the average number of the TS's temporarily stored in the memory 53 (FIG. 5) gradually decreases until the clock jitter correction value has converged. Further, if a clock frequency on the receiving side of the wireless receiving device 50 is lower than a clock frequency on the sending side of the wireless sending device 40, the average number of the TS's temporarily stored in the memory 53 (FIG. 5) gradually increases.

Therefore, in the example shown in FIG. 14, the clock jitter correction value has converged with the maximum value of the amount of the TS temporarily stored in the memory 53 (FIG. 5) set in a position lower than a position of $F_0$ shown in the figure. Accordingly, when the average rate of the input TS suddenly changes (for example, when the input stream changes from an HD stream to an SD stream), the memory 53 (FIG. 5) underflows. This occurs because just the deviation between PMEMSUM and MEMSUM is used to calculate the clock jitter correction difference value (also referred to as a "dCORRECTTM value"), and the average number of the TS's stored in the memory 53 (FIG. 5) when the clock jitter correction value has converged is in an off-center position of the memory. In the third embodiment, after the clock jitter correction value has converged, an offset is forced to be added to the clock jitter correction value to bring the average number of the TS's stored in the memory 53 (FIG. 5) to a center of the memory, so that the clock jitter correction value can be calculated to accommodate a change in the average rate of the input TS.

The calculation flow of the clock jitter correction value will be described below with reference to the flowchart shown in FIG. 29. The fifth embodiment differs from the third embodiment just in the calculation flow of clock jitter shown in FIG. 29 (FIG. 22 in the third embodiment). Therefore, the same operation as that in the third embodiment will not be described in detail. After the initial value is measured and set in step S216 (FIG. 19), the CPU 54 (FIG. 5) starts the operation to correct the clock jitter. When the clock jitter correction starts, the CPU 54 first waits in step S51 (FIG. 21) until the measurement time elapses. After a lapse of the measurement time, the CPU 54 (FIG. 5) saves a measurement value MEMSUM and an average read rate TSRate temporarily as PMEMSUM and PTSRate, reads the measurement results held in the integration result storage register 5230 (FIG. 9), the TS output count register 5232 (FIG. 9), and the measurement time storage register 5234 (FIG. 9), then sets the integration result storage register 5230 (FIG. 9), the TS output count register 5232 (FIG. 9), and the measurement time storage register 5234 (FIG. 9) to the initial value '0'. At this time, the CPU 54 (FIG. 5) sets the memory storage data amount integration circuit 5229 (FIG. 9), the TS output counter 5231, and the measurement time counter 5233 to the initial value '0'. Then, the CPU 54 (FIG. 5) calculates the measurement value MEMSUM, the average read rate TSRate, and the clock jitter value dSUM, and then calculates the clock jitter correction value (steps S52 to S58 of FIG. 21).

When the calculation of the clock jitter correction value starts, the CPU 54 (FIG. 5) confirms in step S111 (FIG. 29) whether the currently used convergence determination table is 4 (i.e., table=4). If the correction table (table value) is smaller than 4, the clock jitter correction value is calculated in step S116, taking the calculation flow of the clock jitter correction value CORRECTTM shown in FIG. 22, which was described in the third embodiment. On the other hand, if the currently used convergence determination table is found to be 4 in step S111, it is determined whether the measurement value MEMSUM exceeds a predetermined level (the upper limit of the MEMSUM value) (step S112 of FIG. 29). If the measurement value MEMSUM exceeds the predetermined level (the upper limit of the MEMSUM value), a predetermined value (COMPTM) is added to the current CORRECTTM value and the operation to calculate the clock jitter correction value is finished (step S113 of FIG. 29). If an offset value is forced to be added to the CORRECTTM value in step S113 when the previous CORRECTTM value is calculated through the routine, the CORRECTTM value is directly output as it is (this flow is not shown in the figure).

On the other hand, when the measurement value MEMSUM is found to be lower than a predetermined level (the upper limit of the MEMSUM value) in step S112, whether the measurement value MEMSUM is lower than another predetermined level (the lower limit of the MEMSUM value) is checked in step S114. If the value is lower than the predetermined level (the lower limit of the MEMSUM value), a predetermined value (COMPTM) is subtracted from the current CORRECTTM value, and the operation to calculate the correction value is finished (step S115). If an offset value is added to the CORRECTTM value through this routine in the previous CORRECTTM calculation, the CORRECTTM value is directly output as it is (this flow is not shown in the figure). If the measurement value MEMSUM is found to exceed a predetermined level (the lower limit of the MEMSUM value) in step S114, the clock jitter correction value is calculated in step S116, taking the calculation flow of the clock jitter correction value shown in FIG. 22, which was used to describe the third embodiment. In the fifth embodiment, when the clock jitter correction value is calculated in step S116, if an offset is forced to be added to the CORRECTTM value in step S113 or step S115 in the previous clock jitter correction value calculation, the offset value is subtracted from the CORRECTTM value, unlike step S72 shown in FIG. 22, in which the dCORRECTTM value is added to the current CORRECTTM value. In the first stage to return to the normal flow for calculating the clock jitter correction value, the calculation of the clock jitter correction value is masked, and the added offset value is added to the current CORRECTTM value, so that there is an effect that the offset value added to the converged CORRECTTM value will not become a disturbance, and the system control can be controlled with stability.

In the fifth embodiment, when the clock jitter correction value is calculated, the procedure shown in FIG. 29 is taken. If the clock jitter correction value has converged, an offset of the clock jitter correction value is forced to be added to bring the average number of the TS's stored in the memory 53 (FIG. 5) to a center of the memory. Therefore, there is an effect that a clock jitter correction value calculation can be controlled (without memory underflow or overflow) to accommodate a change in the average rate of the input TS. Further, in the fifth embodiment, a case where an offset is forced to be added when table=4 has been described, but the present invention is not limited to this case. The same effect can be provided by determining the threshold of the measurement value MEMSUM in each convergence determination stage and conducting the operation described above in each convergence stage.

Sixth Embodiment

Figure 30:
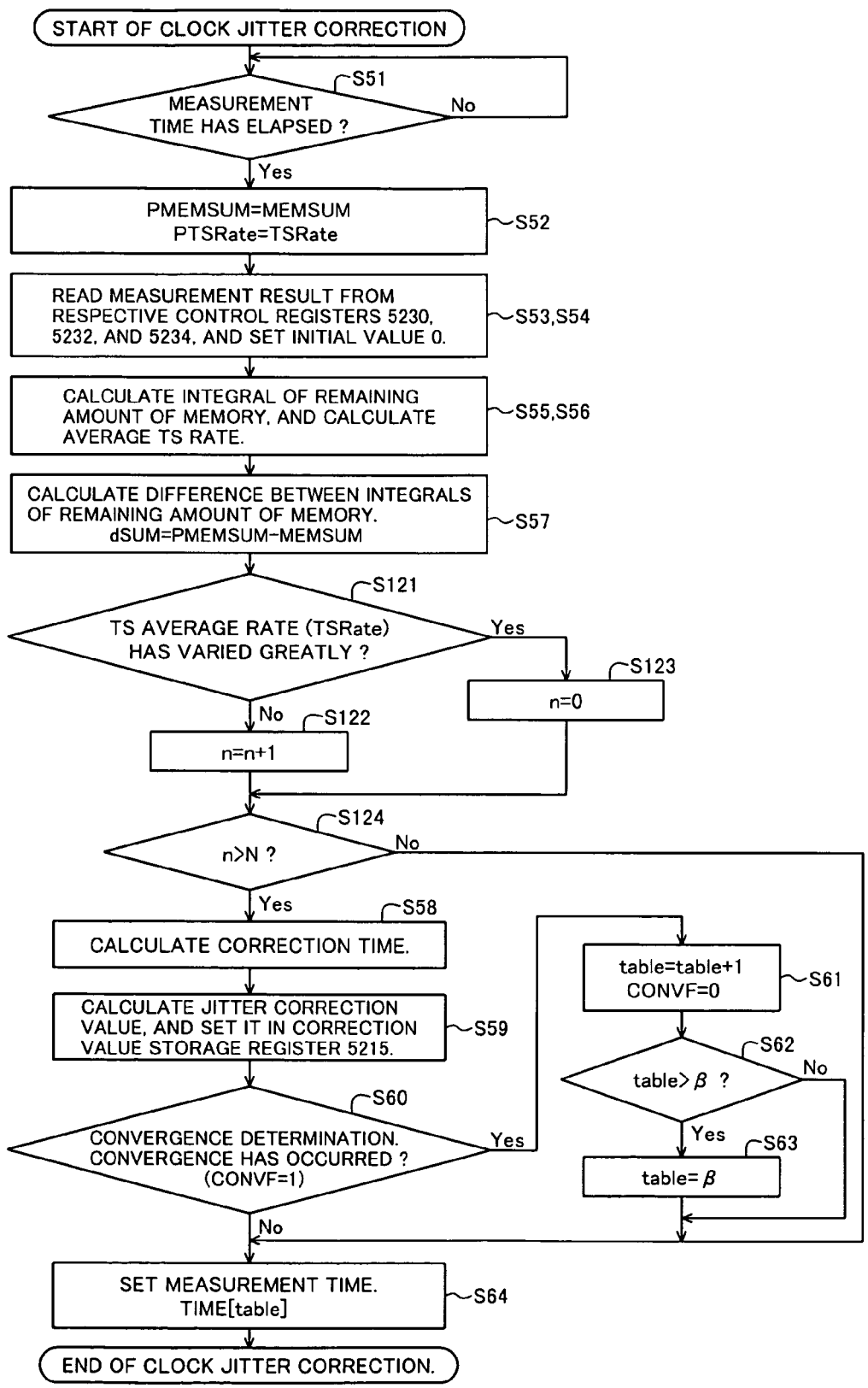
FIG. 30 is a flowchart showing an operation to correct clock jitter (calculate a clock jitter value) of the sixth embodiment in a flow shown in the flowchart of FIG. 19.

FIG. 30 is a flowchart showing an operation of the wireless receiving device in the sixth embodiment of the present invention when a clock jitter correction value is calculated. The sixth embodiment differs from the third embodiment in that a flow for monitoring a TS read rate, and if the TS read rate varies greatly, masking the calculation of the clock jitter correction value and the determination of the convergence of the clock jitter correction value is added. As has been described above, in the third embodiment, if a broadcast program changes, changing the received stream from an HD stream (20 Mbps) to an SD stream (6 Mbps), the measurement value MEMSUM (also referred to as a "MEMSUM value") changes greatly. This change does not result from the clock jitter value but results from the change in the average read rate of the received stream. Therefore, if the control is made in accordance with the flow indicated in the third embodiment (FIG. 21), the clock jitter correction value departs greatly. Accordingly, in the sixth embodiment, attention is directed to the change in the measured average TS rate. If the rate varies greatly, the operation to calculate the clock jitter correction value is masked, so that the system can operate with stability.

The calculation flow of the clock jitter correction value will be described below with reference to the flowchart shown in FIG. 30. The sixth embodiment differs from the third embodiment just in the calculation flow of the clock jitter correction value shown in FIG. 30 (FIG. 21 in the third embodiment). The operation in the sixth embodiment that is the same as the operation in the third embodiment will not be described in detail. After the initial value is measured and set in step S216 (FIG. 19), the CPU 54 (FIG. 5) starts the operation to correct clock jitter. After the clock jitter correction operation starts, the CPU 54 waits in step S51 (FIG. 21) until the measurement time elapses. After a lapse of the measurement time, the CPU 54 (FIG. 5) saves a measurement value MEMSUM and an average read rate TSRate temporarily as PMEMSUM and PTSRate, reads the results of measurement held in the integration result storage register 5230 (FIG. 9), the TS output count register 5232 (FIG. 9), and the measurement time storage register 5234 (FIG. 9), then sets the integration result storage register 5230 (FIG. 9), the TS output count register 5232 (FIG. 9), and the measurement time storage register 5234 (FIG. 9) to the initial value '0'. Also, the memory storage data amount integration circuit 5229 (FIG. 9), the TS output counter 5231, and the measurement time counter 5233 are also set to the initial value '0'. Next, the CPU 54 (FIG. 5) calculates the measurement value MEMSUM, the average read rate TSRate, and the clock jitter value dSUM to calculate a correction value (steps S52 to S57 of FIG. 30).

After the calculation of the clock jitter value dSUM is finished, the CPU 54 (FIG. 5) checks in step S121 (FIG. 30) whether the TS rate has varied greatly. If the average TS rate is found to vary greatly, '0' is set to n in step S123. On the other hand, if no great change has been found, the value of n is incremented by '1' (step S122 of FIG. 30). It is checked in step S124 whether n has exceeded a predetermined level (N). If n exceeds a predetermined value N, step S58 and subsequent steps for calculating the clock jitter correction value are executed. On the other hand, if n does not exceed the predetermined value N, the calculation flow of the clock jitter correction value is skipped, and the calculation flow of the clock jitter correction value is finished.

In the sixth embodiment, the calculation flow of the clock jitter correction value is controlled as described above, and even if the TS read rate varies greatly, the calculation of the clock jitter correction value and the determination of the convergence of the clock jitter correction value are masked. Therefore, there is an effect that the clock jitter correction value will not depart greatly and the system can operate with stability, even if a broadcast program changes, changing the reception stream from an HD stream (20 Mbps) to an SD stream (6 Mbps). In the sixth embodiment, after a TS rate varies greatly, the clock jitter value correction is masked a predetermined number of times for the following reason. The received TS is read from the memory 53 (FIG. 5) in accordance with the time stamp information added to the beginning of the TS. If the average read rate of the TS varies greatly, the control point in the memory 53 changes, as described in the fifth embodiment. Therefore, in the sixth embodiment, the device is configured so that if the received TS rate varies greatly in the sixth embodiment, the calculation of the clock jitter correction value is masked until the control point in the memory 53 is stabilized and the system can operate with stability.

In the sixth embodiment, a change in the received TS rate is calculated from a change in the number of the TS's read from the TS output count register 5232, but the present invention is not limited to this. A TS input counter for counting the number of the TS's input to the memory 53 may be provided, and the received TS rate may be determined from the count value of the TS input counter. There is an effect that since a change in the received TS rate can be detected, any great change in the received TS rate can be detected and the system can operate with stability by masking the calculation of the clock jitter correction value until the control point in the memory 53 is stabilized. A change in the received TS rate occurs not only in the example described above. The received TS rate changes greatly also when a D-VHS device is switched from a normal play mode to a fast play mode. There is an effect that even in such case, the system can operate with stability through the above described control.

Seventh Embodiment

Figure 31:
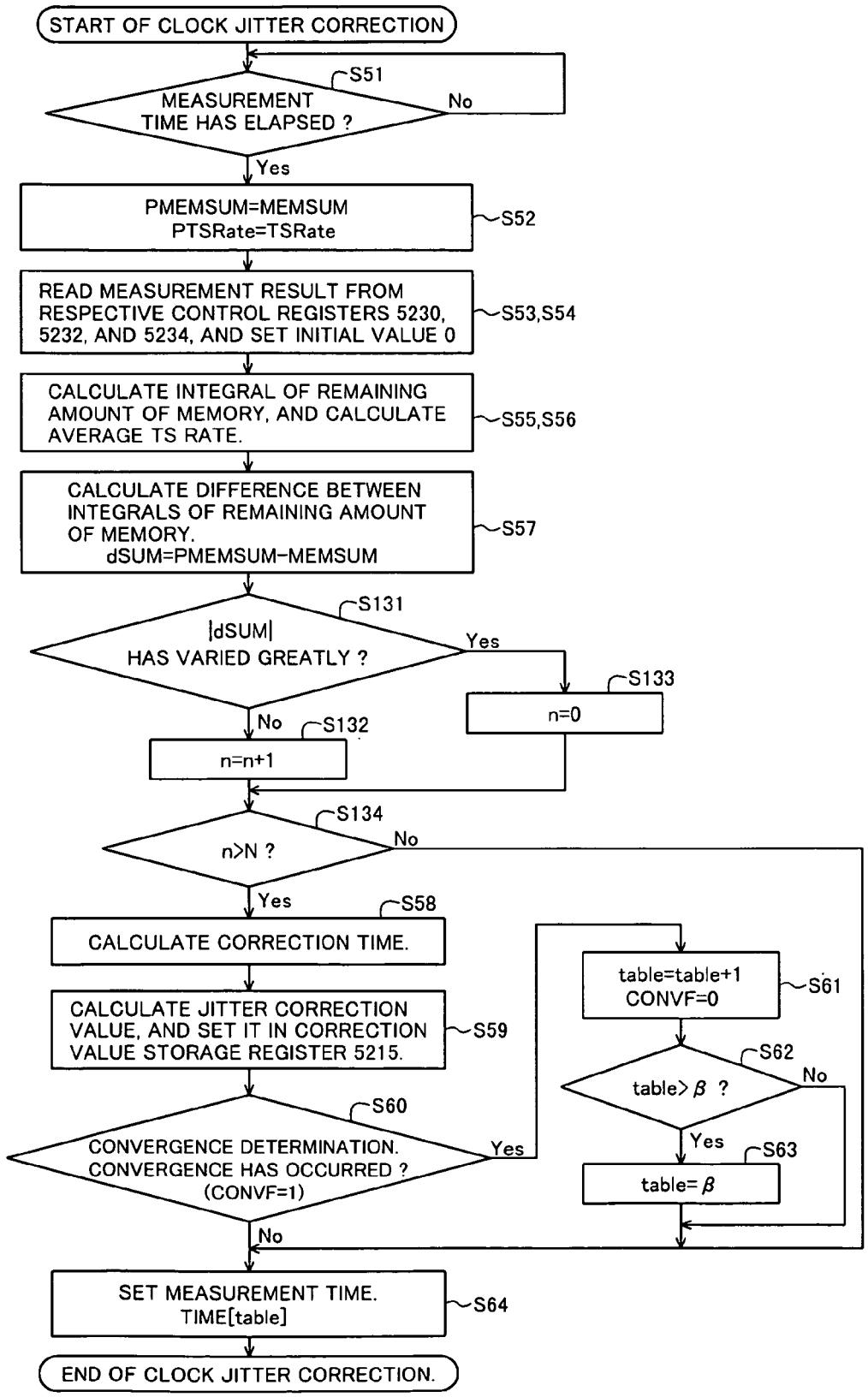
FIG. 31 is a flowchart showing an operation to correct clock jitter (calculate a clock jitter value) of the seventh embodiment in a flow shown in the flowchart of FIG. 19.

FIG. 31 is a flowchart showing an operation of a wireless receiving device in the seventh embodiment of the present invention when the clock jitter correction value is calculated. The seventh embodiment differs from the third embodiment (FIG. 21) in that a flow, in which the remaining memory amount integral difference (clock jitter value dSUM) is monitored, and if the clock jitter value dSUM varies greatly, the calculation of the clock jitter correction value and the determination of the convergence of the clock jitter correction value are masked, is added. As has been described above, if a broadcast program changes, changing the received stream from an HD stream (20 Mbps) to an SD stream (6 Mbps), a measurement value MEMSUM (also referred to as a "MEMSUM value") varies greatly. This change does not result from the clock jitter value but results from a change in the average read rate of the received stream. Accordingly, in the seventh embodiment, the clock jitter value dSUM is used to detect a change in the average TS rate of the received stream. (In the sixth embodiment, the received TS rate is used.)

The calculation flow of the clock jitter correction value will be described below with reference to the flowchart shown in FIG. 31. The seventh embodiment differs from the sixth embodiment just in the mask flow for masking the clock jitter correction shown in FIG. 31 (FIG. 30 in the sixth embodiment). Therefore, the same parts as in the sixth embodiment will not be described in detail. After the initial value is measured and set in step S216 (FIG. 19), the CPU 54 (FIG. 5) starts the operation to correct the clock jitter. After the clock jitter correction operation starts, the CPU 54 waits in step S51 (FIG. 21) until the measurement time elapses. After a lapse of the measurement time, the CPU 54 (FIG. 5) saves a measurement value MEMSUM and an average read rate TSRate temporarily, reads the results of measurement held in the integration result storage register 5230 (FIG. 9), the TS output count register 5232 (FIG. 9), and the measurement time storage register 5234 (FIG. 9), and then sets the integration result storage register 5230 (FIG. 9), the TS output count register 5232 (FIG. 9), and the measurement time storage register 5234 (FIG. 9) to the initial value '0'. The memory storage data amount integration circuit 5229 (FIG. 9), the TS output counter 5231, and the measurement time counter 5233 are also set to the initial value '0'. Next, the CPU 54 (FIG. 5) calculates the measurement value MEMSUM, the average read rate TSRate, and the clock jitter value dSUM to calculate a correction value (steps S52 to S57 of FIG. 31).

After the calculation of the clock jitter value dSUM is finished, the CPU 54 (FIG. 5) checks in step S131 (FIG. 31) whether the clock jitter value dSUM varies greatly. If the clock jitter value dSUM is found to vary greatly, '0' is set to n in step S133. On the other hand, if no great change is found, the value of n is incremented by '1' (step S132 of FIG. 31). It is checked in step S134 whether n exceeds a predetermined level N. If n exceeds the predetermined level N, a step 58 and subsequent steps for calculating the clock jitter correction value are executed. On the other hand, if n does not exceed the predetermined level N, the calculation flow of the clock jitter correction value is skipped, and the operation to calculate the clock jitter correction value is finished.

In the seventh embodiment, since the calculation flow of the clock jitter correction value is controlled as described above, even if the clock jitter value dSUM (TS read rate) varies greatly, the calculation of the clock jitter correction value and the determination of the convergence of the clock jitter correction value are masked. Therefore, there is an effect that if a broadcast program changes, changing the received stream from an HD stream (20 Mbps) to an SD stream (6 Mbps), the clock jitter correction value will not depart greatly, and the system can operate with stability. In the seventh embodiment, the clock jitter value correction is masked a predetermined number of times after the clock jitter value dSUM varies greatly, in the same manner as the sixth embodiment for the following reason. The received TS is read from the memory 53 (FIG. 5) in accordance with the time stamp information added to the beginning of the TS. Therefore, if the TS average read rate varies greatly, the control point in the memory 53 changes, as has been described in the sixth embodiment. Accordingly, in the seventh embodiment, if the received TS rate varies greatly, the calculation of the clock jitter correction value is masked until the control point is stabilized in the memory 53, so that the system can operate with stability.

Figure 32:
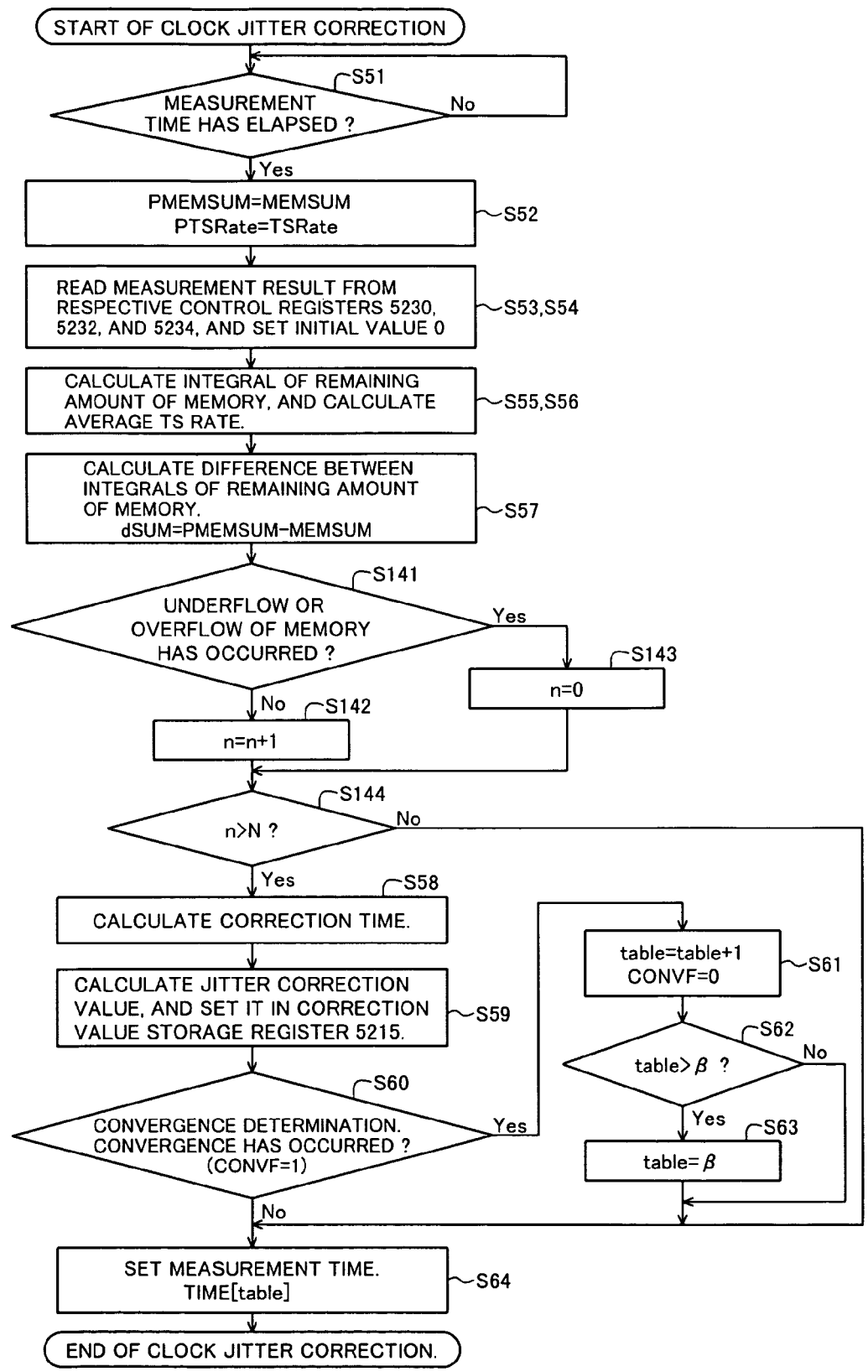
FIG. 32 is a flowchart showing an operation to correct clock jitter (calculate a clock jitter value) of a modification of the seventh embodiment in a flow shown in the flowchart of FIG. 19.
Figure 33:
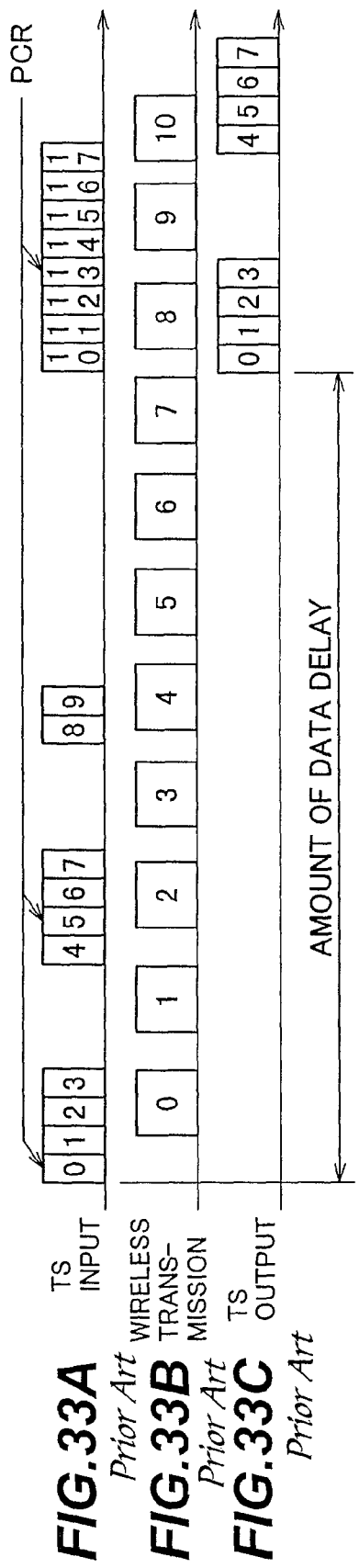
FIGS. 33A to 33C are diagrams for describing the conventional data transmission method.
Figure 34:
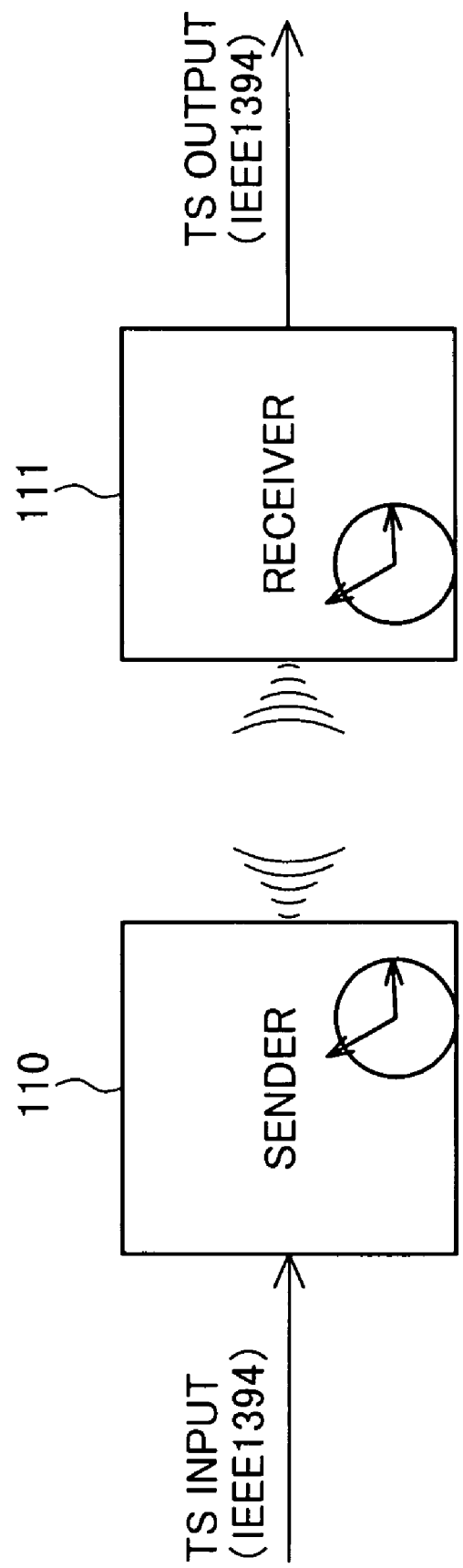
FIG. 34 is a diagram showing a configuration of the conventional wireless TS transmission system.

In the seventh embodiment, the operation to calculate the clock jitter correction value is masked in accordance with the amplitude of the clock jitter value dSUM, but the present invention is not limited to this. For example, there is an effect that if the calculation of the clock jitter correction value is masked a predetermined number of times when the overflow or underflow of the memory 53 (FIG. 5) is detected during the calculation of the clock jitter correction value, as shown in the operation flow (steps S141 to S144) in FIG. 32, the clock jitter correction value will not depart greatly, and the system can operate with stability. Especially, there is an effect that in a case where the clock jitter correction value has already converged, even when a great change in the received TS rate occurs (for example, when a D-VHS device switches from a normal play mode to a fast play mode, the TS receiving may be interrupted for several seconds), the clock jitter correction value is not departed greatly and the system can operate with stability.

Modifications

In the first to seventh embodiments, a 188-byte TS is transmitted with a 4-byte time stamp added to its head, as shown in FIG. 4. However, the application of the data receiving device (wireless receiving device) and the data receiving method of the present invention is not limited to the described one. For example, a 2-byte time stamp may be added. Also, a Reed-Solomon code or another type of error correction may be added after the 192-byte data shown in FIG. 4 in order to correct a random error that can occur in wireless transmission. Further, the error correction code may be added to just the TS or may be added to each of the time stamp and the TS.

Further, in the first to seventh embodiments, a predetermined number of the time-stamped TS's (seven TS's) are collected to form a wireless packet in order to minimize overhead in the wireless section when the TS is transmitted by radio. However, the application of the data receiving device (wireless receiving device) and the data receiving method of the present invention is not limited to the described one. Eight or more TS's may be collected to form a wireless packet. Also, six or less TS's may be collected to form a wireless packet. Furthermore, the transmission packet length may be varied with the packet error ratio of the wireless section. For example, when the packet error ratio is high, the wireless packet length may be increased to minimize overhead by retransmission control. This enables efficient TS sending and receiving.

Furthermore, in the first to seventh embodiments, the wireless receiving device 50 handles up to two TS's. However, the application of the data receiving device (wireless receiving device) and the data receiving method of the present invention is not limited to the described one. Three or more TS's may be handled simultaneously. When the wireless receiving device 50 handles three or more TS's, as many storage areas as the maximum number of the TS's to be handled are allocated in the memory 53 (FIG. 5), the TS data read timing generating circuits 521 (FIG. 6) corresponding to the individual storage areas may be used to generate a read timing for the TS stored in the memory 53 (FIG. 5). Then, the clock regeneration (clock jitter correction) can be carried for each received TS.

Moreover, in the first to seventh embodiments, the average transmission rate of the received packet is determined by the number of the TS packets read from the memory 53 (FIG. 5). However, the application of the data receiving device (wireless receiving device) and the data receiving method of the present invention is not limited to the described one. For example, the average transmission rate may be calculated from the number of the packets when the TS in the received wireless packet is written into the memory 53 (FIG. 5). Also, the average transmission rate of the received packet may be directly obtained when the packet is received by the wireless LAN module 51 (FIG. 5).

Further, in the first to seventh embodiments, the MAC address or IP address is used to identify the sending device (wireless sending device). However, the application of the data receiving device (wireless receiving device) and the data receiving method of the present invention is not limited to the described one. Other types of device-specific information can be used if there is one-to-one correspondence between the information and the sending device.

Furthermore, in the first to seventh embodiments, when the initial value for clock jitter measurement is calculated, the measurement time is set to the period of one GOP (0.5 seconds). However, the application of the data receiving device (wireless receiving device) and the data receiving method of the present invention is not limited to the described one. The measurement time is set to another value such as 1 second and 2 seconds.

Moreover, in the first to seventh embodiments, the time counter 5213 (FIG. 8) in the TS data read timing generating circuit 521 (FIG. 6) corrects time at intervals of 100 ms. However, the application of the data receiving device (wireless receiving device) and the data receiving method of the present invention is not limited to the described one. Another value such as 10 ms or 200 ms may be set, depending on the type of the oscillator used or the precision of the oscillating element used.

Further, in the first to seventh embodiments, an MPEG2 TS is transmitted through a wireless network with jitter. However, the application of the data receiving device (wireless receiving device) and the data receiving method of the present invention is not limited to the described one. For example, a wide variety of applications include video data transmitted in a different compression method, MPEG2 PES (Packetized Elementary Stream) format, audio data such as telephone, digital audio data reproduced from a CD or the like, and other data that must be transmitted in real time, being transmitted through a network with jitter.

Furthermore, in the first to seventh embodiments, a wired network conforms to the IEEE1394 standard, and a wireless network conforms to the IEEE 802.11a standard. However, the application of the data receiving device (wireless receiving device) and the data receiving method of the present invention is not limited to the described one. The data receiving device and the data receiving method of the present invention can be applied to other wireless networks such as an IEEE 802.11 network which does not have ensured network jitter (clock jitter) in data sending and receiving like the wireless network, an Ethernet network, a network using ultra wideband (UWB) communication, and a Bluetooth network. The data receiving device and the data receiving method of the present invention can be applied to wired networks using power line control (PLC) communication, RF-line communication, and the like.

Moreover, in the first to seventh embodiments, the wireless sending/receiving device forms a part of a wired network conforming to the IEEE1394 standard. However, the application of the data receiving device (wireless receiving device) and the data receiving method of the present invention is not limited to the described one. The network may be configured by a wireless sending/receiving device to which the TS is directly input or a wireless sending/receiving device which includes an MPEG2 encoder and receives an analog video signal or a digital video signal.

Additionally, the present invention can also be applied to an audio-visual home network system using a network such as a wireless LAN with jitter, a video monitoring system for distributing a video stream, and the like.

The invention claimed is:

1. A data receiving device for receiving packet data through a transmission path and outputting the packet data in accordance with time information added beforehand to the packet data, the data receiving device comprising:

a storage means for storing the received packet data; and
a control means for separating the time information added to the received packet data and reading the packet data from the storage means in accordance with the separated time information;
wherein when the control means generates a read timing, the control means calculates a clock frequency deviation between a data sending device and the data receiving device in accordance with an integration result of an amount of the received packet data temporarily stored in the storage means and a measurement result of the integration time, and adds an offset amount based on the deviation to the read timing of the received packet data, thereby generating the read timing of the received packet data; wherein when the control means calculates the clock frequency deviation between the data sending device and the data receiving device and generates the read timing of the received packet data, the control means calculates a target value by dividing the integration result of the amount of the received packet data written in the storage means in a predetermined period from a beginning of receiving of the packet data, by an average receiving rate of the received packet data in an integration time, calculates a measurement value by dividing the integration result of the amount of the received packet data written in the storage means after the predetermined period, by the average receiving rate of the received packet data in the integration time, and sets a difference between the target value and the measurement value as the clock frequency deviation.

2. The data receiving device according to claim 1,
wherein the data receiving device receives a plurality of packet data sent from a plurality of data sending devices,
the storage means includes a plurality of storage areas for storing the plurality of packet data received by the receiving means respectively, and
the control means generates a plurality of read timings corresponding to the plurality of storage areas.

3. The data receiving device according to claim 1,
wherein when the control means calculates the clock frequency deviation between the data sending device and the data receiving device and generates the read timing of the received packet data, the control means
calculates a target value by dividing the integration result of the amount of the received packet data written in the storage means in a predetermined period from a beginning of receiving of the packet data, by an integration time,
calculates a measurement value by dividing the integration result of the amount of the received packet data written in the storage means after the predetermined period, by the integration time, and
sets a difference between the target value and the measurement value as the clock frequency deviation.

4. The data receiving device according to claim 3,
wherein the control means calculates an average receiving rate of the packet data received by the receiving means, and if the calculated average receiving rate changes by a predetermined value or greater, the control means recalculates and sets the target value.

5. The data receiving device according to claim 1, further comprising:
a second storage means for storing a previous offset amount calculated from the clock frequency deviation between the data sending device and the data receiving device when previous receiving of the packet data finishes and device identification information specific to the data sending device when the previous offset amount is calculated;
wherein if the data sending device which transmits new packet data is the data sending device having the device identification information stored in the second storage means when receiving of the new packet data starts, the control means generates the read timing, with an initial value set as the offset amount stored in the second storage means.

6. The data receiving device according to claim 5, wherein the device identification information identifying the data sending device is at least one of an IP address and a MAC address of the data sending device.

7. The data receiving device according to claim 1, wherein the control means includes:
a time information separation means for separating the time information added to the received packet data;
a data read timing generation means for reading packet data from the storage means in accordance with the time information separated by the time information separation means; and
an integral calculation means for calculating a normalized integral of the amount of the received packet temporarily stored in the storage means, in accordance with the integration result of the amount of the received packet temporarily stored in the storage means, the number of the processed packets, and the integration measurement time;
wherein when the data read timing generation means generates a read timing of the received packet, the data read timing generation means subtracts the normalized integral of the received packet calculated by the integral calculation means when the previous clock frequency deviation is calculated from the normalized integral of the received packet output from the integral calculation means, calculates a clock frequency deviation between the data sending device and the data receiving device, on the basis of the result of subtraction, and adds an offset on the basis of the calculated clock frequency deviation to the read timing of the received packet, thereby generating the read timing of the received packet.

8. The data receiving device according to claim 7, further comprising:
a clock frequency deviation convergence determination means for determining that the clock frequency deviation between the data sending device and the data receiving device has converged if an absolute value of the calculated clock frequency deviation does not exceed a predetermined level for a predetermined number of times and continuously when the clock frequency deviation is calculated.

9. The data receiving device according to claim 8,
wherein when a determination whether the clock frequency deviation between the data sending device and the data receiving device has converged is made by the clock frequency deviation convergence determination means, the determination of convergence is made with a plurality of conditions changed in stages at least.

10. The data receiving device according to claim 9,
wherein when the determination of convergence is made, at least one of the measurement time of the integral of the received packet, a gain used when an offset is added to the read timing of the received packet in accordance with the calculated clock frequency deviation, and a predetermined value used to determine the convergence is changed in each of the stages.

11. The data receiving device according to claim 8, further comprising:
a low-frequency component extraction means for extracting a low-frequency component of an offset value added to the read timing of the received packet in accordance with the calculated clock frequency deviation;
wherein when the clock frequency deviation convergence determination means determines whether the clock frequency deviation has converged, if an amplitude of an output of the low-frequency component extraction means enters a predetermined range for a predetermined number of times continuously, the clock frequency deviation convergence determination means determines that the clock frequency deviation between the data sending device and the data receiving device has converged.

12. The data receiving device according to claim 7,
wherein when an offset value is added to the read timing of the received packet in accordance with the calculated clock frequency deviation, if an offset value is beyond a predetermined range obtained from a frequency precision of a clock generation means used in the data sending device and the data receiving device, an amplitude of the offset value is limited so that the offset value is kept in a predetermined range.

13. The data receiving device according to claim 7,
wherein when the clock frequency deviation convergence determination means determines that the clock frequency has converged, an offset is forced to be added to the read timing of the received packet so that a normalized integral of the amount of the received packet temporarily stored in the storage means is brought into a predetermined range.

14. The data receiving device according to claim 13,
wherein the calculation of the clock frequency deviation between the data sending device and the data receiving device, which is performed immediately after an offset is forced to be added to the read timing of the received packet so that the normalized integral of the amount of the received packet temporarily stored in the storage means is brought into the predetermined range, is masked.

15. The data receiving device according to claim 7,
wherein when the read timing of the received packet is generated by adding an offset to the read timing of the received packet in accordance with the calculated clock frequency deviation, if the number of the processed packets varies greatly in comparison with a value measured at the last time, determination that the receiving rate of the received packet has varied greatly is made, and a calculation of the clock frequency deviation between the data sending device and the data receiving device is masked.

16. The data receiving device according to claim 7, further comprising:
an input packet count counting means for counting the number of the packets input to the storage means when the read timing of the received packet is generated by adding the offset to the read timing of the received packet in accordance with the calculated clock frequency deviation;
wherein the receiving rate of the received packet is determined to have varied greatly when the number of the input packets output from the input packet count counting means change greatly in comparison with the previously measured input packet count, and a calculation of the clock frequency deviation between the data sending device and the data receiving device is masked.

17. The data receiving device according to claim 7,
wherein when the read timing of the received packet is generated by adding an offset to the read timing of the received packet in accordance with the calculated clock frequency deviation, if the result of subtracting the normalized integral of the received packet calculated by the integral calculation means exceeds a predetermined range, determination that the receiving rate of the received packet has varied greatly is made, and the calculation of the clock frequency deviation between the data sending device and the data receiving device is masked.

18. The data receiving device according to claim 7,
wherein when the offset value added to the read timing of the received packet is calculated in accordance with the calculated clock frequency deviation, if the storage means overflows or underflows while the integration result of the amount of the received packet temporarily stored in the storage means, the number of the processed packets, and the integration measurement time are measured, the calculation of a clock frequency deviation between the data sending device and the data receiving device is masked.

19. A data receiving method for receiving packet data through a transmission path and outputting packet data in accordance time information added beforehand to the received packet data, the method comprising the steps of:
storing the received packet data temporarily in a storage means; and
separating the time information added to the received packet data and reading the packet data from the storage means in accordance with the separated time information;
wherein when a read timing of the received packet data is generated in the step of reading the packet data, a clock frequency deviation between a data sending device and a data receiving device is calculated in accordance with an integration result of an amount of the received packet data temporarily stored in the storage means and a measurement result of the integration time, and an offset amount based on the deviation is added to the read timing of the received packet data, thereby generating the read timing of the received packet data; wherein when a clock frequency deviation between the data sending device and the data receiving device is calculated and the read timing of the received packet data is generated, a target value is calculated by dividing the integration result of the amount of the received packet data written in the storage means in a predetermined period from a beginning of receiving of the packet data, by the average receiving rate of the received packet data in the integration time, a measurement value is calculated by dividing the integration result of the amount of the received packet data written in the storage means after the predetermined period, by the average receiving rate of the received packet data in the integration time, and a difference between the target value and the measurement value is set as the clock frequency deviation.

20. The data receiving method according to claim 19,
wherein when a clock frequency deviation between the data sending device and the data receiving device is calculated and the read timing of the received packet data is generated,
a target value is calculated by dividing the integration result of the amount of the received packet data written in the storage means in a predetermined period from a beginning of receiving of the packet data in an integration time, a measurement value is calculated by dividing the integration result of the amount of the received packet data written in the storage means after the predetermined period in the integration time, and a difference between the target value and the measurement value is set as the clock frequency deviation.

21. The data receiving method according to claim 20, wherein an average receiving rate of the received packet data is calculated, and if the calculated average receiving rate changes by a predetermined value or greater, the target value is recalculated and set.

22. The data receiving method according to claim 19, further comprising the step of:

storing a previous offset amount calculated from the clock frequency deviation between the data sending device and the data receiving device when previous receiving of the packet data finishes and device identification information specific to the data sending device in the previous offset amount calculation in a second storage means when the receiving of the previous packet data finishes;

wherein when the receiving of the new packet data starts, if the data sending device sending new packet data is the data sending device having the device identification information stored in the second storage means, the read timing is generated, with the offset amount stored in the second storage means set as the initial value.

23. A data receiving method for receiving packet data through a transmission path and outputting the packet data in accordance with time information added beforehand to the packet data, the method comprising:

a storage step of storing the received packet data in a storage means;

a time information separation step of separating the time information added to the received packet data, a read timing generation step of setting a data read timing for reading the packet data from the storage means, in accordance with the time information separated by the time information separation step;

an integration step of integrating the amount of the received packet temporarily stored in the storage step;

an integration time measurement step of measuring an integration time in the integration step and the number of the processed packets;

an integral calculation step of calculating a normalized integral of the amount of the received packet temporarily stored in the storage step, in accordance with the integration result obtained in the integration step and the integration time and the number of the processed packets measured in the integration time measurement step; and a clock frequency deviation calculation step of calculating a clock frequency deviation between the data sending device and the data receiving device, in accordance with a result of subtracting the normalized integral of the received packet calculated in the integral calculation step in the calculation of the previous clock frequency deviation, from the normalized integral of the received packet calculated in the integral calculation step;

wherein an offset is added to the read timing in accordance with the clock frequency deviation information calculated in the clock frequency deviation calculation step when a read timing is generated in the read timing generation step.

24. The data receiving method according to claim 23, further comprising:

a clock frequency deviation convergence determination step of determining that the clock frequency deviation between the data sending device and the data receiving device has converged if an absolute value of the calculated clock frequency deviation does not exceed a predetermined level for a predetermined number of times continuously when the clock frequency deviation is calculated.

25. The data receiving method according to claim 24, wherein when a determination whether a clock frequency deviation between the data sending device and the data receiving device has converged is made in the clock frequency deviation convergence determination step, the determination of convergence is made with a plurality of conditions changed in stages at least.

26. The data receiving method according to claim 25, wherein when the determination of convergence is made, at least one of the measurement time of the integral of the received packet, a gain used when an offset is added to the read timing of the received packet in accordance with the calculated clock frequency deviation, and a predetermined value used to determine the convergence is changed in each of stages.

27. The data receiving method according to claim 24, further comprising:

a low-frequency component extraction step of extracting a low-frequency component of an offset value added to the read timing of the received packet in accordance with the calculated clock frequency deviation;

wherein when the determination whether the clock frequency deviation has converged, if an amplitude of an output of the low-frequency component extraction means enters a predetermined range for a predetermined number of times continuously, determination that the clock frequency deviation between the data sending device and the data receiving device has converged is made.

28. The data receiving method according to claim 23, wherein when an offset is added to the read timing of the received packet in accordance with the calculated clock frequency deviation, an amplitude is limited so that an offset value is kept in a predetermined range if the offset value is beyond a predetermined range obtained from a frequency precision of a clock generation means used in the data sending device and the data receiving device.

29. The data receiving method according to claim 24, wherein when in the clock frequency deviation convergence determination step, determination that the clock frequency has converged is made, an offset is forced to be added to the read timing of the received packet so that the normalized integral of the amount of the received packet temporarily stored in the storage means is brought into a predetermined range.

30. The data receiving method according to claim 29, wherein the calculation of the clock frequency deviation between the data sending device and the data receiving device, which is performed immediately after an offset is forced to be added to the read timing of the received packet so that the normalized integral of the amount of the received packet temporarily stored in the storage means is brought into a predetermined range, is masked.

31. The data receiving method according to claim 23,
wherein when the read timing of the received packet is generated by adding an offset to the read timing of the received packet in accordance with the calculated clock frequency deviation, if the number of the processed packets varies greatly in comparison with a value measured at the last time, determination that the receiving rate of the received packet has varied greatly is made, and the calculation of the clock frequency deviation between the data sending device and the data receiving device is masked.

32. The data receiving method according to claim 23, further comprising:
an input packet count counting step of counting the number of the packets input to the storage means when the read timing of the received packet is generated by adding the offset to the read timing of the received packet in accordance with the calculated clock frequency deviation;
wherein the receiving rate of the received packet is determined to have varied greatly when the number of the input packets output in the input packet count counting step change greatly in comparison with the previously measured input packet count, and the calculation of a clock frequency deviation between the data sending device and the data receiving device is masked.

33. The data receiving method according to claim 23,
wherein when the read timing of the received packet is generated by adding an offset to the read timing of the received packet in accordance with the calculated clock frequency deviation, if the result of subtracting the normalized integral of the received packet calculated in the integral calculation step exceeds a predetermined range, determination that the receiving rate of the received packet has varied greatly is made, and the calculation of the clock frequency deviation between the data sending device and the data receiving device is masked.

34. The data receiving method according to claim 23,
wherein when an offset value added to the read timing of the received packet is calculated in accordance with the calculated clock frequency deviation, if the storage means overflows or underflows while the integration result of the amount of the received packet temporarily stored in the storage step, the number of the processed packets, and the integration measurement time are measured, the calculation of the clock frequency deviation between the data sending device and the data receiving device is masked.

* * * * *